US008959004B2

(12) United States Patent
Weber

(10) Patent No.: US 8,959,004 B2
(45) Date of Patent: Feb. 17, 2015

(54) METHOD AND SYSTEM FOR DETERMINING BLENDED HISTOGRAM SHAPE IDENTIFIERS

(76) Inventor: James S. Weber, Gurnee, IL (US)

( * ) Notice: Subject to any disclaimer, the term of this patent is extended or adjusted under 35 U.S.C. 154(b) by 500 days.

(21) Appl. No.: 13/411,974

(22) Filed: Mar. 5, 2012

(65) Prior Publication Data
US 2012/0166140 A1 Jun. 28, 2012

Related U.S. Application Data

(63) Continuation-in-part of application No. 12/576,329, filed on Oct. 9, 2009, now Pat. No. 8,131,503, which is a continuation-in-part of application No. 12/142,980, filed on Jun. 20, 2008, now Pat. No. 7,603,254, which is a continuation-in-part of application No. 11/047,018, filed on Jan. 30, 2005, now Pat. No. 7,392,156.

(60) Provisional application No. 60/540,407, filed on Jan. 30, 2004.

(51) Int. Cl.
*G06F 19/00* (2011.01)
*G06F 17/18* (2006.01)
*G06K 9/62* (2006.01)

(52) U.S. Cl.
CPC .............. *G06F 17/18* (2013.01); *G06K 9/6212* (2013.01); *G06K 9/6298* (2013.01)
USPC .......................................................... 702/180

(58) Field of Classification Search
CPC ................ C12Q 1/6823; C12Q 1/6888; G06F 17/30592; Y10S 707/99936; Y10S 707/99942
USPC ................................... 702/180, 182–185, 188
See application file for complete search history.

(56) References Cited

U.S. PATENT DOCUMENTS 6,633,882 B1 * 10/2003 Fayyad et al. ......................... 1/1

* cited by examiner

*Primary Examiner* — Edward Raymond
(74) *Attorney, Agent, or Firm* — Lesavich High-Tech Law Group, S.C.; Stephen Lesavich

(57) ABSTRACT

A method and system for determining blended histogram shape identifiers. A blended set of possible histogram shapes is created by selecting generated histogram shapes from a first generated set of all possible histogram shapes generated with a first method that include highest order rankings from a first pre-determined ranking order and generated histogram shapes from a second set of all possible histogram shapes generated with a second method that include highest rankings from a second pre-determined ranking order. A graphical histogram is displayed using the third blended set of all possible histogram shapes, thereby creating the graphical histogram with a new set of all possible histogram shapes based on an aggregate rakings order of histogram shapes generated with the first and second methods.

17 Claims, 24 Drawing Sheets

| | | | | | | | | | |
|---|---|---|---|---|---|---|---|---|---|
| 243 | -0.2793 | 8.0362 | S | 2 0 | 115 | 2.2056 | 2.0690 | | 10 7 3 |
| 192 | -0.2793 | 7.6389 | Rev | 19 1 | 22 | 2.3361 | 1.8810 | | 10 6 4 |
| 157 | -0.2793 | 7.0598 | Rev | 18 2 | 184 | 0.8418 | 3.2589 | | 9 10 1 |
| 125 | -0.2793 | 6.6238 | Rev | 17 3 | 149 | 1.4209 | 2.6798 | | 9 9 2 |
| 98 | -0.2793 | 6.2268 | Rev | 16 4 | 117 | 1.8569 | 2.2438 | | 9 8 3 |
| 79 | -0.2793 | 5.9277 | Rev | 15 5 | 223 | 2.2076 | 1.9041 | | 9 7 4 |
| 231 | 0.2485 | 4.9909 | Rev | 14 6 | 183 | 0.6359 | 3.3619 | | 8 11 1 |
| 230 | -0.3138 | 5.3220 | Rev | 13 7 | 148 | 1.2150 | 2.7827 | | 8 10 2 |
| 229 | -0.3387 | 5.3220 | Rev | 12 8 | 116 | 1.6510 | 2.3467 | | 8 9 3 |
| 232 | -0.6508 | 5.3220 | Rev | 11 9 | 222 | 1.9983 | 1.9994 | | 8 8 4 |
| 233 | -1.0444 | 5.3220 | S | 10 10 | 185 | 0.5242 | 3.4177 | | 7 12 1 |
| 235 | -1.2213 | 5.3220 | Rev | 9 11 | 150 | 1.1033 | 2.8386 | | 7 11 2 |
| 234 | -1.3242 | 5.3220 | Rev | 8 12 | 118 | 1.5393 | 2.4026 | | 7 10 3 |
| 236 | -1.3801 | 5.3220 | Rev | 7 13 | 224 | 1.9006 | 2.0413 | | 7 9 4 |
| 237 | -1.7215 | 5.3220 | Rev | 6 14 | 186 | -0.1587 | 3.7592 | Rev | 6 13 1 |
| 238 | -2.0806 | 5.3220 | Rev | 5 15 | 151 | 0.4204 | 3.1800 | Rev | 6 12 2 |
| 239 | -2.2412 | 5.3220 | Rev | 4 16 | 119 | 0.8564 | 2.7440 | Rev | 6 11 3 |
| 240 | -2.4061 | 5.3220 | Rev | 3 17 | 225 | 1.3625 | 2.2777 | Rev | 6 10 4 |
| 242 | -2.5091 | 5.3220 | Rev | 2 18 | 221 | 1.2502 | 2.1991 | Rev | 6 9 5 |
| 241 | -2.6758 | 5.3220 | Rev | 1 19 | 228 | 1.1336 | 2.1991 | S | 6 8 6 |
| 61 | 2.3743 | 2.6610 | | 14 5 1 | 187 | -0.8768 | 4.1182 | Rev | 5 14 1 |
| 50 | 2.3472 | 2.6610 | | 13 6 1 | 152 | -0.2976 | 3.5391 | Rev | 5 13 2 |
| 39 | 2.3223 | 2.6610 | | 12 7 1 | 120 | 0.1384 | 3.1031 | Rev | 5 12 3 |
| 181 | 1.9494 | 2.7273 | | 11 8 1 | 93 | 0.5354 | 2.7061 | Rev | 5 11 4 |
| 146 | 2.1614 | 2.309 | 6 | 11 7 2 | 74 | 0.8345 | 2.4070 | S | 5 10 5 |
| 28 | 2.3132 | 2.081 | 9 | 11 6 3 | 226 | 0.9739 | 2.2675 | Rev | 5 9 6 |
| 182 | 1.1955 | 3.0821 | | 10 9 1 | 188 | -1.1981 | 4.2789 | Rev | 4 15 1 |
| 147 | 1.7746 | 2.5030 | | 10 8 2 | 153 | -0.6189 | 3.6997 | Rev | 4 14 2 |
| | | | | | 121 | -0.1829 | 3.2637 | Rev | 4 13 3 |
| | | | | | 94 | 0.2141 | 2.8667 | S | 4 12 4 |
| | | | | | 75 | 0.5132 | 2.5676 | Rev | 4 11 5 |
| | | | | | 227 | 0.6928 | 2.3880 | Rev | 4 10 6 |
| | | | | | 189 | -1.5279 | 4.4438 | Rev | 3 16 1 |
| | | | | | 154 | -0.9488 | 3.8647 | Rev | 3 15 2 |
| | | | | | 122 | -0.5128 | 3.4287 | S | 3 14 3 |
| | | | | | 95 | -0.1158 | 3.0317 | Rev | 3 13 4 |
| | | | | | 76 | 0.1833 | 2.7326 | Rev | 3 12 5 |
| | | | | | 218 | 0.4041 | 2.5117 | Rev | 3 11 6 |
| | | | | | 191 | -1.7338 | 4.5467 | Rev | 2 17 1 |
| | | | | | 156 | -1.1546 | 3.9676 | S | 2 16 2 |

| | | | | | | | | | | |
|---|---|---|---|---|---|---|---|---|---|---|
| 124 | -0.7186 | 3.5316 | Rev | 2 15 3 | 145 | 1.2642 | 1.8166 | 4 7 7 2 | | |
| 97 | -0.3216 | 3.1346 | Rev | 2 14 4 | 217 | 1.4467 | 1.6226 | 4 7 6 3 | | |
| 78 | -0.0225 | 2.8354 | Rev | 2 13 5 | 214 | 1.4263 | 1.5710 | 4 7 5 4 | | |
| 220 | 0.2240 | 2.5889 | Rev | 2 12 6 | 58 | 0.6610 | 2.2548 | 3 11 5 1 | | |
| 190 | -2.1996 | 4.7796 | S | 1 18 1 | 174 | 0.8405 | 2.0831 | 3 10 6 1 | | |
| 155 | -1.6204 | 4.2005 | Rev | 1 17 2 | 47 | 0.9585 | 2.0157 | 3 10 5 2 | | |
| 123 | -1.1844 | 3.7645 | Rev | 1 16 3 | 172 | 0.8152 | 2.0841 | 3 9 7 1 | | |
| 96 | -0.7874 | 3.3675 | Rev | 1 15 4 | 36 | 0.9519 | 2.0157 | 3 9 6 2 | | |
| 77 | -0.4883 | 3.0684 | Rev | 1 14 5 | 180 | 0.7969 | 2.0841 | 3 8 8 1 | | |
| 219 | -0.1835 | 2.7636 | Rev | 1 13 6 | 142 | 0.9732 | 1.9490 | 3 8 7 2 | | |
| 90 | 2.2963 | 1.7629 | | 9 7 3 1 | 111 | 1.2015 | 1.7143 | 3 8 6 3 | | |
| 17 | 2.3421 | 1.6849 | | 9 6 4 1 | 212 | 1.3109 | 1.6049 | 3 8 5 4 | | |
| 89 | 2.1944 | 1.8033 | | 8 8 3 1 | 60 | 0.4809 | 2.3320 | 2 12 5 1 | | |
| 13 | 2.3129 | 1.6849 | | 8 7 4 1 | 49 | 0.6177 | 2.1953 | 2 11 6 1 | | |
| 91 | 2.0967 | 1.8452 | | 7 9 3 1 | 38 | 0.6426 | 2.1703 | 2 10 7 1 | | |
| 72 | 2.2547 | 1.6915 | | 7 8 4 1 | 179 | 0.6779 | 2.1350 | 2 9 8 1 | | |
| 171 | 2.3360 | 1.5841 | | 7 7 5 1 | 141 | 0.8292 | 1.9838 | 2 9 7 2 | | |
| 9 | 2.3662 | 1.5395 | | 7 7 4 2 | 109 | 1.0472 | 1.7658 | 2 9 6 3 | | |
| 92 | 1.9592 | 1.9041 | | 6 10 3 1 | 207 | 1.1652 | 1.6478 | 2 9 5 4 | | |
| 73 | 1.8401 | 1.9041 | | 6 9 4 1 | 59 | 0.0734 | 2.5067 | 1 13 5 1 | | |
| 177 | 1.6733 | 1.8845 | | 6 8 5 1 | 48 | 0.1518 | 2.4282 | 1 12 6 1 | | |
| 139 | 2.0221 | 1.5928 | | 6 8 4 2 | 37 | 0.1768 | 2.4033 | 1 11 7 1 | | |
| 210 | 2.2817 | 1.3921 | | 6 8 3 3 | 178 | 0.2703 | 2.3097 | 1 10 8 1 | | |
| 138 | 1.7684 | 1.6199 | | 6 7 5 2 | 140 | 0.4798 | 2.1002 | 1 10 7 2 | | |
| 209 | 2.1234 | 1.4424 | | 6 7 4 3 | 108 | 0.6977 | 1.8820 | 1 10 6 3 | | |
| 137 | 1.7434 | 1.6199 | | 6 6 6 2 | 206 | 1.0114 | 1.6947 | 1 10 5 4 | | |
| 208 | 2.0610 | 1.4611 | | 6 6 5 3 | 110 | 0.5662 | 1.8810 | 1 9 7 3 | | |
| 143 | 1.7231 | 1.6199 | | 6 5 7 2 | 211 | 0.7136 | 1.7805 | 1 9 6 4 | | |
| 215 | 1.9097 | 1.5027 | | 6 5 6 3 | 213 | 0.6206 | 1.7804 | 1 8 7 4 | | |
| 175 | 1.1823 | 2.0591 | | 5 9 5 1 | 55 | 2.3743 | 1.3305 | 6 8 3 2 1 | | |
| 56 | 1.4028 | 1.8386 | | 5 9 4 2 | 44 | 2.3472 | 1.3305 | 6 7 4 2 1 | | |
| 45 | 1.4746 | 1.7668 | | 5 8 5 2 | 33 | 2.3223 | 1.3305 | 6 6 5 2 1 | | |
| 34 | 1.4996 | 1.7419 | | 5 7 6 2 | 112 | 2.1498 | 1.3600 | 6 5 6 2 1 | | |
| 144 | 1.5453 | 1.6961 | | 5 6 7 2 | 166 | 2.1797 | 1.2670 | 6 5 5 3 1 | | |
| 216 | 1.6718 | 1.5697 | | 5 6 6 3 | 83 | 2.2287 | 1.1853 | 6 5 5 2 2 | | |
| 176 | 0.9595 | 2.1147 | | 4 10 5 1 | 200 | 2.2679 | 1.1219 | 6 5 4 3 2 | | |
| 57 | 1.2150 | 1.9191 | | 4 10 4 2 | 203 | 2.2332 | 1.0995 | 6 5 3 4 2 | | |
| 173 | 0.9896 | 2.0157 | | 4 9 6 1 | 113 | 1.7722 | 1.4692 | 5 6 6 2 1 | | |
| 46 | 1.1417 | 1.9324 | | 4 9 5 2 | 167 | 1.8998 | 1.3380 | 5 6 5 3 1 | | |
| 35 | 1.1783 | 1.9025 | | 4 8 6 2 | 87 | 2.0367 | 1.2413 | 5 6 5 2 2 | | |

| | | | | | | | | |
|---|---|---|---|---|---|---|---|---|
| 164 | 1.9157 | 1.2769 | 5 | 6 | 4 | 4 | 1 | |
| 69 | 2.0237 | 1.2141 | 5 | 6 | 4 | 3 | 2 | |
| 205 | 2.1022 | 1.1402 | 5 | 6 | 3 | 4 | 2 | |
| 202 | 2.0573 | 1.1431 | 5 | 5 | 4 | 4 | 2 | |
| 114 | 1.6087 | 1.5173 | 4 | 7 | 6 | 2 | 1 | |
| 88 | 1.6119 | 1.4574 | 4 | 7 | 5 | 3 | 1 | |
| 165 | 1.7405 | 1.3308 | 4 | 7 | 4 | 4 | 1 | |
| 70 | 1.8973 | 1.2438 | 4 | 7 | 4 | 3 | 2 | |
| 24 | 1.9930 | 1.1840 | 4 | 7 | 3 | 4 | 2 | |
| 161 | 1.6513 | 1.3493 | 4 | 6 | 5 | 4 | 1 | |
| 66 | 1.7604 | 1.2841 | 4 | 6 | 5 | 3 | 2 | |
| 204 | 1.8949 | 1.1892 | 4 | 6 | 4 | 4 | 2 | |
| 197 | 1.8700 | 1.1679 | 4 | 6 | 4 | 3 | 3 | |
| 126 | 1.8048 | 1.1909 | 4 | 5 | 5 | 4 | 2 | |
| 193 | 1.8248 | 1.1781 | 4 | 5 | 5 | 3 | 3 | |
| 82 | 1.4308 | 1.4959 | 3 | 8 | 5 | 3 | 1 | |
| 25 | 1.5959 | 1.3836 | 3 | 8 | 4 | 4 | 1 | |
| 85 | 1.4364 | 1.4520 | 3 | 7 | 6 | 3 | 1 | |
| 162 | 1.5363 | 1.3905 | 3 | 7 | 5 | 4 | 1 | |
| 67 | 1.5752 | 1.3407 | 3 | 7 | 5 | 3 | 2 | |
| 19 | 1.6192 | 1.2966 | 3 | 7 | 4 | 4 | 2 | |
| 136 | 1.6717 | 1.2442 | 3 | 6 | 5 | 4 | 2 | |
| 201 | 1.7124 | 1.2034 | 3 | 6 | 5 | 3 | 3 | |
| 27 | 1.2239 | 1.5890 | 2 | 9 | 5 | 3 | 1 | |
| 86 | 1.3044 | 1.5085 | 2 | 8 | 6 | 3 | 1 | |
| 163 | 1.3762 | 1.4309 | 2 | 8 | 5 | 4 | 1 | |
| 68 | 1.4554 | 1.3750 | 2 | 8 | 5 | 3 | 2 | |
| 21 | 1.4971 | 1.3489 | 2 | 8 | 4 | 4 | 2 | |
| 160 | 1.3672 | 1.4130 | 2 | 7 | 6 | 4 | 1 | |
| 65 | 1.4065 | 1.3894 | 2 | 7 | 6 | 3 | 2 | |
| 131 | 1.5051 | 1.3139 | 2 | 7 | 5 | 4 | 2 | |
| 196 | 1.5795 | 1.2334 | 2 | 7 | 5 | 3 | 3 | |
| 26 | 1.1168 | 1.6319 | 1 | 10 | 5 | 3 | 1 | |
| 81 | 1.0542 | 1.6104 | 1 | 9 | 6 | 3 | 1 | |
| 20 | 1.2448 | 1.4865 | 1 | 9 | 5 | 4 | 1 | |
| 84 | 0.7674 | 1.6927 | 1 | 8 | 7 | 3 | 1 | |
| 159 | 1.0467 | 1.5292 | 1 | 8 | 6 | 4 | 1 | |
| 64 | 1.2986 | 1.4220 | 1 | 8 | 6 | 3 | 2 | |
| 169 | 1.0213 | 1.5043 | 1 | 8 | 5 | 5 | 1 | |
| 130 | 1.3040 | 1.3766 | 1 | 8 | 5 | 4 | 2 | |

62

| | | | | | | | | |
|---|---|---|---|---|---|---|---|---|
| 195 | 1.5203 | 1.2471 | 1 | 8 | 5 | 3 | 3 | |
| 63 | 0.8340 | 1.5819 | 1 | 7 | 7 | 4 | 1 | |
| 168 | 0.9412 | 1.5283 | 1 | 7 | 6 | 5 | 1 | |
| 129 | 1.2150 | 1.3914 | 1 | 7 | 6 | 4 | 2 | |
| 194 | 1.4886 | 1.2546 | 1 | 7 | 6 | 3 | 3 | |
| 71 | 0.8164 | 1.5819 | 1 | 6 | 8 | 4 | 1 | |
| 170 | 0.8681 | 1.5493 | 1 | 6 | 7 | 5 | 1 | |
| 134 | 1.0686 | 1.4351 | 1 | 6 | 7 | 4 | 2 | |
| 198 | 1.3862 | 1.2778 | 1 | 6 | 7 | 3 | 3 | |
| 135 | 1.0357 | 1.4089 | 1 | 5 | 8 | 4 | 2 | |
| 199 | 1.1617 | 1.3282 | 1 | 5 | 8 | 3 | 3 | |
| 62 | 2.3473 | 1.0693 | 6 | 5 | 4 | 3 | 1 | 1 |
| 128 | 2.2759 | 1.0775 | 6 | 5 | 3 | 4 | 1 | 1 |
| 6 | 2.2515 | 1.0696 | 6 | 5 | 3 | 3 | 2 | 1 |
| 133 | 2.1850 | 1.0965 | 5 | 6 | 3 | 4 | 1 | 1 |
| 23 | 2.2187 | 1.0753 | 5 | 6 | 3 | 3 | 2 | 1 |
| 127 | 2.1022 | 1.1152 | 5 | 5 | 4 | 4 | 1 | 1 |
| 5 | 2.1440 | 1.0859 | 5 | 5 | 4 | 3 | 2 | 1 |
| 132 | 2.0043 | 1.1375 | 4 | 6 | 4 | 4 | 1 | 1 |
| 18 | 2.0000 | 1.1159 | 4 | 6 | 4 | 3 | 2 | 1 |
| 4 | 1.9111 | 1.1196 | 4 | 5 | 5 | 3 | 2 | 1 |
| 101 | 1.8003 | 1.1251 | 3 | 6 | 5 | 3 | 2 | 1 |
| 14 | 1.8783 | 1.0657 | 3 | 6 | 5 | 2 | 3 | 1 |
| 100 | 1.7746 | 1.1116 | 3 | 5 | 6 | 3 | 2 | 1 |
| 10 | 1.8604 | 1.0687 | 3 | 5 | 6 | 2 | 3 | 1 |
| 105 | 1.7629 | 1.1057 | 3 | 4 | 7 | 3 | 2 | 1 |
| 53 | 1.8071 | 1.0794 | 3 | 4 | 7 | 2 | 3 | 1 |
| 42 | 1.7911 | 1.0724 | 3 | 4 | 6 | 3 | 3 | 1 |
| 31 | 1.7849 | 1.0661 | 3 | 4 | 5 | 4 | 3 | 1 |
| 3 | 1.7840 | 1.0653 | 3 | 4 | 4 | 5 | 3 | 1 |
| 16 | 1.6045 | 1.2084 | 2 | 7 | 5 | 3 | 2 | 1 |
| 12 | 1.6281 | 1.1848 | 2 | 6 | 6 | 3 | 2 | 1 |
| 106 | 1.6742 | 1.1376 | 2 | 5 | 7 | 3 | 2 | 1 |
| 54 | 1.7333 | 1.1009 | 2 | 5 | 7 | 2 | 3 | 1 |
| 104 | 1.6680 | 1.1201 | 2 | 5 | 6 | 4 | 2 | 1 |
| 43 | 1.7107 | 1.1002 | 2 | 5 | 6 | 3 | 3 | 1 |
| 32 | 1.7496 | 1.0779 | 2 | 5 | 5 | 4 | 3 | 1 |
| 8 | 1.7632 | 1.0705 | 2 | 5 | 4 | 5 | 3 | 1 |
| 41 | 1.6843 | 1.1032 | 2 | 4 | 7 | 3 | 3 | 1 |
| 30 | 1.6978 | 1.0952 | 2 | 4 | 6 | 4 | 3 | 1 |

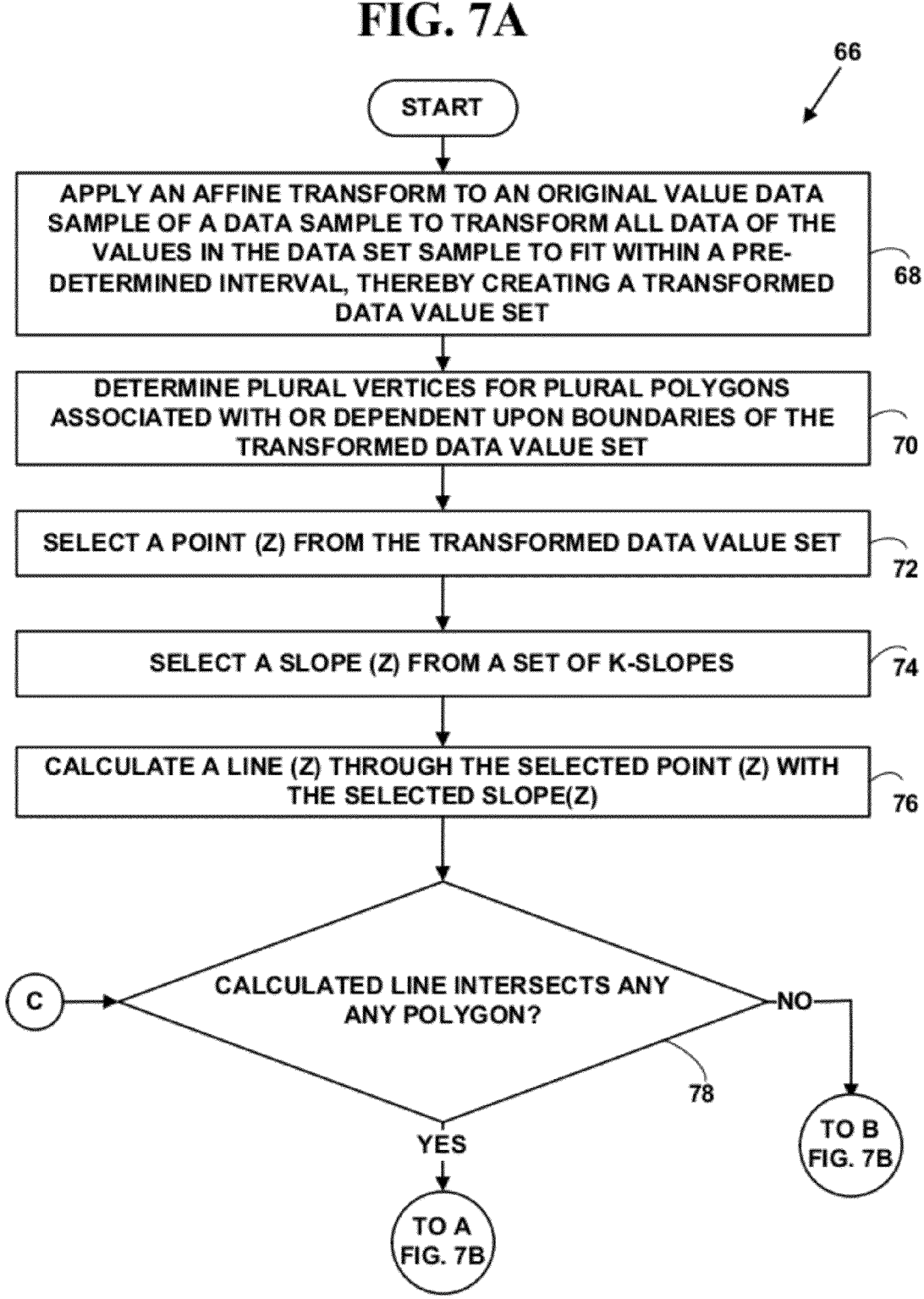

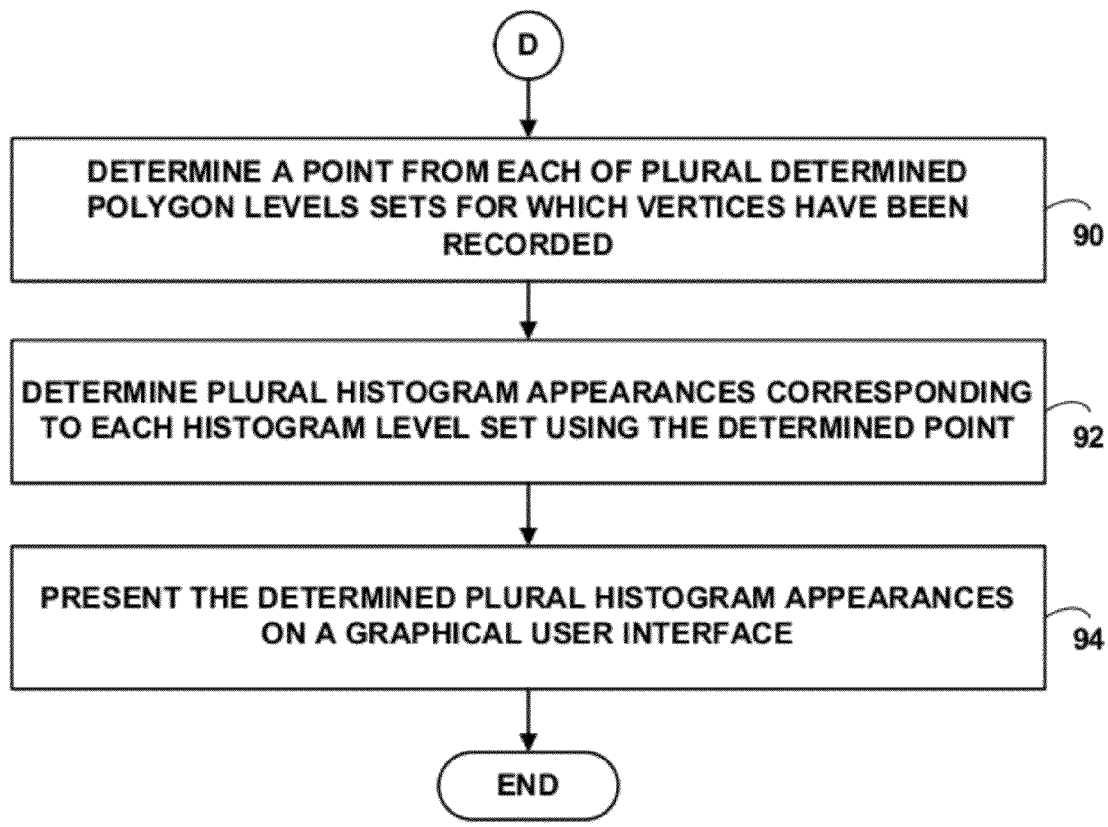

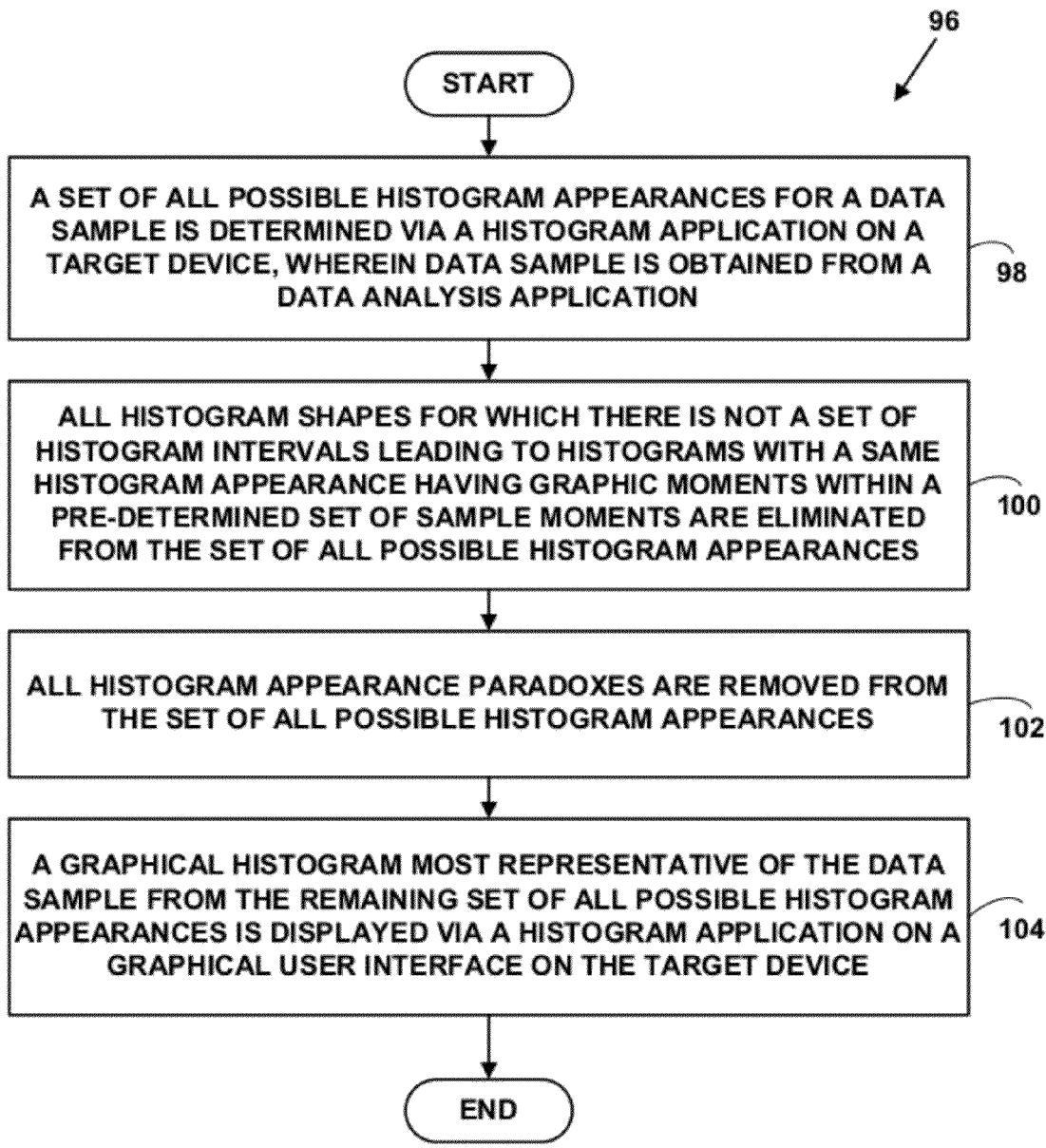

FIG. 9
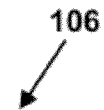
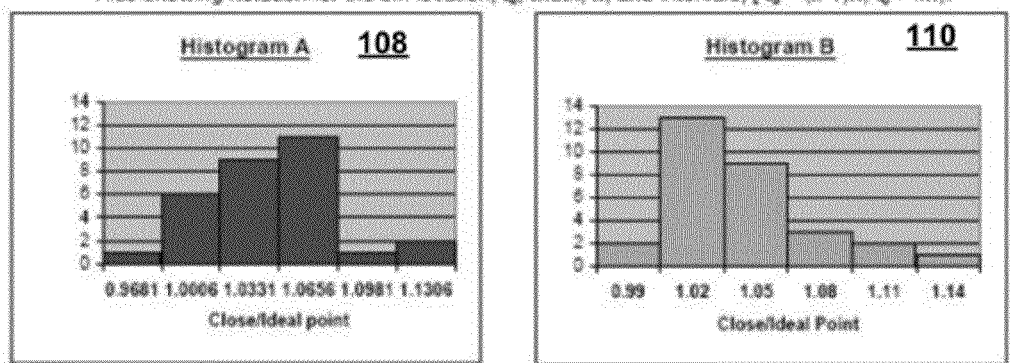
Examples A & B
A Sample having reversed appearances showing
extreme sensitivity of appearance to simply truncating $t_0$ and h
EXCEL Appearance A: <1,6,9,11,1,2>
Appearance B: <2,13,9,3,2,1>

Examples C, D, E, F, G, H, I, J, K, L
Appearance reversals for 3, 4, 5, & 6 intervals; mode inversion with 4 intervals
for the same set of 20 points Three Interval Reversal - Examples C & D
Appearance C: <10, 9, 1>
Appearance D: <1, 9, 10>

FIG. 11
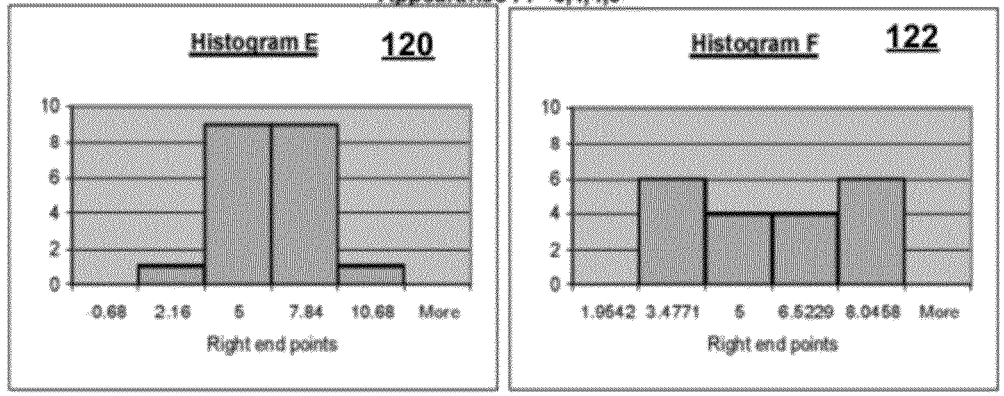
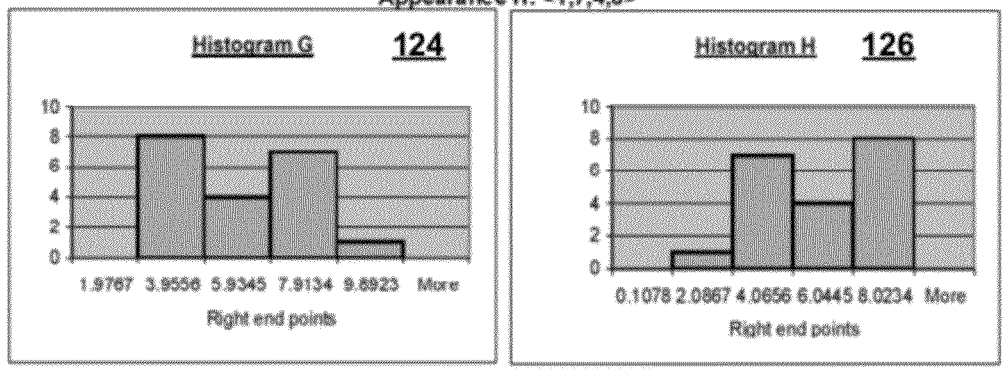

FIG. 12
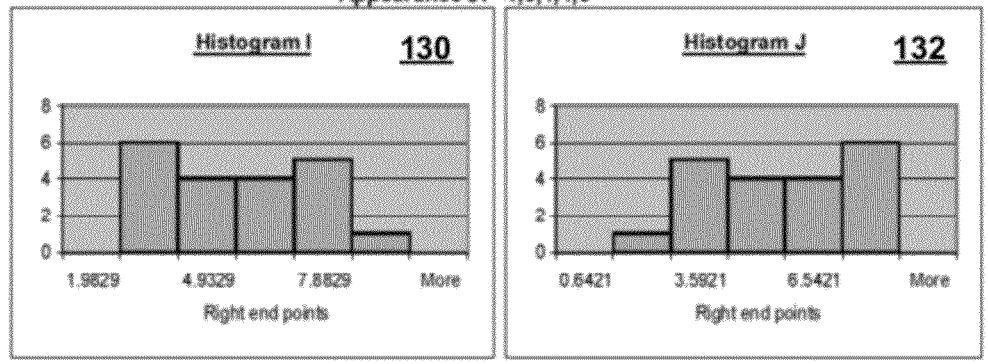
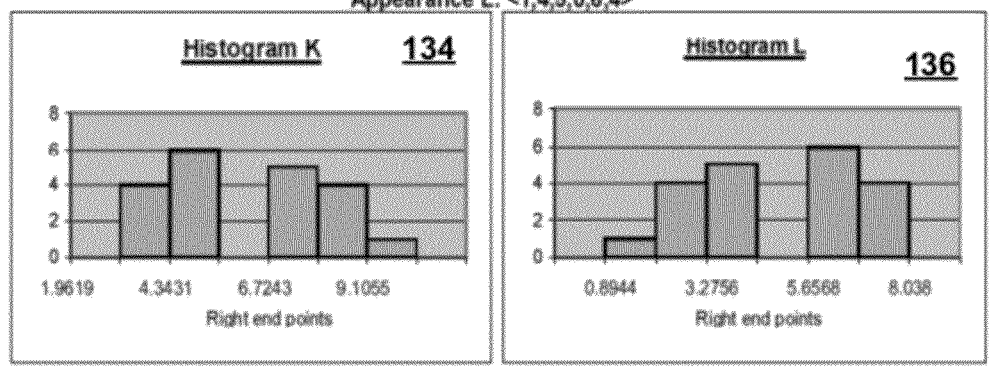

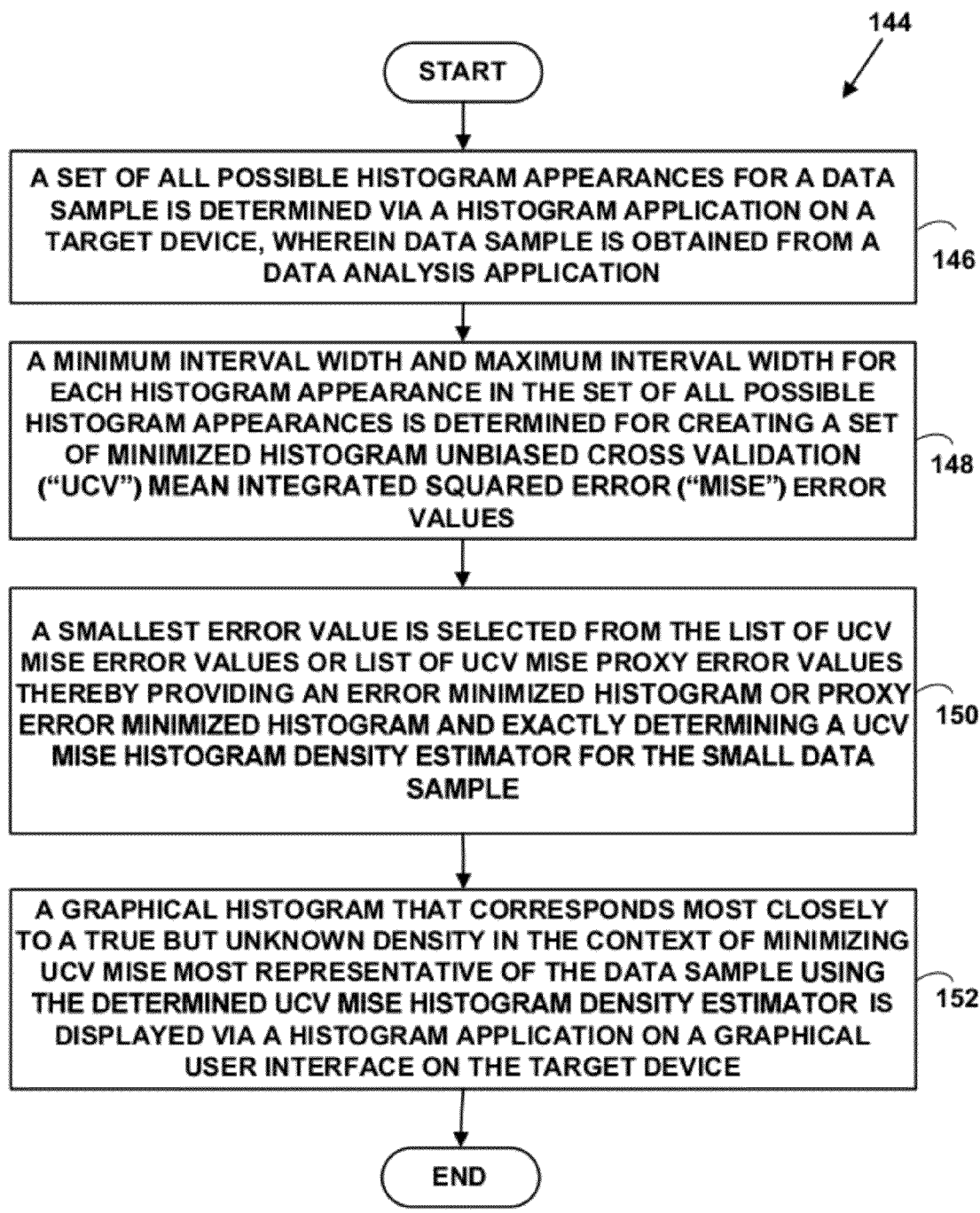

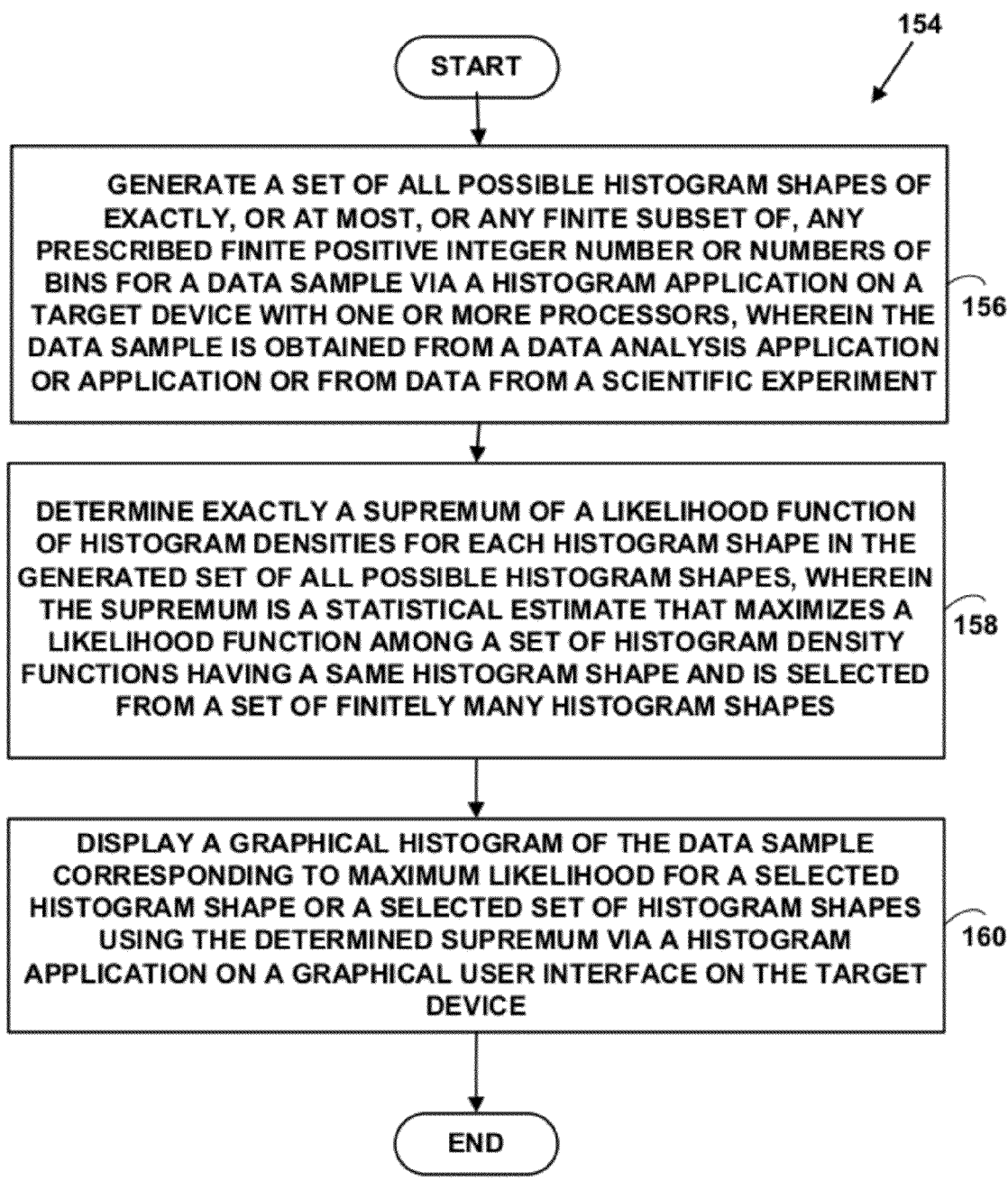

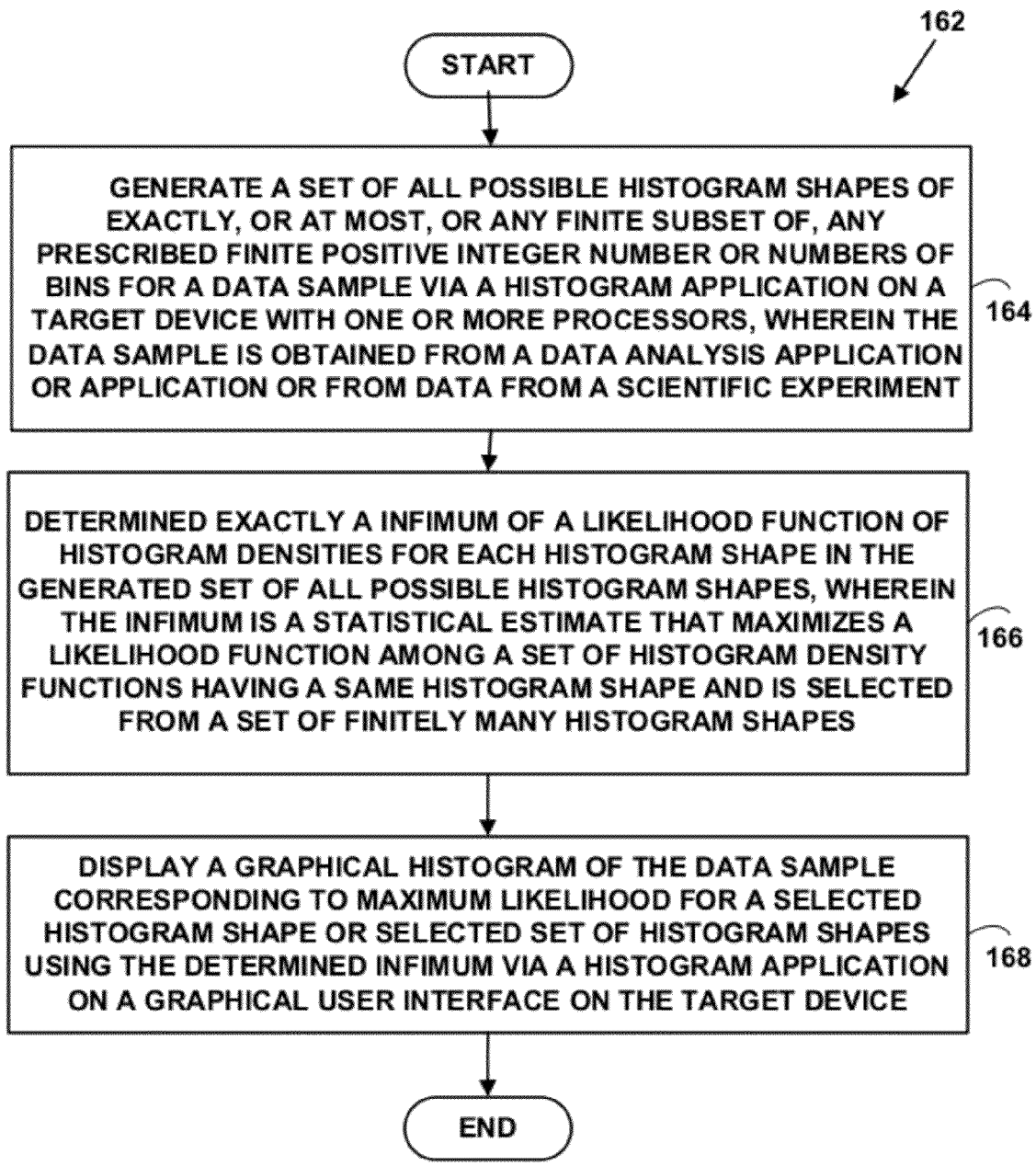

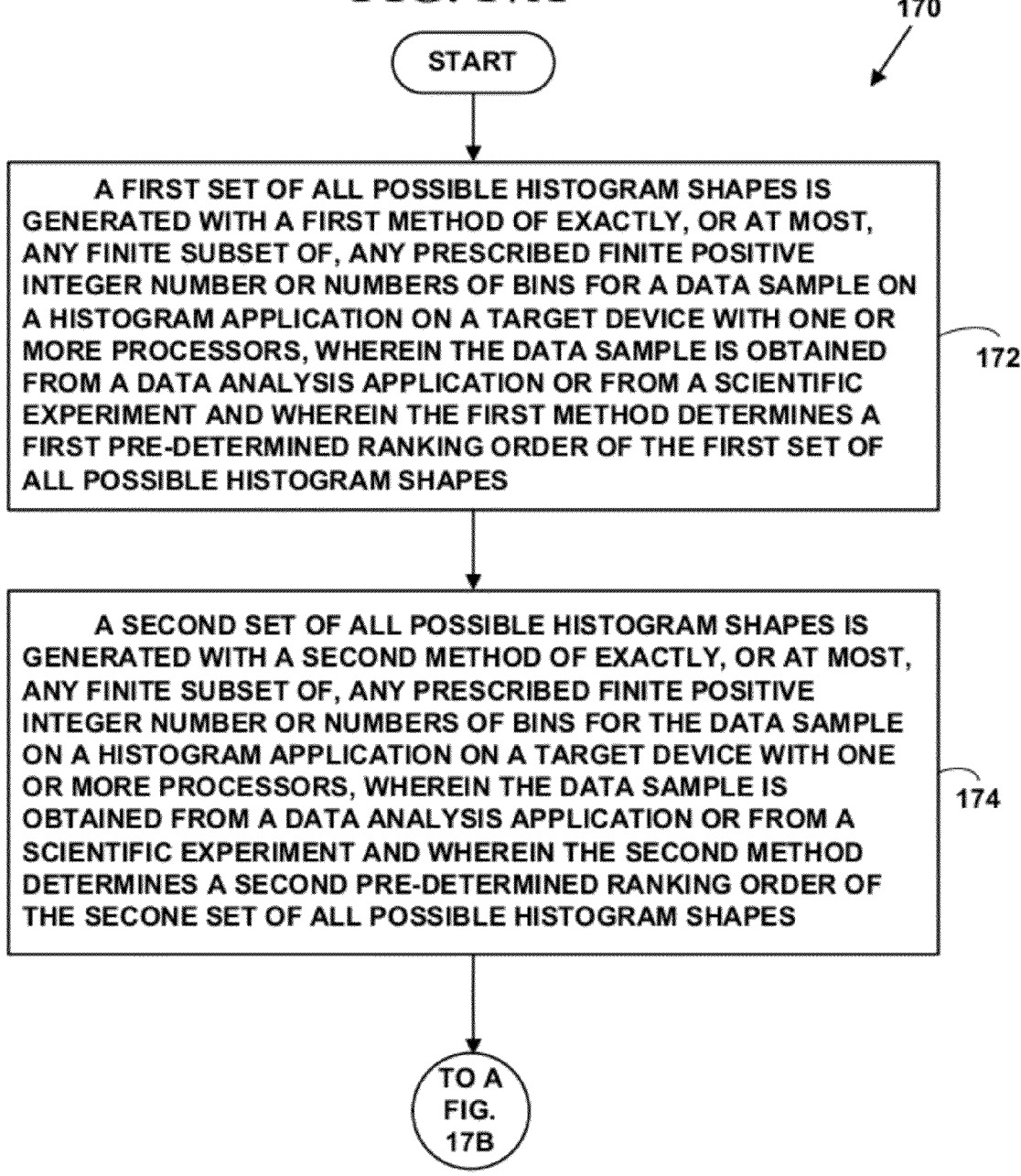

176 — A THIRD BLENDED SET OF POSSIBLE HISTOGRAM SHAPES IS CREATED ON THE HISTOGRAM APPLICATION BY SELECTING GENERATED HISTOGRAM SHAPES FROM THE FIRST SET OF ALL POSSIBLE HISTOGRAM SHAPES THAT INCLUDE HIGHEST RANKINGS FROM THE FIRST PRE-DETERMINED RANKING ORDER AND GENERATED HISTOGRAM SHAPES FROM THE SECOND SET OF ALL POSSIBLE HISTOGRAM SHAPES THAT INCLUDE HIGHEST RANKINGS FROM THE SECOND PRE-DETERMINED RANKING ORDER, WHEREIN A HISTOGRAM SHAPE THAT INCLUDES A HIGHEST RANKING IN A PRE-DETERMINED RANKING ORDER INCLUDES A FIRST NON-EMPTY SUBSET IN A SET OF GENERATED HISTOGRAM SHAPES AND WHEREIN THE HISTOGRAM SHAPE THAT INCLUDES THE FIRST NON-EMPTY SUBSET MAY OCCUR ANYWHERE IN THE RANKING ORDER

↓

178 — A GRAPHICAL HISTOGRAM OF THE DATA SAMPLE IS DISPLAYED USING THE THIRD BLENDED SET OF ALL POSSIBLE HISTOGRAM SHAPES VIA THE HISTOGRAM APPLICATION ON A GRAPHICAL USER INTERFACE ON THE TARGET DEVICE, THEREBY CREATING THE GRAPHICAL HISTOGRAM WITH SET OF ALL POSSIBLE HISTOGRAM SHAPES BASED ON AN AGGREGATION OF RAKINGS ORDERS OF HISTOGRAM SHAPES DETERMINED FROM THE FIRST METHOD AND THE SECOND METHOD

↓

( END )

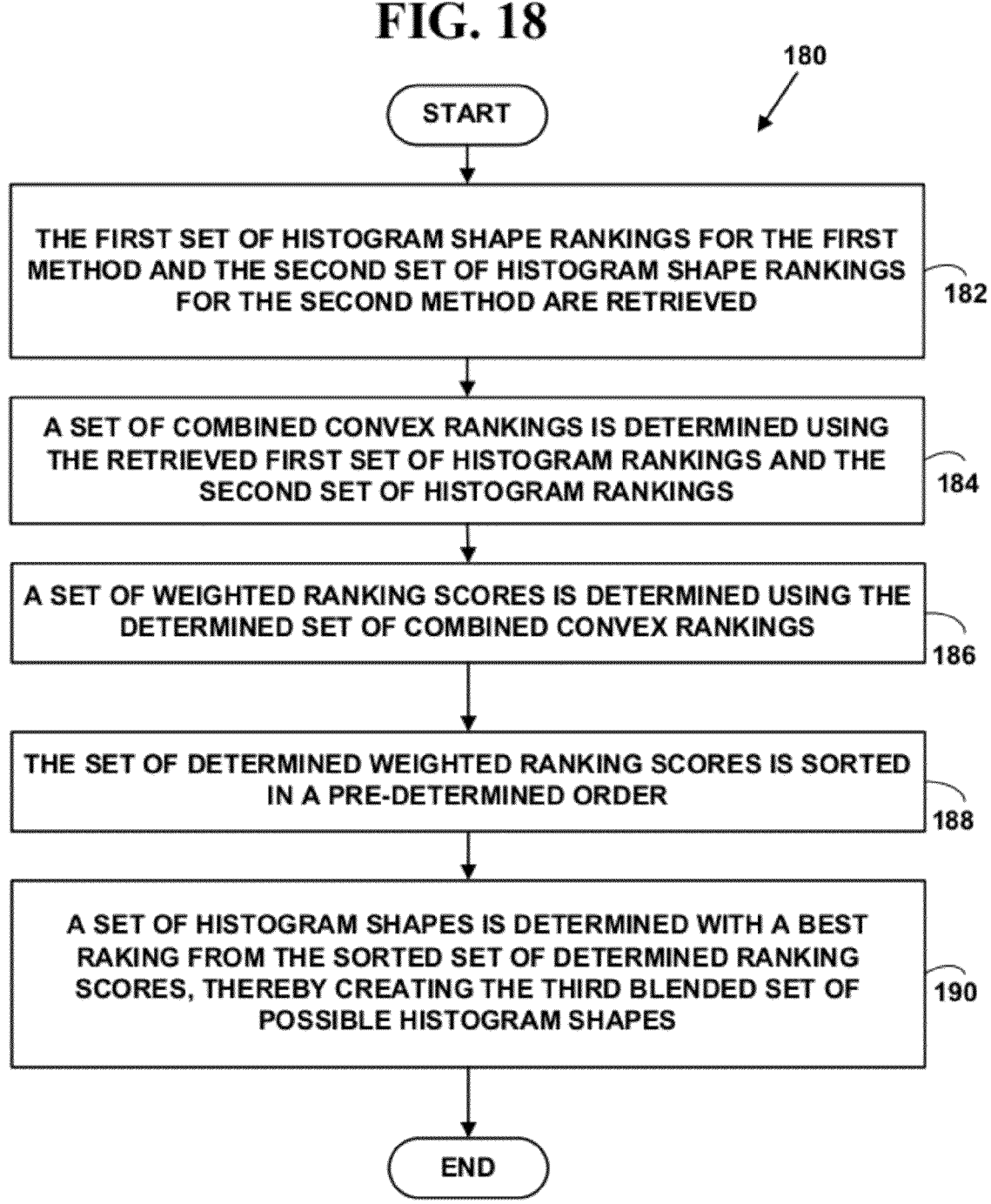

METHOD AND SYSTEM FOR DETERMINING BLENDED HISTOGRAM SHAPE IDENTIFIERS

CROSS REFERENCES TO RELATED APPLICATIONS

This application is a Continuation-In-Part (CIP) of 12/576,329, filed on Oct. 9, 2009 that issued as U.S. Pat. No. 8,131,503, on Mar. 6, 2012, which is a CIP U.S. patent application Ser. No. 12/142,980, filed on Jun. 20, 2008, that issued as U.S. Pat. No. 7,603,254 on Oct. 13, 2009, which is a CIP of U.S. patent application Ser. No. 11/047,018, filed Jan. 30, 2005, which issued as U.S. Pat. No. 7,392,156 on Jun. 24, 2008, which is an application that claims priority to U.S. Provisional Application 60/540,407, filed on Jan. 30, 2004, the contents of all of which are incorporated by reference.

FIELD OF THE INVENTION

This invention relates to analysis of data. More specifically, it relates to a method and system for determining histogram shape identifiers.

BACKGROUND OF THE INVENTION

A histogram is a graphical chart, such as a bar chart, representing a frequency distribution of data elements where the heights of objects in the chart represent observed frequencies of the data elements. There is often a great variability among the many possible histograms of a data sample that are produced.

Histograms have been in use for approximately 300 years, by some accounts since 1662, and perhaps were the first and now are the most widely used graphic for quantitative data. The histogram is the most common graph of the distribution of one quantitative variable. Every year millions of individuals look at and may be influenced by histograms.

However, just as a data sample does not necessarily represent a population, a histogram does not necessarily represent a data sample. The appearance of a histogram of a data sample can be misleading. To make informed use of histograms for a presentation, an analysis or a decision, a choice among many possible histograms is required.

When a histogram appearance is used, if it matters, experts may consider all of the others, with certain knowledge that by using this method and system that the palate has of all the possibilities. Selection and optimality criteria may be applied to the finite set of possible appearances. A clearer understanding is obtained than from simply allowing location and width to vary continuously or haphazardly or according to a procedure unrelated to location and width level sets for the different appearances. It may be of interest to consider issues of human cognition in the context of data grouped with uniformly wide intervals. And in practice, it is, of course, impossible to continuously vary any parameter.

For most samples of data with n data elements, many histogram appearances are possible and many are not. One problem is to determine well defined subsets of all histogram appearances that are possible for a given data sample and to display those histogram appearances and a typical or preferred histogram having an appearance.

Another problem is that for small data samples an error in uniform bin width histograms arises from sampling error and from histogram appearance variability.

Another problem is that is difficult to determine maximum likelihood histogram density estimators for data samples. In 1990, Professor James R. Thompson, presently of Rice University, and Professor Richard A. Tapia published a proof that the well known histogram density for a given sample and arbitrary set of bins, not simply the uniform width bins, is the maximum likelihood density function estimator for a true but unknown density, from among all other step function approximations based on the given set of bins.

Professors Thompson and Tapia did not present a global maximum likelihood among a subset of histograms, such as those with uniform bin widths, using a procedure similar to the procedure that Professor Scott uses to approximate MISE UCV histograms.

Regarding the method of moments, see, for example, Lindgren, 1968, p 278. (Lindgren, B. W. 1968, p 278; Statistical Theory, $2^{nd}$ Ed. MacMillan Company.) Essentially, to fit a density function or other distributional law to a sample, if the density or other distributional law involves k parameters, then the first k sample moments are equated to the first k density or other distributional law moments expressed in terms of the density or other distributional law parameters. This leads to k equations or constraints, in k unknowns. Usually these can be solved for the k parameters values. The density or other distributional law defined by these method of moments parameter values is the method of moments density or other distributional law estimate based on the sample.

Uniform bin width histogram shape level sets to obtain chi-squared minimizing bin parameter values and normal distribution parameter values to make and to implement the estimators were proposed by K. Smith in her circa 1916 Ph.D. dissertation supervised by Karl Pearson and commented upon by R. A. Fisher. However the mathematical details are very demanding and not easily understood.

Thus, it is desirable to provide a new method and system to determine blended histogram shape identifiers for data samples.

SUMMARY OF THE INVENTION

In accordance with preferred embodiments of the present invention, some of the problems associated with creating and selecting histogram appearances, and histograms from data samples are overcome. A method and system for determining blended histogram shape identifiers is presented.

The method and system provide a blended set of possible histogram shapes is created by selecting generated histogram shapes from a first generated set of all possible histogram shapes generated with a first method that include highest order rankings from a first pre-determined ranking order and generated histogram shapes from a second set of all possible histogram shapes generated with a second method that include highest rankings from a second pre-determined ranking order. A graphical histogram is displayed using the third blended set of all possible histogram shapes, thereby creating the graphical histogram with a new set of all possible histogram shapes based on an aggregate rakings order of histogram shapes generated with the first and second methods.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

Figure 6D:
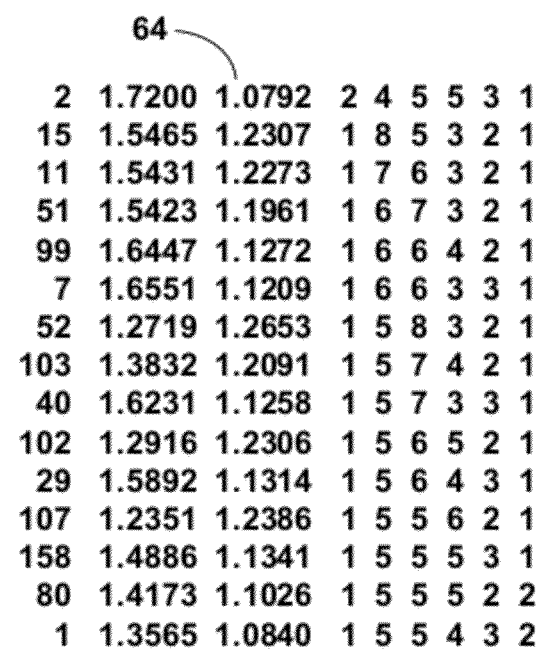

FIGS. 6A-6D are a block diagram illustrating an exemplary set of histogram appearances;

FIGS. 7A, 7B and 7C are a flow diagram illustrating a method for determining all possible histogram appearances from a data sample;

FIG. 8 is a flow diagram illustrating a method for determining all possible histogram appearances from a small data sample and identification or removal of paradoxical appearances;

FIGS. 9-13 are block diagram illustrating fourteen equal bin width histograms and related small data sample data;

FIG. 14 is a flow diagram illustrating a method for determining the UCV MISE error minimizing histogram from among all possible histogram appearances from a small data sample; and FIG. 15 is a flow diagram illustrating a method for determining maximum likelihood histogram density estimators for data samples;

FIG. 16 is a flow diagram illustrating a method for determining minimum likelihood histogram density estimators for data samples;

FIGS. 17A and 17B are a flow diagram illustrating a method for determining blended histogram shape identifiers; and FIG. 18 is a flow diagram illustrating a method for determining blended histogram shape identifiers.

DETAIL DESCRIPTION OF THE INVENTION

Exemplary Histogram Computing System

Figure 1:
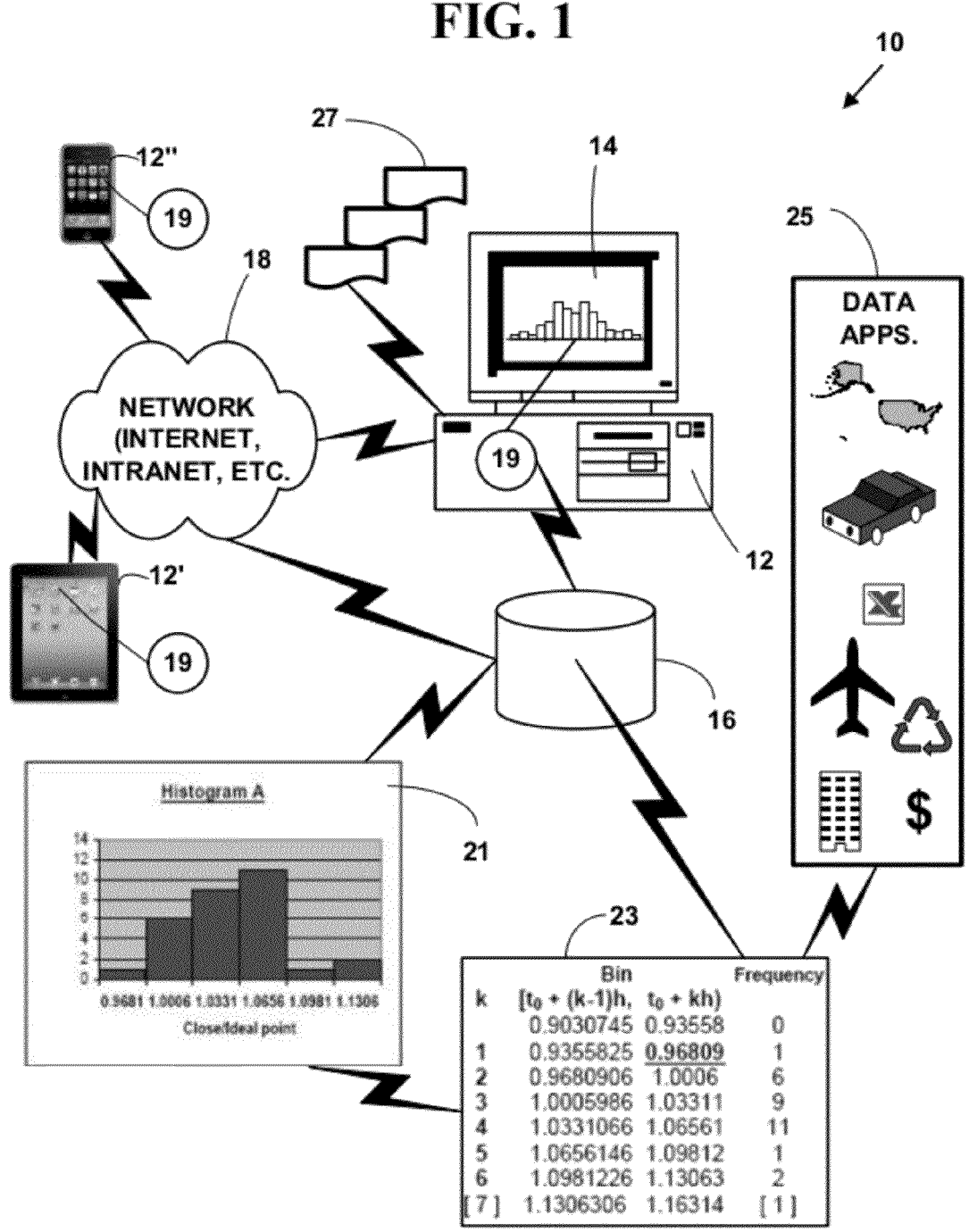
FIG. 1 illustrates a histogram computing system.

FIG. 1 illustrates a histogram computing system 10 for embodiments of the present invention. The histogram computing system 10 includes one or more computers each with one or more processor with computer displays 14 for graphically displaying histograms (only one is illustrated). The computer display presents a windowed graphical user interface (GUI) with multiple windows to a user. The computer 12 is associated with one or more databases 16 (one of which is illustrated) used to store data for the histogram computing system 10. The one or more databases 16 include a memory system within the computer 12 or secondary storage associated with computer 12 such as a hard disk, floppy disk, optical disk, or other non-volatile mass storage devices.

The one or more computers 12 may be replaced with client terminals or other network devices each with on more processors in communications with one or more servers, or with other electronic devices such as a personal digital/data assistant (PDA), a laptop computer, a mobile computer, an Internet appliance, one or two-way pagers, mobile phones, smart phones 12" (e.g., iPhone by APPLE, etc.) tablet computing devices 12' (e.g., iPad by APPLE, etc.) a non-mobile phone or other similar mobile, non-mobile, desktop or hand-held electronic devices.

In one embodiment, the histogram computing system 10 further includes a histogram application 19 that implements the methods described herein. The histogram application 19 is either a stand alone application or an application that is integrated into other applications such as a plug-in for a web-browser, a spread sheet (e.g., Microsoft Excel, etc.), a data analysis application 25 or other types of applications.

In one embodiment, histogram application 19 includes a hardware, and/or a software, and/or a firmware and/or combinations thereof. The various types of histogram applications 19 may be used with or perform operations in accordance with the teachings of the methods and system described herein.

In one embodiment, the histogram application is integral to a data analysis application. The data analysis applications 25 include, but are not limited to, a graphical data display applications, spread sheet applications, educational applications, tutorial applications, web-based, internet and intranet based informational and explanatory applications, engineering finite element analysis applications, environmental applications, geographical applications, geological applications, game theory applications, automotive analysis applications, economic analysis applications, aviation applications, medical applications, pharmaceutical applications, DNA sequencing applications, chemical applications, forensic applications or other applications.

As is known in the art, "engineering finite element analysis" includes methods for analyzing stresses and strains in materials under certain conditions (e.g., air plane wings, building structures, vehicles, ships, etc.)

As is known in the art, "game theory" includes a method of decision-making in which a competitive situation is analyzed to determine the optimal course of action for an interested party, often used in political, economic, and military planning.

The histogram application 19 also can obtain data samples from a database 16, files, spreadsheets, or data accepted via manual input into histogram application 19. Such data samples can be obtained from virtually any source, including but not limited to any scientific experiment. The scientific experiments include, but are not limited to, natural sciences, physical sciences, social sciences, etc. The scientific experiment can be a current or historical scientific experiment.

The natural sciences include, but are not limited to, biology, earth sciences, etc. The physical science include, but are not limited to, astronomy, physics, chemistry, etc. The social sciences include, but are not limited to, anthropology, archaeology, philosophy, communication studies, cultural studies, demography, economics, human geography, history, linguistics, media studies, political science, psychology, social work, and sociology. Although mathematics, statistics, and the computer sciences are not considered natural sciences (mathematics traditionally considered among the liberal arts and statistics among the humanities, for instance), they provide many tools and frameworks used within the natural sciences.

In one embodiment, the histogram application 19 graphically displays graphical histograms 21, including but not limited to, multi-colored graphical entities, multi-colored bar graphs, line graphs, pie-chart graphs, or other types of multi-colored graphs on a graphical user interface (GUI) on a display 14. The graphical displays of histograms 21 are created from one or more unique data samples 23 obtained from one or more data analysis applications 25 as described above. Plural different types of histogram reports 27 are displayed by histogram application 19 on the GUI 14.

The one or more computers 12 are also in communications with a communications network 18 (e.g., the Internet, intranet, Public Switch Telephone Network (PSTN), Local Area Network, (LAN), Wide Area Network (WAN), etc.). The communications includes, but is not limited to, communications over a wire connected to the one or more computers 12, wireless communications, and other types of communications using one or more communications and/or networking protocols.

The network 18 may include a cloud computing network. The cloud computing network includes the cloud computing model described below. However, the present invention is not limited to this cloud computing model and other cloud computing models can also be used to practice the invention. The exemplary cloud communications network includes both wired and/or wireless components of public and/or private networks and/or hybrid networks including one or more portions of public and/or private networks.

This exemplary cloud computing model for intelligent electronic information processing promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

The communications network 18 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

Preferred embodiments of the present invention includes network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, ADSL Forum or other standards bodies or forums. However, network devices and interfaces based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

The one or more computers 12 include a protocol stack with multiple layers based on the Internet Protocol or Opens Systems Interconnection (OSI) reference model.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

As is known in the art, the OSI reference model is a layered architecture that standardizes levels of service and types of interaction for computers exchanging information through a communications network. The OSI reference model separates network device-to-network device communications into seven protocol layers, or levels, each building- and relying— upon the standards included in the levels below it. The OSI reference model includes from lowest-to-highest, a physical, data-link, network, transport, session, presentation and application layer. The lowest of the seven layers deals solely with hardware links; the highest deals with software interactions at the application-program level.

The communications network 18 includes, but is not limited to data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 28 and the present invention is not limited to TCP/UDP/IP.

An operating environment for histogram computing system 10 includes a processing system with at least one high speed Central Processing Unit ("CPU") or other processors. In accordance with the practices of persons skilled in the art of computer programming, the present invention is described below with reference to acts and symbolic representations of operations that are performed by the processing system, unless indicated otherwise. Such acts and operations are referred to as being "computer-executed," "CPU executed," or "processor executed."

It will be appreciated that the acts and symbolically represented operations include the manipulation of electrical signals by the CPU. The electrical system represents data bits that cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

Exemplary Histograms

A sample "S,"$<x_i>$, $i=1, \ldots n$, of size n, is a collection of n selections, either with or without replacement, from a population of possible quantitative observations or numbers. A number of distinct values in S is denoted by $n^* \leq n$ and a value set is denoted by "S*." S* determines appearance level sets of location "e" and width "w" combinations and S determines actual appearances (i.e., repeated sample values do not change the level sets, only the appearances. A "level set" for a function is a set of points for which a function has a constant value or constant list of values. That is, in this context, "value" is a list of frequencies, that is, an appearance.) It is understood that every integer of a list of integer frequencies remains unchanged for all of histograms corresponding to any (e, w) point within a same histogram appearance level set. Repeated values add only minor details to the study of appearance reversals. A sample or the value set, $x_i$ is in its rank order form, denoted "$x_{(i)}$," when $x_{(i)} \leq x_{(i+1)}$, i=1, 2, ... n for sample points or $x_{(i)} < x_{(i+1)}$, i=1, 2, ... n* for distinct values.

A "frequency histogram" is a graphic showing frequencies of sample points in equal width adjacent histogram intervals. In one embodiment, closed histogram intervals "[a, b]," with a<b, are used. In another embodiment, half-open histogram intervals "[a, b)," with a<b, are used so that there is no ambiguity regarding sample values that are the same as interval end points. (That is, according to standard definition of the expression "[a,b)", well known in both the statistical arts and mathematical arts, a sample point "a" is included in the interval [a,b), whereas the point "b" is not included in the interval [a,b), but in the successor interval, [b, (b+(b−a))). Other notation reflecting this definition is that [a,b) is defined to be a set of values, x, such that b≤x<a. However, the present invention is not limited to such an embodiment or using half-open intervals or assigning a count of one point to only one interval. For example, some conventions assign one-half for a point that equals an interval end point to each of the intervals separated by such an end point value. Other kinds of intervals and conventions can also be used to practice the invention. Moreover, in one embodiment, an equality of a sample value or many sample values to an interval endpoint is precise. The appearance level sets are distinct for the equality or lack there of any sample value to any interval end point.

A "histogram appearance" or simply "appearance" of a histogram is a list, $a_k$, of counts of sample points corresponding to a list of histogram intervals, wherein first and last counts, $a_1$, $a_{last}$, are positive. A histogram "appearance" is also a resulting "shape" of the list. The terms "shape," "histogram shape," "shape of a histogram" are more common in the statistical and mathematical literature than the terms "appearance," "histogram appearance," "appearance of a histogram." However, the term histogram "appearance" is used synonymously for histogram "shape" herein.

For any possible appearance and fixed sample, an appearance can be achieved with interval end points (e.g., [1, 2)) that do not equal any sample values, provided the end points can be chosen after the sample is taken. Half open intervals remove interval ambiguity if a data sample value equals an interval endpoint, in advance of selecting a sample. In one embodiment, frequencies, not relative frequencies are used. However, the present invention is not limited to frequencies and other types of frequencies, such as and especially relative frequencies can also be used to practice the invention.

A "histogram sequence" is a sequence, $h_k$, of counts of sample points corresponding to some sequence of histogram intervals. An index, k, ranges from −∞ to +∞ even though all but finitely many counts, $h_k$, are zero. That is, a histogram sequence, $h_k$, is like a histogram appearance, $a_k$, but is a sequence, not a finite list and does not have the restriction that $h_1$ is the first positive frequency.

Sequences of intervals and finite lists of intervals for histograms are denoted by {[e+(k−1)w, e+kw)|k=−∞ to +∞, or k=1 to K}. Changing a location parameter, "e," by a multiple of "w," a width parameter, leads to a different enumeration of a same set of intervals, a same partition of a real number line, a same graphic appearance, but a shifted histogram sequence. The enumeration intended for a histogram appearance is one wherein the k=1 corresponds to the first interval from left to right having one or more sample values. As is known in the mathematical notation for statistical arts, use of "[" and ")" is a common notation indicating half open intervals as used by M. G. Kendall and A. Stewart *The Advanced Theory of Statistics*, $3^{rd}$ ed., Vol. 1. London: Griffin Publishing (1969).

A positive "affine transformation" on a real line is a linear transformation followed by a translation in a form A(x)=Mx+v, wherein M>0. A "translation" is moving an origin or a coordinate system to another location while keeping directions of coordinate axis in a same direction. A positive affine transformation of a data sample has a same set of histogram sequences and appearances as an original data sample. That is, an affine transformation will not change an order of data values or relative separation of data values. Consequently a positive affine transformation does not change a count of sample points in each half open interval. A negative affine transformation of a data sample, in the form A(x)=Mx+v, wherein M<0, reverses the appearances. That is, if A(x) is a negative affine transformation of the data sample, the every appearance of the data sample will have a reversed appearance in the transformed data sample, if M<0.

For a given data sample, an existence of a prescribed appearance, $a_k$, is equivalent to an existence of e and w that satisfy a system of K inequalities as shown by Equation (1).

$$\{e+(k-1)w \leq \text{the corresponding } a_k \text{ values of } x_{(i)} < e+kw$$
$$\text{for } k=1 \text{ to } K, \text{ the index of the last positive count}$$
$$\text{of } a_k\} \quad (1)$$

In this description the term "Equation" is used for simplicity even though an Equation may include a series of equations or inequalities as is illustrated by "Equation" (1) or multiple equations that are not a system of equations. In Equation (1), K is a number of intervals between and including a first and a last having sample values within the intervals.

A sample, "S," has an appearance, $a_k$, if and only if a linear program defined by the K inequalities, in Equation (1) is feasible, wherein e and w are decision variables. An optimizing activity can be indicated such as maximizing or minimizing the interval width, w.

Having a $x_{(i)}$ sample value in the $k^{th}$ interval is equivalent to satisfying an inequality shown as Equation (2).

$$e+(k-1)w \leq x_{(i)} < e+kw \quad (2)$$

The set, {(e, w)}, of possibilities for (e, w) can be described in an $R^2$ plane but does not always lead to the "appearances." Appearances are defined as lists wherein $a_1 > 0$, etc. Since e can vary by multiples of w, leading to the same visual appearance, $b_k$, but translated, i.e., $b_k = a_{k+q}$ for some integer q, for k=1 to K, identical partitions of a real line may lead to different enumerations of the intervals and different histogram sequences.

Note that the notation $R^2$ as used here denotes the two dimensional Cartesian co-ordinate plane, NOT as is known in the statistical arts, the $R^2$ that is a squared multiple correlation also called the coefficient of determination as defined by $R^2 = 1 - $"Residual Sum of Squares"/"Total Sum of Squares", wherein, the terms "Residual Sum of Squares" and "Total Sum of Squares" are very well known in the statistical arts.

An existence of an appearance for a data sample is equivalent to a system of inequalities. The system that corresponds to the existence of one appearance leads to systems associated with all possible appearances. The inequalities lead to a partition of the space of end point and width values, {(e, w)}, into histogram sequence level sets in $R^2$. If $R^2$ is restricted then histogram sequence level sets corresponding to translations of other histogram sequences can be eliminated to obtain a bounded exhaustive domain for level sets for arbitrarily numerous although finite in number subsets of appearance level sets in $R^2$.

Each level set may be defined by the: (1) vertices of the polygon of intersecting lines as previously described; or (2) binding constraints for each feasible appearance together with all of the other non-binding constraints for the sample values the placement of which leads to a non binding linear inequality. Thus, an appearance of a histogram is simply the list of frequencies beginning and ending with first and last frequencies that are positive.

Exemplary Histogram Computing Methods

Figure 2:
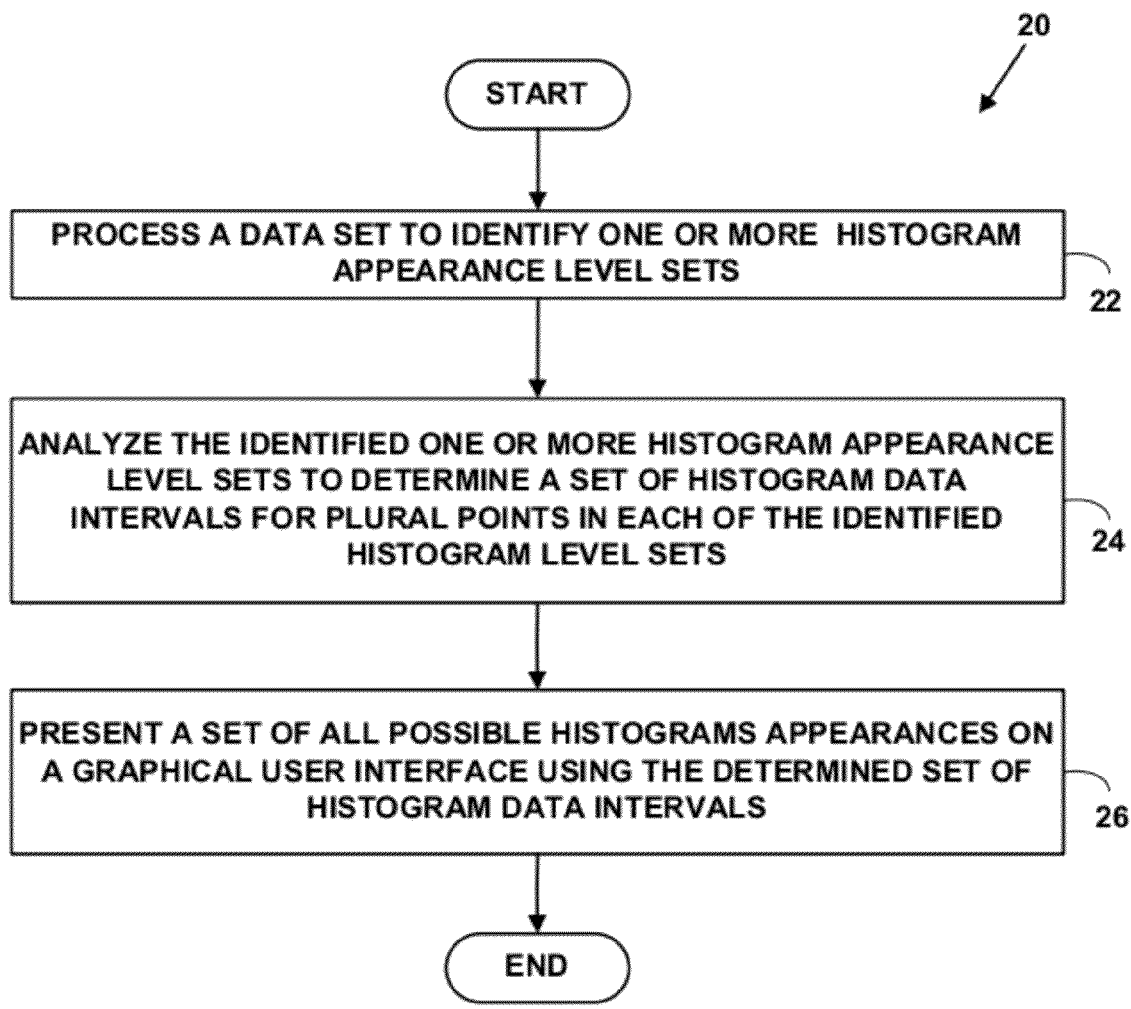
FIG. 2 illustrates a method for determining all possible histogram appearances from a data sample.

FIG. 2 is a flow diagram illustrating a Method 20 for determining all possible histograms in a data sample. At Step 22, a data sample is processed to identify one or more histogram appearance level sets. At Step 24, the identified histogram appearance level sets are analyzed to determine a set of possible histogram data intervals for plural points in the identified histogram appearance level sets. At Step 26, plural histogram appearances are presented on a graphical user interface using the determined set of possible histogram data intervals.

In Method 20, determining all possible histograms includes determining polygons of pairs of uniform histogram interval width location and width values. Only a well defined subset of histogram appearances that is finite in number can be determined. Such a determination corresponds to finite numbers of polygon level sets as is described below. An interior, edges and vertices of polygons correspond to slightly different situations. An edge or vertex differs from an interior with respect to some sample values being equal to some interval end points, and, moreover, being boundaries between different appearance level sets.

Method 20 is illustrated with several exemplary embodiments. However, the present invention is not limited to exemplary embodiments, and other embodiments can be used to practice the invention.

In one exemplary embodiment, at Step 22, histogram appearances for histograms having data interval widths greater than or equal to any strictly positive value, for histograms with equal width intervals are identified and extracted. The appearance of a histogram is an enumeration of data counts in each interval, such that a first and a last counts is positive, and not enumerating counts of zero before the first positive count or after the last positive count. The enumeration of the first positive count is one (1). The first positive count is the count associated with an interval with a smallest sample value.

In another exemplary embodiment, at Step 22, histogram appearances having at most K intervals between and including a first and a last that have sample points, for histograms with equal width intervals, are identified and extracted. The appearance of a histogram in this embodiment is the same as in the previous embodiment, namely an enumeration of data counts in each interval, such that the first and last counts are positive and not enumerating counts of zero before the first positive count or after the last positive count. The enumeration of the first positive count is 1 (one). The first positive count is associated with the interval with a smallest sample value.

In another exemplary embodiment, at Step 22 different enumerations of the intervals and counts as well as including an arbitrary number of leading or trailing counts of zero are used as well as equal or different numbers of both leading and trailing counts of zero. Certain applications may benefit from such an embodiment, such as a simultaneous analysis of appearances of two or more samples as well as an analysis of histogram appearances of multidimensional data samples, multidimensional histograms, or multidimensional histogram appearances. However, in such instances, it is not expected that several samples all will have data values in a same first interval or that for multidimensional data samples, that a same first interval will have data values in every dimension.

In another exemplary embodiment at Step 22, all possible histogram appearances having plural different or equal location parameter values, interval widths, numbers of intervals between and including a first and last interval having sample points are identified.

In another exemplary embodiment at Step 22, all possible equal interval width and location combinations are identified that lead to a given histogram appearance, for a given data sample, if possible. This identification includes polygonal subsets in a two dimensional plane of real numbers, wherein one dimension corresponds to an interval end point location parameter, "e," and another dimension corresponds to an interval width parameter, "w." Hence an identification of all possible histograms associated with an appearance, for a given sample, is determined.

In another exemplary embodiment at Step 22, vertices of polygons formed by the intersection of a set of straight lines in the plane $R^2$ are identified. This is not the same as simply solving all of the pairs of straight lines and listing the vertices. What is provided is the set of subsets of the points of intersection that are associated with each polygon. This embodiment can also be used in isolation, apart from Method 20 for finding possible histogram appearance level sets of location and width parameter combinations. The polygon vertices make explicit a polygonal partition of a plane resulting from a set of lines, where lines are defined as level sets of linear functions. Such a stand alone procedure may have applications in finite element numerical methods.

In another exemplary embodiment at Step 22, vertices of regions formed by an intersection of a set of level curves in a plane $R^2$. This is not the same as simply solving for the intersection of all of the pairs of graphs and listing the vertices. The set of subsets of points of intersection that are associated with each level set polygon thus formed is identified. The embodiment can also be used in isolation apart from Method 20 for nonlinear level sets. Such a stand alone procedure may also have applications in finite element numerical methods.

In another exemplary embodiment at Step 22, all one dimensional histogram appearances using constant width intervals are identified. The constant width intervals are greater than or equal to a pre-determined positive minimum width.

In another exemplary embodiment at Step 22, all histogram multidimensional appearances with data cell boundaries that are parallel as well as not parallel to data space axes are identified. The multidimensional widths may satisfy separate pre-determined positive minimum widths for each dimension or a common positive minimum width. The multidimensional interval widths may all be the same or may be independent of one another.

Additional details for the various described embodiments of Step 22 are presented. A data sample, $(x_i)$ is used. Let $R^2/H(\delta_1)$ denote $R^2$ from which a horizontal band, $H(\delta_1)=\{(e, w)|\,|w|<\delta_1\}$, wherein $\delta_1$ is a pre-determined positive value, has been deleted. A system of equations is illustrated by Equation (3).

$\{x_i = e + kw | i, k \text{ integers}; i=1, \ldots n^* \text{ the number of sample values}\}$;

$k=1, 2, \ldots K$ the number of intervals between and including the first and last that contain sample values;

$$K \leq [\text{Range of } \langle x_i \rangle / (\text{Min}_{xi \neq xj} |x_i - x_j|)] + 1\}. \quad (3)$$

The system of equations given by Equation (3) partition a deleted plane, $R^2/H(\delta_1)$, into at least three kinds of histogram sequence level sets as is illustrated in Table 1. However, the present invention is not limited to the system of equations in Equation (3) or the three kinds of histogram sequence level sets illustrated in Table 1 and other systems of equations and more or fewer kinds of histogram sequence level sets can also be used to practice the invention.

TABLE 1 i) interiors of polygon and cone intersections;
ii) edges of polygon and cone intersections; and
iii) vertices of polygon and cone intersections Considering the Equations indicated by Equation (3) and Table 1, for each $x_i$, (or $x_{(i)}$) inequalities (e+(k−1) w≤x, <e+kw) define cones in $\{(e, w)\}$ that have a point $x_i$ in a $k^{th}$ interval, [e+(k−1) w, e+kw). This increases by one a $k^{th}$ term in a histogram sequence, $h_k$. The intersections of these cones create a polygonal and conic partition of $R^2$. By definition, within an interior of each polygon or cone of the intersections there are no line boundaries of a form "$x_i$=e+kw." Consequently, for all (e, w) location and width parameter pairs in an interior of a polygon or intersection of cones, each sample value is within the interior of an interval having a fixed index, "k" or "k($x_i$)" or "k($x_{(i)}$)" for some histogram sequence. Hence intersection interiors and similarly edges and vertices are level sets for histogram sequences.

The interiors are the (e, w) level sets such that no histogram interval end point equals any data value, $x_i$. The edges are (e, w) level sets such that one histogram interval endpoint equals a data value. The vertices are the (e, w) level sets such that two or more histogram interval end points equal data values.

In one embodiment, a positive affine transformation is used to map a value set of a sample into the interval [1, 2], wherein a minimum value is transformed to a value of one and a maximum value is transformed to a value of two. The interval "[a, b]" is a closed interval and includes both of its end points. The maximum value in a sample is transformed to the value two. The minimum value is transformed to one. All the other values are in between 1 and 2. However, the present invention is not limited to this embodiment and other transformations and other intervals can also be used to practice the invention. An inverse transform returns transformed values in the interval [1, 2] to a range of sample values. Repeated values in the sample, if any, show up when histogram appearance is created with a transformed sample, or the inverse transform (e, w) values and the original sample points.

A transformed space including the sample as a subset of [1, 2] is denoted by $R^{2*}$ and transformed sample points and values are denoted by $x_i^*$. The use of parentheses around the index, $x_{(i)}^*$, indicates rank ordered sorted values or sample points. In the transformed space wherein sample values are in the interval [1, 2], e, w, $\delta_1$, $\delta_2$ are meaningful when subjected to the same unique positive affine transformation or an appropriate inverse, that brought the sample into the interval [1, 2]. Note that for the appropriate transformation and inverse transformation for interval widths are Mw or w/M and no translation is done for transformations of the interval width.

The equations indicated by Equation (3) and Table 1 lead to a partition of (e, w) values into histogram sequence level sets for a particular sample. Visual appearance level sets are unions of disjoint level sets for infinitely many histogram sequences that all have the same visual appearance. However only one histogram sequence, $h_k$, can be an appearance, after truncating infinity many zero terms coming before the first positive count or after the last positive count. Zero terms between the first and the last positive counts are not truncated or deleted. Either sketching the situation on a usual (x, y) plane identified as (e, w) or shifting e by multiples of w makes this clear.

The equations indicated by Equation (3) and Table 1 lead to level sets for an arbitrary number of histogram sequences with a same visual appearance. However, in the transformed space most of $R^{2*}$ is excluded so that one representative histogram sequence level set remains for each appearance.

Consider the space of transformed values. Define B as an upper bound for a maximum distance from an origin, (0,0), of the intersection of any of lines of the form "$e^*+kw^*=x_i^*$." Here B=an intersection of lines "$e^*+kw^*=1$" and "$e^*+(k-1)w^*=2$". A formula for B in terms of K (or K=the smallest integer greater than or equal to 1+1/(min transformed width, $\delta^*$)), or 1+Range/(minimum untransformed width, $\delta$)) is shown in the figures. The bounded subset, $B^*$ of $R^{2*}$, indicated by Equation (4), below, includes the level sets for all histogram sequences for which $a_n > 0$ for n=−K and $a_n$=0 for n<−K. K is an integer and $B^*$ may be made as large as is feasible for a computing system. $B^*$ explicitly extends the patent to all computable histogram sequences. However, in most instances only appearances are needed and only a minimal $\{(e^*, w^*)\}$ set, $D^*$ or $D_1^* $ union $D_2^*$ is used.

$$B^* = [-(B+1), (B+1)] \times [-(B+1), (B+1)] / H(\delta) = \{(e,w) | |e| \leq (B+1), 0 < \delta \leq |w| \leq (B+1)\}. \quad (4)$$

Since a horizontal strip of width two $\delta^*$ is omitted, $B^*$ is comprised of two rectangles including all intersections of lines "$e+kw=x_i^*$," for k=1 to K. Polygons formed by these lines within B are level sets for histogram sequences wherein an index for an interval including $x^*_{(1)}$ is at least (−K).

Figure 3:
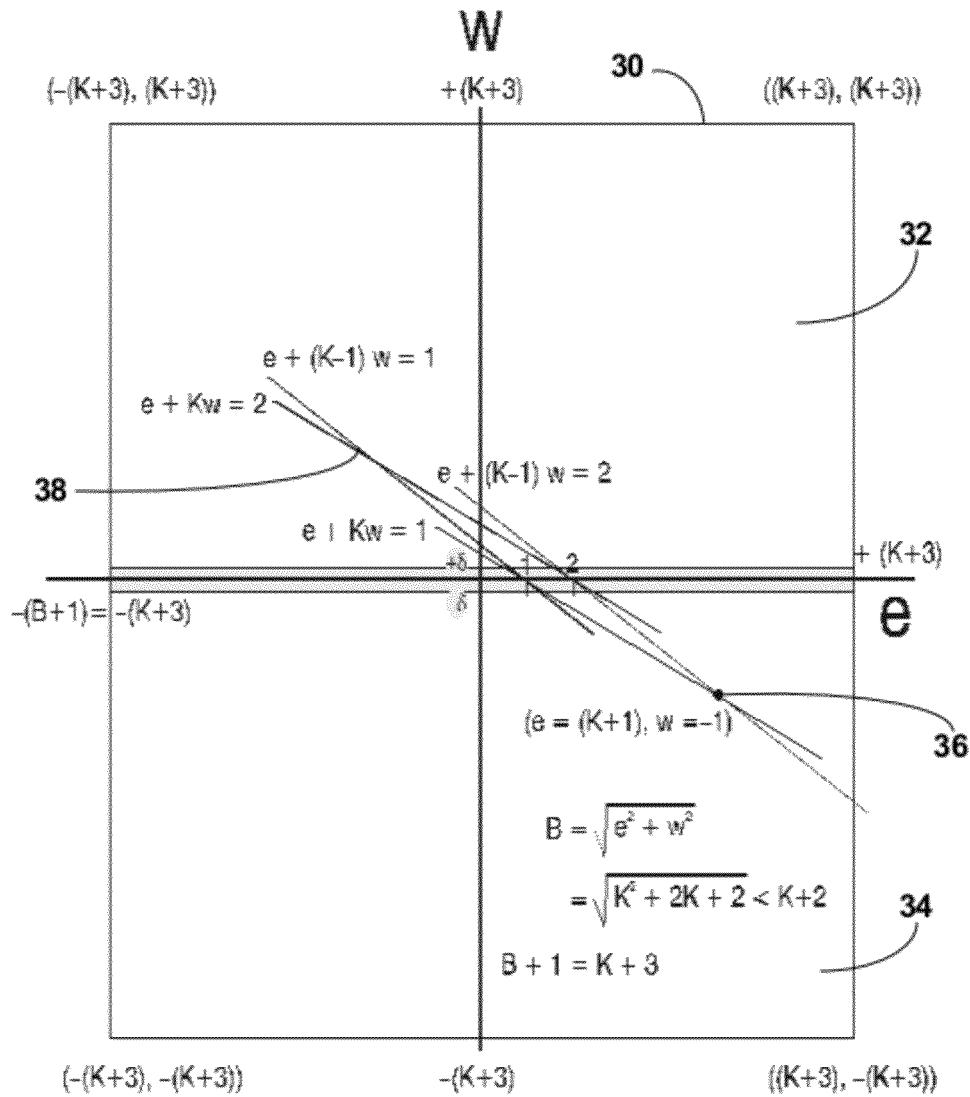
FIG. 3 is a block diagram graphically illustrating a box in $R^{2*}$.

FIG. 3 is a block diagram 28 graphically illustrating a box in $R^2$.

The notation indicated by Equation (4) defines a bounded subset of $R^2$ having level sets for a finite set of histogram sequences. The bounded subset in Equation (4) is a square 30 including two rectangles 32, 34 within which level sets are determined for a finite but representative and well defined subset of all histogram sequence level sets.

Consider the subset defined by Equation (4). A transformed space $\{(e^*, w^*)\}$, is transformed according to $e^* = \alpha e + \beta$, $w^* = \alpha w$ for $\alpha, \beta$ so that Min $\{x_i\} \to 1$, Max $\{x_i\} \to 2$, etc. $\delta_1^* = \text{Min}_{xi^* \neq xj^*} |x_i^* - x_j^*|$, or any value $\epsilon(0, 1)$. The system of inequalities (1) also applies within $B^*$ to show that a partition of rectangles in $B^*$ by lines $x^*_{(i)} = e^* + kw^*$ leads to distinct, connected polygonal level sets for histogram sequences.

Note that FIG. 3 is drawn to be easily readable and understandable. However the point of intersection marked with a dot 36 actually would be rotated counter clockwise very close to the upper boundary and upper right hand corner of the lower rectangle 34. If this is done, then the intersecting lines will be nearly parallel, as in fact they really are, but then the figure would be too difficult to read. The other marked intersection 38, to be exactly correct, similarly should be rotated counter clockwise nearly to the lower boundary and lower left hand corner of the upper rectangle 32.

Figure 5:
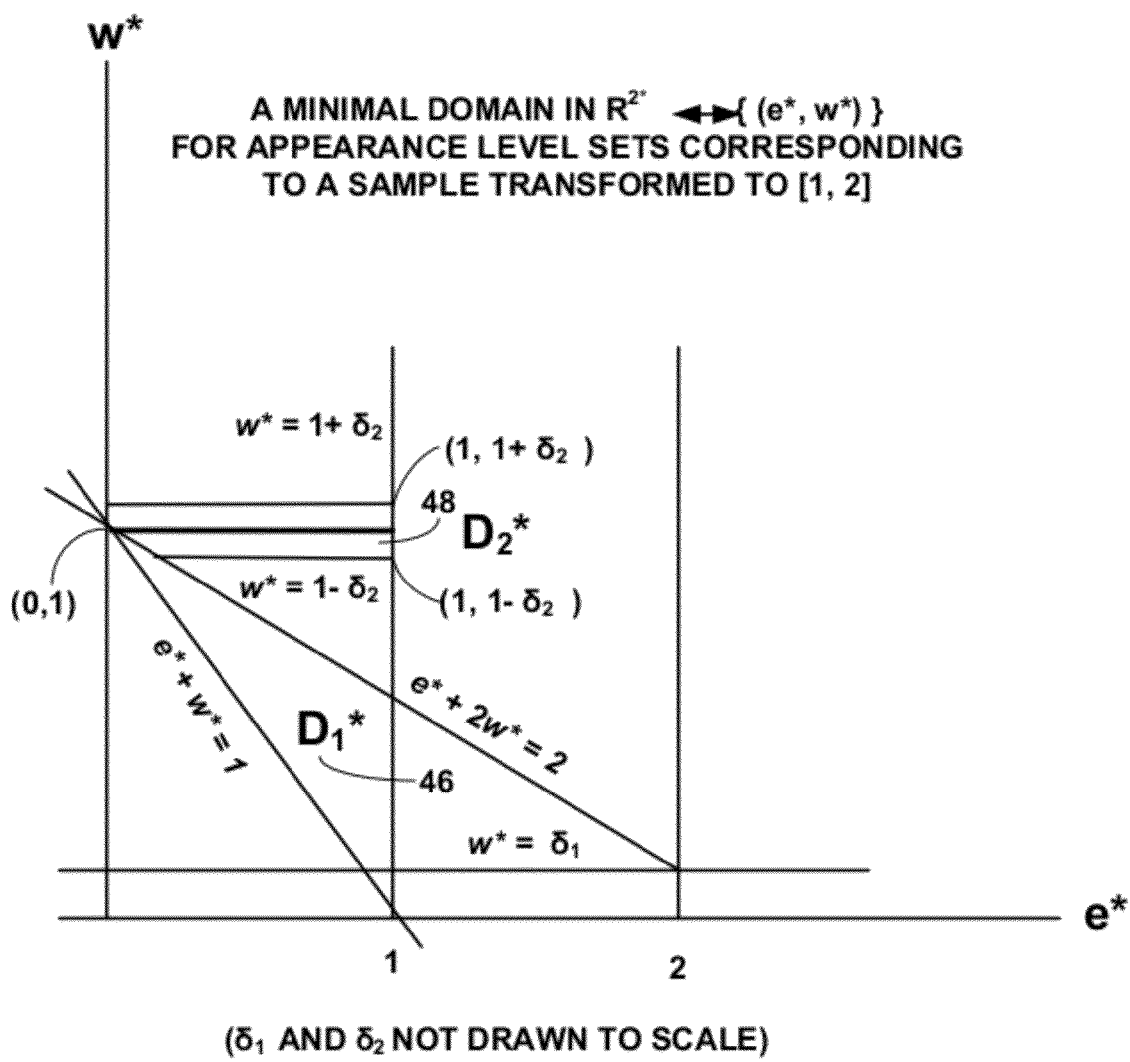
FIG. 5 is a block diagram graphically illustrating a minimal domain in $R^{2*}$.

Equation (5) defines a bounded subset of $\{(e^*, w^*) | (e^*, w^*) \in R^{2*}\}$ within which each visual appearance has only one level set for the sequence such that $h_k = 0$ for all k≤0 and $h_1 \geq 1$ as is discussed below. Equation (5) defines a subset of $R^{2*}, D^*$, that is sufficient. FIG. 5 shows necessary conditions that are used for one embodiment. That is, regions $D_1^*$ and $D_2^*$ shown in FIG. 5 are sets of $(e^*, w^*)$ points of which a dense subset is necessary for one embodiment to be capable of having points from every level set of every appearance for any sample. However, other conditions can also be used and the present invention is not limited to these conditions.

Transformed space $\{(e^*, w^*)\}$, transformed according to $e^*=\alpha e+\beta$, $w^*=\alpha w$ for $\alpha,\beta$ so that Min $\{x_i\} \to 1$, Max $\{x_i\} \to 2$, etc. $\delta_1 = \text{Min}_{xi^* \neq xj^*}|x_i - x_j|$, or any value $\epsilon(0, 1)$. Subset $D^*$, $\{(e^*, w^*)\}$, of the $R^{2*}$ transformed $R^2$ representation of $\{(e, w)\}$ is defined as shown below in Equation (5).

$$D^*\{(e^*,w^*) | 0 \leq e^* \leq 1 < e^* + w^*, \delta_1 \leq w^* \leq 1+\delta_2\} \quad (5)$$

Figure 4:
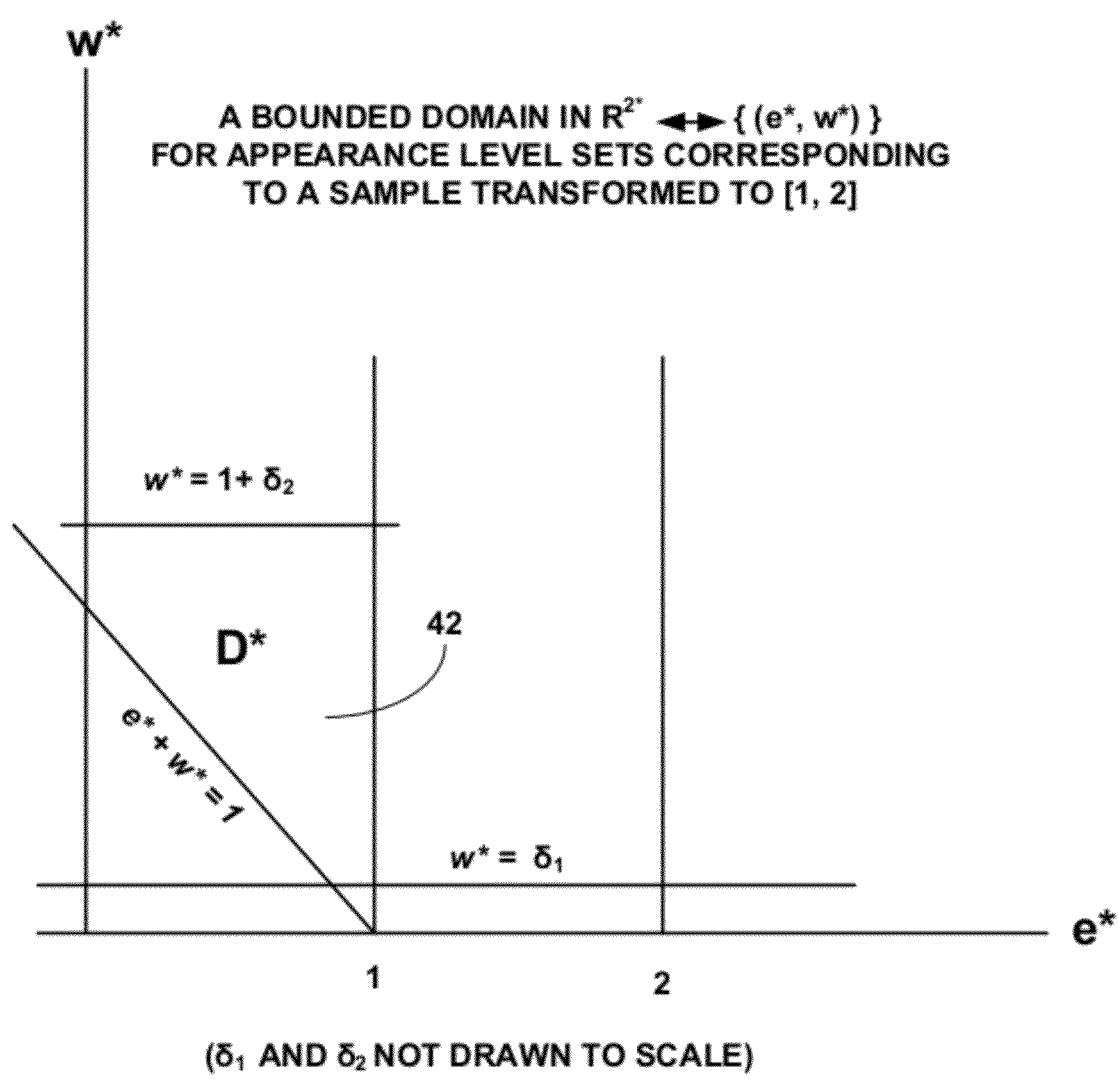
FIG. 4 is a block diagram graphically illustrating a bounded domain in $R^{2*}$.

FIG. 4 is a block diagram 40 graphically illustrating a bounded subset in $R^{2*}$.

A bounded subset $D^*$ 42 for $\{(e^*, w^*)\}$ in transformed space $R^{2*}$ is sufficient for finding exactly one level set for a well defined subset of possible histogram appearances of a transformed sample in the interval $[1, 2]$, for cell widths $\epsilon [\delta_1, 1+\delta_2]$. Moreover, a histogram sequence for each appearance level set is the one for which $h_1 > 0$ and $h_k = 0$ for all $k < 1$. With $\delta_1$, defined as $\delta_1 = \text{Min}_{xi^* \neq xj^*}|x_i^* - x_j^*|$, above, the finest partition counts the closest distinct values in adjacent half open cells).

To prove that $D^*$ 42 is sufficient to reveal all possible histogram appearances, notice that each excluded part of $R^{2*}$ is associated with at least one of the following three possibilities illustrated in Table 2. However, more or fewer possibilities may also be used and the present invention is not limited to these possibilities.

TABLE 2

1. Appearances or situations that are not of interest;
2. Partitions that are identical to partitions generated from $(e^*, w^*)$ values in $D^*$; or
3. Interval and histogram sequences leading to appearances that are identical to appearances from $(e^*, w^*)$ values that are in $D^*$.

The histogram sequence that is associated with a level set in $D^*$ is one defined to be an appearance of a histogram, namely the sequence for which $h_1 > 1$ and $h_k = 0$ for $k < 1$, etc.

In the $R^{2*}$ plane, Table 3 illustrates exemplary steps for defining $D^*$. However, more or fewer steps for defining $D^*$ may also be used and the present invention is not limited to these steps.

TABLE 3

A. Undefined or not of interest
  1. Exclude $w^* = 0$ since histograms and appearances are undefined for $w^* = 0$.
  2. Exclude $0 < w^* < \delta_1$, (or $0 < |w^*| < \delta_1$) since histograms with small interval widths are not of interest.
B. Same Partition of $R^1$
  3. Exclude $w^* < 0$ (or $w^* \leq -\delta_1$, in view of (2) above) since the partition for $|w^*|$ is identical.
  4. For $\delta_1 \leq w^* \leq 1$, exclude $\{(e^*, w^*) | e^* < 0$ or $1 < e^*$ and $\delta_1 \leq w^* \leq 1\}$. For $\delta \leq w^* \leq 1$, for all $e^*$ not within $[0, 1]$ there exists $e\#$ included in $[0, 1]$ such that $e\# = e^* \pm q w^*$, wherein $q$ is an integer. Moreover, $e\# \leq 1 < e\# + w$. Hence for all $e^*$ not included in $[0, 1]$, there is an $e\#$ in $D^*$ leading to the same partition.
C. Same Histogram Appearance
  5. Exclude $w^* > 1 + \delta_2$, for small $\delta_2 > 0$. $w^* = 1$ leads to histogram appearances of the form $(n-p, p)$, $p$ an integer, $1 \leq p \leq (n-1)$. For completeness, half open intervals $[\_, \_)$, are used with $\delta_2$, to obtain the appearance $(n)$.
  6. For $1 < w^* \leq 1 + \delta_2$ exclude $\{(e^*, w^*) | e^* < 0$ or $1 < e^*$ and $1 < w^* \leq 1 + \delta_2\}$. For $w^*$ such that $1 < w^* \leq 1 + \delta_2$, TABLE 3-continued for all $e^*$ not within $[0, 1]$ there exists $e^*$ included in $[0, 1]$ leading to the same appearance, even if not the same partition.
  7. Exclude $\{(e^*, w^*) | e^* + w^* < 1\}$ since $a_1 \geq 1$ and the use of $\frac{1}{2}$ open intervals, $[\_, \_)$ requires $1 < e^* + w^*$.

The equations indicated by Equation (3) and Table 1 also applies within $D^*$ to show that a partition of $D^*$ by lines $x^*_{(i)} = e^* + kw^*$ leads to distinct, connected polygonal level sets for histogram sequences with an additional requirement that $h_1 \geq 1$. That is, $e^* \leq 1 < e^* + w^*$, together with $x^*_{(1)} = 1 \Rightarrow h_1 > 1$ and $h_k = $ zero for all $k < 1$. Hence a histogram sequence corresponding to a polygon level set in $D^*$ corresponds to a histogram appearance.

Otherwise uninteresting histogram appearances of the form $(n-p, p)$, $0 \leq p \leq n-1$, for $\{(e, w) | 2 < e + 2w$, and $e + w \leq 2 + \delta_2\}$ are included simply to account for all of the possibilities and to have one level set for each histogram appearance for data interval widths greater than some minimum; or for all appearances having at most K intervals between and including the first and the last intervals having sample points, wherein K is a prescribed maximum number of such intervals.

A sufficiency of $D^*$ for having $(e^*, w^*)$ values leading to every appearance of interest of a sample, without disjoint level sets for histogram sequences that are translations of the appearance is a consequence of Table 3. In one embodiment, for a fixed sample, all of $D^*$ is not necessary. For a fixed sample, a finite set having one point from each appearance level set is sufficient for calculating and listing all of the histogram appearances for a sample for interval widths greater than or equal to a pre-determined positive minimum value, or for a prescribed maximum number of intervals between and including the first and the last interval that include sample points.

A necessary condition for subsets, $D^{**}$, of $D^*$, to have a representative for every histogram appearance for all possible samples is presented. This condition is important because also it leads to showing the inadequacy of other methods of finding all of the appearances for all possible finite samples for histogram data intervals having a width greater than or equal to a prescribed positive minimum value; or appearances having at most some prescribed integer number of intervals between and including the first and the last that include sample points.

Working in the range $[0, 1]$ of the transformed $(e^*, w^*)$ values, instead of the untransformed space of the sample and corresponding $(e, w)$ values, makes the most difference in finding minimal representative sets for $\{(e, w)\}$, for arbitrary samples. In the untransformed $\{(e, w)\}$ space, for arbitrary samples, arbitrarily large numbers of selections from an arbitrarily large range are present. In $\{(e, w)\} \subseteq R^2$, a dense subset of $R^2$, $w >$ zero is needed, instead of a dense subset of part of $D^*$. Without transforming the $(e, w)$ values to the interval range $[1, 2]$, a dense subset of $R^2$ is necessary.

FIG. 5 is a block diagram 44 graphically illustrating a minimal domain in $R^{2*}$.

$D^{**}$ is a subset of $D^*$ such that location and width values for any possible appearance for any sample can be found. In finding all histogram appearances via $(e^*, w^*)$ values from a subset $D^{**}$ of $D^*$, $D^{}$ is a union of a dense subset, $D_1^{}$, of $D_1^*$ 46 together with a dense subset, $D_2^{**}$, of $D_2^*$ 46, an arbitrarily thin strip including a neighborhood of a line from $(0, 1)$ to $(1, 1)$. The $(e^*, w^*)$ points in $D_1^{}$ and $D_2^{}$ lead to the calculation of all of the histogram appearances for any sample, for cell widths equal to or exceeding some prescribed positive lower bound, $\delta$, in the transformed sample space, $[1,$ 2]. Replacing a constraint w≥a minimum width value with a constraint 2<e*+Kw* restricts appearances to those having at most K intervals between and including a first and a last that include data points, instead of appearance for histograms with a constraint on interval width.

For particular sample, there are finite subsets of D* that have (e*, w*) values leading to every possible histogram appearance for data interval widths greater than or equal to any positive lower bound, δ. In the context of all possible samples, however, if any neighborhood included in the subset, $D_1^*$ 46 of D*, is left out namely $D_1^* \equiv \{(e^*, w^*)|0 \le e^* \le 1 < e^* + w^*, e^* + 2w^* \le 2, \text{ and } 0 < w^*\}$, then there exists a sample and a histogram appearance that will be revealed only by the (e*, w*) values included in the excluded neighborhood.

Consider an arbitrary sample with appearance $(a_1, a_2, \ldots a_K)$ corresponding to a level set for which the excluded neighborhood, N, is a proper subset of this level set, L(S, $(a_i)$) so that L(S, $(a_i)$)/N is not empty. Consider an new sample obtained by augmenting S with the points $\{x_{q^*}, x_{q+1}^*, x_{q+2}^*, x_{q+3}^*\}$, defined below, with $x_q^* < x_{q+1}^* < x_{q+2}^* < x_{q+3}^*$ such that the level set separating $\{x_{q^*}, x_{q+1^*}\}$ and $\{x_{q+2^*}, x_{q+4^*}\}$ is included in a neighborhood N. Then the histogram appearance $(a_1, a_2, \ldots a_K) + (0, 0, \ldots, 4, \ldots 0, 0)$ is included, but the appearance $(a_1, a_2, \ldots a_K) + (0, 0, \ldots, 2, 2, \ldots 0, 0)$ is not. That is, all (e*,w*) interval location and width pairs that lead to the appearance $(a_1, a_2, \ldots a_K) + (0, 0, \ldots, 2, 2, \ldots 0, 0)$ are in the excluded neighborhood, N.

Specifically, the excluded neighborhood, N, will include a ball of radius r>0, $B((e_{o^*}, w_{o^*}),r)$, at $(e_{o^*}, w_{o^*})$. There exists $\delta_o > 0$ such that the points $\{x_{q^*}, x_{q+1^*}, x_{q+2^*}, x_{q+3^*}\}$ as $x_{q^*} = e_{o^*} + w_{o^*} - \delta_o$, $x_{q+1}^* = e_{o^*} + w_{o^*} + \delta_o$, $x_{q+2^*} = e_{o^*} + 2w_{o^*} - \delta_o$, and $X_{q+3^*} = e_{o^*} + 2w_{o^*} + \delta_o$ may be defined. Then a histogram appearance ( …, 2, 2, … ) will not be revealed with the {(e*, w*)} remaining in D**/N, that is, $B((e_{o^*}, w_{o^*}),r)$, is excluded.) Hence D** must be dense in $D_1^*$ 46 where the level sets are polygons that may have arbitrarily small diameters for samples with pairs of arbitrarily close distinct values.

A similar analysis is applied to the level sets, $D_2^*$48, for histograms of the form (n−p, p). For all possible samples, these level sets are trapezoids with the parallel sides having slope −1, within the polygon $D_{2^*}\{(e^*, w^*)|0 \le e^* \le 1, 2 < e^* + 2w^*, w^* \le 1 + \delta_2$. For any sample, a dense subset of the arbitrarily thin strip including a neighborhood of the line segment, $L_{2^*}$, from the point (0, 1) to (1, 1) will have representatives from any trapezoidal level set for any sample.

It can be observed in FIG. 5 that level sets within the part of $D_1^*$ 46 between e*+2w*=2 and e*+w*=2+δ₂ are trapezoids with the parallel sides having slope −1. The level sets for e*+2w*<2 the shapes are not obvious beyond being polygons having sides with slopes of $\{-1, -\frac{1}{2}, -\frac{1}{3}, \ldots, -1/k, \ldots, 1/K\}$. K is a maximum number of intervals between and including a first interval and a last interval having data values in them.

For a fixed grid search among possible histogram location and width values for listing histograms or appearances, there are always samples and appearances that will not be found. Consider a transformation of any grid of finitely many grid points to D**. These points will not be dense in $D_1^*$ 46 union $D_2^*$ 48, so there exist samples and appearances that will not be found. That is, neighborhoods entirely between the transformed grid points will be excluded. As previously discussed, within these excluded neighborhoods, there will be (e*, w*) points corresponding to samples and appearances that will not be revealed with a grid search.

For Monte Carlo and quasi-Monte Carlo methods known in the art, there are samples and appearances with arbitrarily small probability of being found. There are samples for which some of their appearances have a level set with arbitrarily small area. That is the level sets constructed above to show necessity of D** have area $\le 4\delta_{Necessity}^2$ which can be made arbitrarily small. The total area of $D_1^*$ 46 is $\frac{1}{2} - \frac{1}{2}\delta_1^2$. Since $4\delta_{Necessity}^2/(\frac{1}{2} - \frac{1}{2}\delta_1^2)$ can be made arbitrarily small, there are samples and appearances with arbitrarily small probability of being found.

In one exemplary embodiment, returning to FIG. 2 at Step 22, histogram sequence level sets for which $h_1 \ge 1$ and $h_k = 0$ for k≤0 are identified from the histogram appearances. These histogram sequence level sets comprise histogram appearance level sets. These histogram level sets are described by a bounded set of location and width parameters in a transformed sample space, such that each histogram appearance of the data sample has only one level set in D*.

In one exemplary embodiment, At Step 24, the identified histogram appearance level sets are analyzed to determine a set of possible histogram data intervals for plural points in the identified histogram appearance level sets. If no restriction is placed on the intervals for two or more samples, then the possible pairs or sets of histogram appearances that might be used to compare the samples may be the set of all combinations is obtained by selecting any appearance for a first sample, any appearance for a second sample, etc. for two or more samples.

However, significantly different appearances might be a result of slightly different sets of intervals for different samples. It may appear that "apples and oranges comparisons" resulting from different interval widths should not be done. However, preferred simultaneous appearance comparisons may be based on histogram appearances corresponding to a use of identical sets of intervals for the entire data sample. If such comparisons are desired, then a production of well defined subsets of all possible sets of appearances for two or more samples is completed with a restriction that a same set of intervals be applied to all of the samples (as well as a common interval width being greater than or equal to a prescribed strictly positive minimum width; or that the number of intervals between and including the first and the last intervals having positive frequencies be at most a prescribed integer count.

In such an embodiment, at Step 24 sample values are combined. Then level sets for combinations of simultaneous appearances may be obtained by applying analysis to the set of combined sample value sets. This procedure works since if any value shifts from one interval to another, then at least one of the several sample appearances changes (or, in the multi-dimensional setting, an appearance in at least one dimension changes.) Realizations of this procedure include combining of sample values before transforming them to the interval [1, 2]; combining of sample values after each sample has been transformed to the interval [1, 2]; or other variations of restricting completely independent interval widths for two or more samples in the context of comparing the appearances for two or more samples.

Note that this embodiment is similar to the procedure for determining the possible multidimensional histograms wherein the same intervals are applied in all dimensions as is described below.

In another embodiment, Step 24 includes analyzing histogram sequence level sets. In such an embodiment, histogram sequence level sets are the one or more identified histogram appearance level sets analyzed with pre-determined set of constraints. The one or more identified histogram appearance level sets are described by a bounded set of location and width parameters in a transformed sample space, such that each histogram appearance has only one histogram appearance level set in the transformed sample space.

At Step 26, a determined set of possible histogram data intervals is used to present plural histogram appearances and/or histogram reports 27 or graphical histograms on a graphical user interface. In one embodiment, the graphical histogram appearances or graphical histograms include multi-colored graphical entities, including, but not limited to, multi-colored bar graphs, line graphs, pie-chart graphs, or other types of multi-colored graphs.

In another embodiment at Step 26, statistical graphics are used to display all the possible histograms of a one dimensional sample using the histogram level sets; or by performing further analysis upon the histogram appearance level sets sorted $a_k$. In one embodiment at Step 26, simultaneous histogram appearances of plural data samples are visually compared by comparing two or more samples with a pair or with a set of histogram appearances, one for each data sample.

In another embodiment, at Step 26 reports 27 are produced and displayed in all configurations and forms of sets of possible simultaneous histogram appearances for several samples subject to the requirement that the each set of simultaneous histogram appearances correspond to a set of histograms using intervals that are identical in the untransformed spaces of each data sample, or in the interval [1, 2] of all of the transformed data samples.

In another embodiment, at Step 26 reports 27 are produced and these reports display in all configurations and forms of sets of possible simultaneous histogram appearances for several samples without the requirement that the intervals of the corresponding histograms are identical.

In another embodiment at Step 26, reports 27 are produced in all configurations and forms of sets of possible simultaneous histogram appearances for several samples requiring for their production the level sets and analysis with or without requirements, restrictions or modifications similar or dissimilar to those already described.

Although polygons included in FIGS. 3-5 may be considered as level sets of polygons, as is illustrated in Table 1, there are at least three kinds of levels sets: polygon interiors, edges without vertices and the vertices. Thus, a point from each kind of level set is used to display all possible appearances for different conventions regarding the equality of a sample point to an interval end point, of which the convention is but one.

Therefore a time required to identify all histogram level sets depends on a cardinality of sample values, n*, not of the sample, n. For very large data samples with a fixed range and gauge, (i.e. number of significant digits, often set at 4 or 5, but there may be fewer than 4 or more than 5 significant digits) indicates that many values might repeat and the sample value set could have significantly fewer elements than the sample.

FIGS. 6A-6D are a block diagram 50 illustrating an exemplary histogram appearances generated with Method 20 and (Method 66 illustrated below) for a data sample transformed to [1, 2]. The first column in FIG. 6 is a creation number defined as a polygon counter plus one when a division takes place of an existing polygon, retained by one of new polygons, with other polygon keeping an earlier creation number. The second column is location value "e," the third column is a width "w," the fourth column is a code with "S" for symmetric and "Rev" for a reversal appearance and the remaining columns show the histogram appearance as a list of interval frequencies, $a_k$. The sets of appearance details together with the appearance are presented lexicographically, ordered first ascending on a length of an appearance (i.e., a number of intervals, or, equivalently, the number of bin frequencies in the list, including bin frequencies, for bins between the first and last bins, that are zero) and second lexicographically descending on the appearances itself, that is, on the list of frequencies $a_k$.

As is known in the art, to present something lexicographically, an alphabetic ordering for the English language words, for example, is lexicographic ascending with a<b<c<d< ... etc. The lexicographic ordering of appearances is similar, but descending, with 20>19>18> ... >2>1>0. The sample size in this example is 20 so that the maximum frequency for any interval and, hence, any integer in an appearance is 20.

The histogram appearances start with the left side of FIG. 6A with the appearance (20) and after the last element of the left side of FIG. 6A (e.g., 147) wrap around to the first element of the right side of FIG. 6A (e.g., #115, having appearance "10 7 3"). After the last element of right side of FIG. 6A (e.g., #156, having appearance "2 16 2") it continues with the first element of the left side of FIG. 6B (e.g., #124, having appearance "2 15 3"), and so on.

As is illustrated in FIG. 6, there are 243 possible histogram appearances for interval widths greater than or equal to 1.0653, including a number of appearance reversals.

Table 4 illustrates a first exemplary sample of 20 observations from a simulated normal population with a mean of 5 and a standard deviation of 1.887.

TABLE 4

| | |
|---|---|
| 1 | $X_{(1)} = X_{14} = 2.3817$ |
| 2 | $X_{(2)} = X_1 = 2.7784$ |
| 3 | $X_{(3)} = X_8 = 2.8475$ |
| 4 | $X_{(4)} = X_{17} = 2.9842$ |
| 5 | $X_{(5)} = X_5 = 3.1774$ |
| 6 | $X_{(6)} = X_6 = 3.3055$ |
| 7 | $X_{(7)} = X_{16} = 3.8954$ |
| 8 | $X_{(8)} = X_{15} = 3.9884$ |
| 9 | $X_{(9)} = X_{20} = 4.0071$ |
| 10 | $X_{(10)} = X_4 = 4.1943$ |
| 11 | $X_{(11)} = X_{13} = 4.3608$ |
| 12 | $X_{(12)} = X_{11} = 4.9817$ |
| 13 | $X_{(13)} = X_9 = 4.9849$ |
| 14 | $X_{(14)} = X_3 = 5.0316$ |
| 15 | $X_{(15)} = X_{18} = 5.5454$ |
| 16 | $X_{(16)} = X_{19} = 5.7514$ |
| 17 | $X_{(17)} = X_7 = 6.1436$ |
| 18 | $X_{(18)} = X_{10} = 6.5454$ |
| 19 | $X_{(19)} = X_2 = 7.0156$ |
| 20 | $X_{(20)} = X_{12} = 7.7037$ |

Using Method 20, abbreviating histogram appearances by a list of frequencies using the 20 observations in Table 4 includes generating the appearances listed in Table 5. The appearances are presented as tuples of integer counts and not as histogram graphics. The tuples of integer counts are converted to histogram graphics for display at Step 26. Observe that the appearances shown in Table 5 are reversals each other.

TABLE 5

(6, 13, 1), (1, 13, 6)

Table 6 illustrates another exemplary sample in rank ordered form.

TABLE 6

$X_{(1)} = 2.05$
$X_{(2)} = 2.27$
$X_{(3)} = 2.50$
$X_{(4)} = 2.95$
$X_{(5)} = 3.18$
$X_{(6)} = 3.41$

Figure 10:
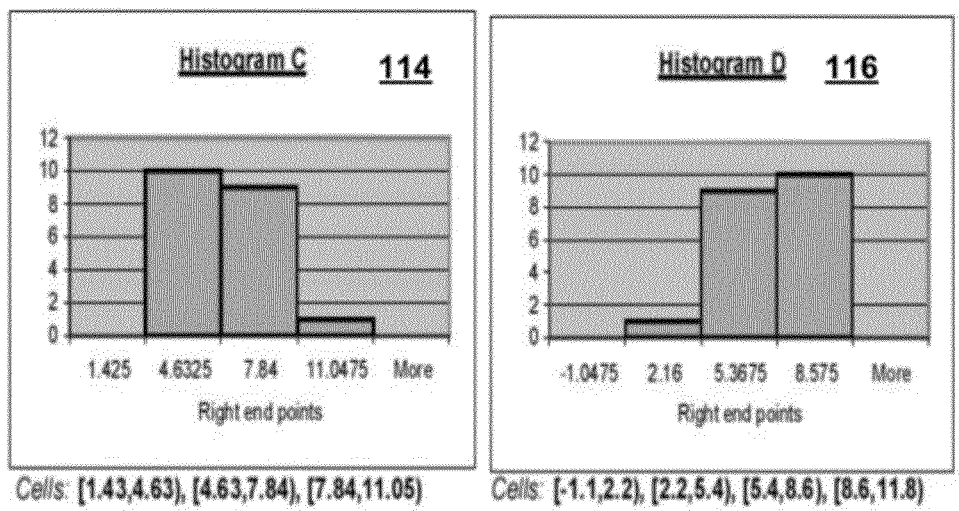
Figure 13:
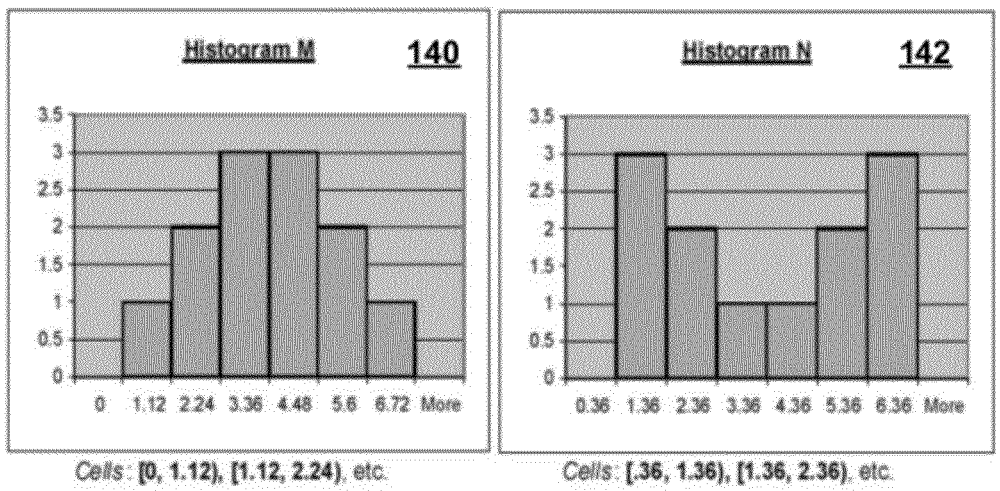

TABLE 6-continued $X_{(7)} = 3.64$
$X_{(8)} = 3.86$
$X_{(9)} = 4.09$
$X_{(10)} = 4.32$
$X_{(11)} = 5.68$
$X_{(12)} = 5.91$
$X_{(13)} = 6.14$
$X_{(14)} = 6.36$
$X_{(15)} = 6.59$
$X_{(16)} = 6.82$
$X_{(17)} = 7.05$
$X_{(18)} = 7.50$
$X_{(19)} = 7.73$
$X_{(20)} = 7.95$ Using Method 20, abbreviating histogram appearances by a list of frequencies using the 20 observations in Table 6 includes generating the appearances listed in Table 7. (Also see FIGS. 10, 11, 12; especially parts 122, 120, Histograms F, E corresponding to (6446), (1991) of Table 7, below.)

TABLE 7

(10, 7, 3), (3, 7, 10);
(5, 5, 0, 5, 4, 1), (1, 4, 5, 0, 5, 5);
(6, 4, 4, 6), (1, 9, 9, 1);
(5, 5, 0, 5, 5), (2, 7, 2, 7, 2).

Figure 7B:
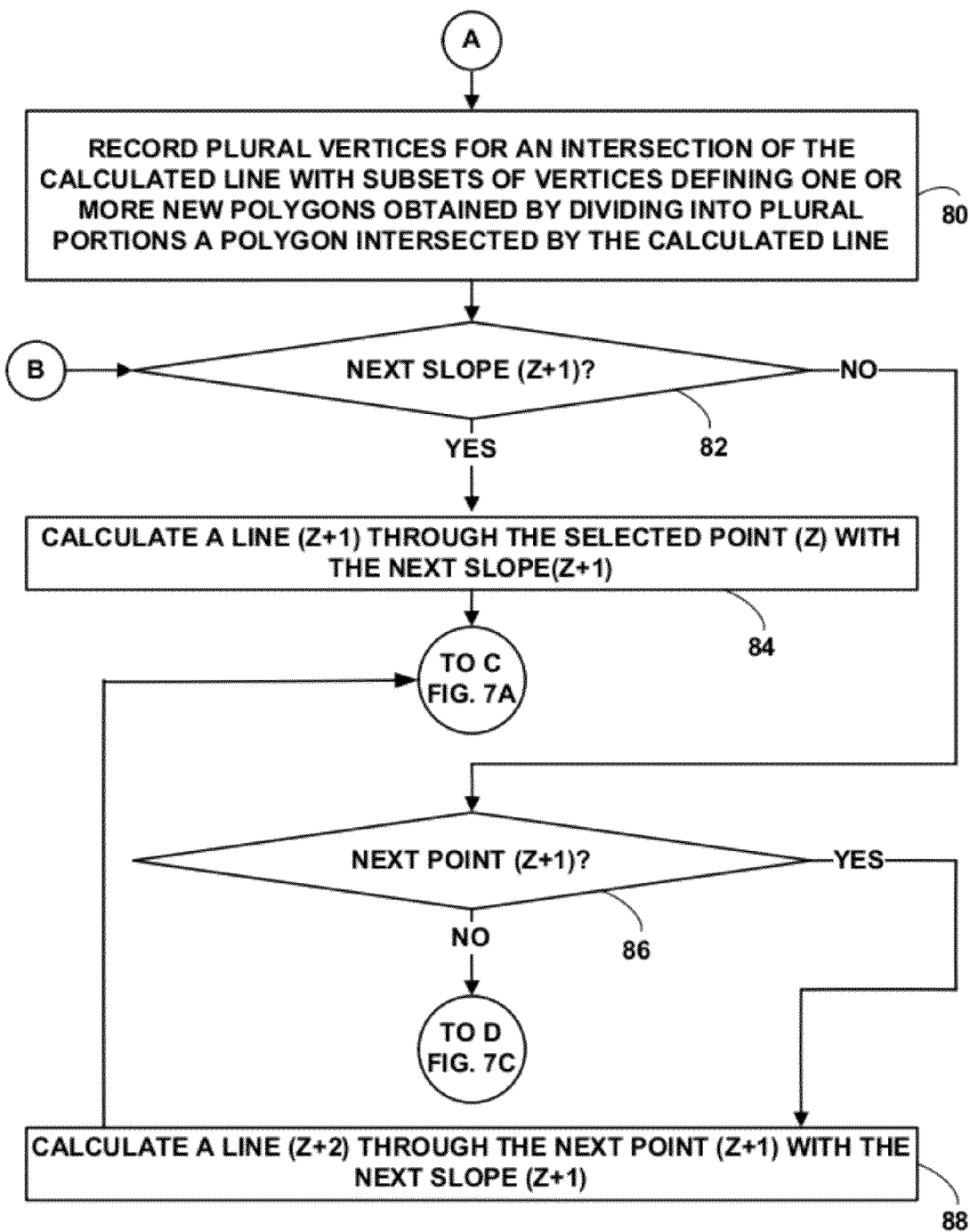

FIGS. 7A, 7B and 7C are a flow diagram illustrating a Method 66 for determining all possible histogram appearances for a data sample. In FIG. 7A at Step 68 an affine transformation is applied to an original value data sample of a data sample to transform all values in the data sample to fit within a pre-determined interval thereby creating a transformed data value set. At Step 70, plural vertices for plural polygons associated with or dependent upon boundaries of the transformed data value set are determined. At Step 72, a first point (Z) is selected from the transformed data value set. At Step 74, a first slope (Z) from a set of K-slopes is selected. At Step 76, a first line (Z) is calculated through the selected point (Z) with the selected slope (Z). At Step 78, a test is conducted to determine if the calculated line intersects any of the plural polygons using the determined plural vertices.

At Step 78, if the calculated line intersects any of the plural polygons, in FIG. 7B at Step 80, vertices for an intersection of the calculated line are recorded with subsets of vertices defining one or more new polygons obtained by dividing a polygon intersected by the calculated line into plural portions. At Step 82, a test is conducted to determine if there is a next slope (Z+1) from the set of K-slopes. If there is a next slope (Z+1) from the set of K-slopes, then at Step 84 a next line (Z+1) is calculated through the selected point (Z) and with the next slope (Z+1). If there is not a next slope (Z+1) at Step 82, then Step 86 is executed. At Step 86, a test is conducted to determine is there a next point (Z+1). If there is a next point (Z+1), then at Step 88, a next line (Z+2) is calculated with the next point (Z+1) and the next slope (Z+2).

If there is not a next point (Z+1), at Step 88, then in FIG. 7C at Step 90, a transformed point from each of plural polygon levels set for which vertices have been recorded is determined. At Step 92, the determined transformed point is used to determine plural histogram appearances corresponding to each histogram level set. At Step 94, the determined plural histogram appearances are presented on a graphical user interface.

In one embodiment, Method 66 is used with a data sample as well as a value set of the data sample. Redundant lines may occur if a value repeats within a sample. Redundant lines are processed like any other, however the method will not record any new vertices, since no new intersections can be obtained from a redundant line.

In another embodiment Method 66 is used with redundancy associated with use of the data sample rather than the data sample values is used. The data sample must be used to determine appearances with the obtained level sets. The data sample includes information that is essential for obtaining appearances, information that is absent in the sample value set. The Method 66 can be used with any sub-sample that has the same value set. Redundant lines are considered, but no new intersections or vertices should result from such redundant lines.

Method 66 is illustrated with several exemplary embodiments. However, the present invention is not limited to exemplary embodiments, and other embodiments can be used to practice the invention.

In such an exemplary embodiment, at Step 68 an original value data sample (e, w) is transformed with a positive affine transformation into the interval [1, 2] to create a transformed data value set (e*, w*). The transformed data value set will have the same histogram appearances as the original data value sample.

At Step 70, plural vertices for plural polygons D* associated with or dependent upon boundaries in the transformed data sample value space $R^{2*}$ are determined. In one embodiment, vertices of plural polygons D* are formed by intersections of all the lines of the form $e*+kw*=x_{(i)}*$. In one embodiment the plural polygons D* are defined by their vertices. In another embodiment, a minimal set of binding inequalities may be used as well to define the plural polygons D*. In one embodiment, the plural vertices of the first polygon D* are (0, 1), $(1-\delta_1, \delta_1)$, $(1, \delta_1)$, $(1+\delta_2)$, $(0, 1+\delta_2)$.

In another embodiment, the plural vertices of the first polygons are shown in FIG. 3, namely {(−(K+3), +(K+3)) (−(K+3),1/K)) ((K+3),1/K) ((K+3), (K+3))} and {((K+3),−1/K), ((K+3), −(K+3)), (−(K+3),−(K+3)), (−(K+3),−1/K)}. K is a maximum number of intervals between and including a first interval and a last interval having data values in them.

However, the present invention is not limited to this embodiment and other embodiments with other types of polygons with other types of vertices can be used to practice the invention.

At Step 72, a first point $x_{(i)*}$ is selected from the transformed data value set. At Step 74, a first slope from a set of K-slopes is selected. In one embodiment, the set of K-slopes includes {−1, −½, −⅓, . . . −1/k, . . . −1K}. K is a maximum number of intervals between and including a first interval and a last interval having data values in them.

However, the present invention is not limited to this embodiment and other sets of slopes can used to practice the invention.

At Step 76, a first line (Z) is calculated through the selected point $x_{(i)*}$ with the selected slope. New lines in the form $e*+kw*=x_{(i)*}$ are determined for distinct $x_{(i)*}$ values and distinct slopes in the transformed data value sample.

For example, for each data point $x_{(i)*}$ in the transformed value data value set, consider a line of (e*, w*) or (e#, w#) values, (e*, w*) for the transformation for [1, 2], and (e#, w#) for an arbitrary transformation for [a, b], including the identity transformation, such that the calculated line=e*or#+kw*or#.

At Step 78, a test is conducted to determine if the calculated line intersects an interior of the plural polygons using the determined plural vertices. When a calculated line intersects an interior of an existing polygon D*, at Step 80 plural vertices for an intersection of the calculated line are recorded with subsets of vertices defining one or more new polygons obtained by dividing a polygon intersected by the calculated line into plural portions. The plural vertices include two or more new polygon level sets, defined in terms of their respective vertices. A value $\delta_1$ in the polygon vertices limits a maximum value for k. The indices (i) range from 1 to the number of sample values (not sample points). Sample values that have already been considered in a prior instance of $e^* + kw^* = x_{(i)*}$ have no influence on the level sets.

If there is a next slope from the set of K-slopes, then at Step 84 a new line (Z+1) is calculated through the selected point $x_{(i)*}$ and with the new slope. If there is not a next slope at Step 82, then Step 86 is executed. At Step 86, a test is conducted to determine if there is a next point $x_{(i+1)*}$. If there is a next point $x_{(x+1)*}$, then at Step 88, a new line is calculated with the new point $x_{(x+1)*}$, and the new slope.

When all distinct points, slopes and lines have been determined, plural polygon level sets are given as polygon interiors, edges and vertices, associated with the polygons defined in terms of sets of vertices. In one embodiment, there are no cones or non-polygon intersections of cones because a polygon, not $R^{2*}$ is used as a starting point.

Within each polygon interior, a median location e* and width w* defined as an ordinary average of the coordinates of the vertices is determined. For example, if there are five vertices, then the e* values for each of the five (e*, w*) vertices are averaged to obtain the value that we call the median e* value. Similarly a median w* value is obtained. However any interior point may be chosen and the present invention is not limited to this embodiment.

If there is not a next point $x_{(i+1)*}$, at Step 88, then in FIG. 7C at Step 90, an (e*, w*) point from each of plural polygon levels set for which vertices have been recorded is determined. At Step 92, the determined (e*, w*) point is used to determine plural histogram appearances corresponding to each histogram level set.

In another embodiment, an inverse transformed point can also be used to determine the same plural histogram appearances as determined for the original sample (and provide a corresponding histogram in the original sample space). If there are repeated values, then the corresponding appearance frequencies are increased accordingly.

In another embodiment, if transformed location e* and transformed width w* values are applied to the original data value sample after having been transformed to the [1, 2] transformed data sample, the resulting histogram appearances will include repeated values and will be correct histogram appearances for the original data value sample. The ordering of the histogram appearances by the number of intervals, K, and within the same number of intervals, lexicographically may be an additional step added to Method 66. However, the present invention is not limited to such an embodiment and the present invention can be practiced either with or without additional steps added to Method 66.

In an alternative embodiment, a starting domain may be composed of two or more disjoint polygons. For example, if a finite set of histogram sequences is desired then a starting point may include rectangles having the corners: {(-(B+1), δ), ((B+1), δ), ((B+1), (B+1)), (-(B+1), (B+1))} and {(-(B+1), -δ), ((B+1), -δ), ((B+1), -(B+1)), (-(B+1), -(B+1))} etc. B is defined above.

At Step 94, the determined plural histogram appearances are presented on a graphical user interface. At Step 94, printed reports 27 may be also produced based on analyses and sorting of all possible histogram appearances, including transformation of interval location and width combinations corresponding to transformed sample values in the interval [1, 2] back to interval locations and widths for the original data values.

Additional details of other embodiments of the invention are now described. Such embodiments may also be practiced with Methods 20 and 66. However, the present invention is not limited to these other embodiments.

In such other embodiments, appearance reversals depend on symmetry. The terms "symmetric" and "symmetry" usually are applied approximately. For example, if a sufficiently large sample from a Normal population is approximately symmetric, often it might be described or referred to simply as "symmetric."

A sample, S, is "exactly" symmetric if the points may be exhaustively paired so that the sum of every pair is the same, equal to twice the median, M, of the sample. That is, they may be rank ordered as $x_{(i)}$ so that $x_{(i)} + x_{(n+1-i)} = 2M$, for i=1, 2, ... n. (Note: the sample values S* might be exactly symmetric while the sample is not).

The following are deemed equivalent to exact symmetry. A sample is exactly symmetric if there is a rank ordering, $x_{(i)}$, of the sample points such that: (1) $x_{(n+1-i)} + x_{(i)} = 2M$; (2) $M - x_{(i)} = x_{(n+1-i)} - M$; and (3) $x_{(n+1-i)} = 2M - x_{(i)}$.

All histogram appearances are accompanied by their reversals if and only if the sample is exactly symmetric. Exact symmetry implies that for any interval width, a reversal of all appearances occurs. Conceptually, if a sample is exactly symmetric, then reflecting a partition across a median reverses an appearance. However all equal length partitions can be defined by a beginning point and a width, so that a reflection of an equal interval width histogram partition is equivalent to a change in the location parameter e.

A sample is approximately symmetric if there exists an appearance with three or more intervals such that the reversal also is an appearance. That is, a discrete definition of the presence of some symmetry is an occurrence of an appearance reversal with three or more intervals. In such an embodiment, a mean becomes a least squares point, not the median of the middle two values or the middle value, etc. Various decompositions are possible into approximately symmetric sub samples, or approximation of a sample by another set of numbers that is symmetric and having a least squares deviation from a sample. However the presence or absence of at least one reversal gives an immediate signal of reaching or failing to reach a threshold indicator of approximate symmetry. Beyond this threshold, there may be other significant details to discover.

In one embodiment, there exists a data sample such that an appearance and its reversal are possible if and only if there is a linear program with interval inequality constraints in the location parameter, width parameter and sample points corresponding to an appearance(s) and reversal(s).

A more detailed structure of reversals may be obtained from the different deviations of the pairwise medians, $(x_{(i)} + x_{(n+1-i)})/2$, as is illustrated in Equation 6.

Define the $i^{th}$ pairwise median, $M_i = (x_{(i)} + x_{(n+1-i)})/2$.

$M_{(i)}$ = rank ordered $M_i$ $$w_i = (M_{(i+1)} - M_{(i)})/2$$

$w_{(i)}$ = rank ordered $w_i$. \hfill (6)

For Equation 6, there are no reversals for w: $0 < w < w_{(1)}$. New reversals emerge for w: $w_{(i)} \le w < w_{(i+1)}$, i=1, ... # Distinct $w_1$'s−1, as the interval widths open up from $w_{(1)}$ to $w_{(max)}$. For samples with no repeated values, all appearances are accompanied by their reversals for w: Max $\{x_{(n-1)} - x_{(1)}, x_{(n)} -$ $x_{(2)}\} < w$, since such widths lead to appearances of the form $(p, n^*-p)$ for $p=1$ to $n^*-1$, where $n^* =$ the number of distinct sample values.

If $x_i$ is exactly symmetric then $w_{(i)} \equiv 0$ for all i and all possible appearances are accompanied by their reversals. The existence of interesting reversals may depend on the relationship between $0 < w < \min\{|x_i - x_j||x_i \neq x_j\}$ and the $w_1$.s identified above. If $w_{Max} < \min\{|x_i - x_j||x_i \neq x_j\}$, then all interesting appearances have reversals.

There does not exist a sample such that the appearances (1, 2, 3, 4) and (4, 3, 2, 1) are both possible. The associated Linear Program is not feasible, wherein the sample values as well as the location and width parameters are all decision variables.

Pairs of appearances like (1, n–2, 1) and ((n–2)/2, 2, (n–2)/2) or ((n–1)/2, 1, (n–1)/2) are called "mode inversions." Consider the second example (Tables 6 or 7) involving an exactly symmetric sample that has the reversals (10, 7, 3) and (3, 7, 10) corresponding to a sample S, $<x_i>$. Consider a derived sample, S', defined as $<x_i + Kw|X_i \in S>$ wherein $K \equiv$ integer least upper bound of (Range (S)/w) (i.e., a ceiling of (Range (S)/w)). Then S<Union>S' will have "saw tooth" appearances (among others) such as (10, 7, 3, 10, 7, 3) & (3, 7, 10, 3, 7, 10). ("<Union>" is the operation of combining samples, denoted by $<x_i>$. With "< . . . >" this operation is distinguished from the "Union" operation of combining of sets).

Let $e_1$ & $e_2$ denote the locations such that $|e_1 - e_2| < w$ and such that the appearances for S are (10, 7, 3) & (3, 7, 10) respectively for $e_1$ and $e_2$. Define $S''=\{(x; x+Kw+|e_1-e_2||x \in S\}$. Then S'' will have, among others, the appearances (3, 7, 10, 10, 7, 3) & (10, 7, 3, 3, 7, 10); (or possibly (3, 7, 10, 0, 10, 7, 3) & (10, 7, 3, 0, 3, 7, 10)). Possibly appearances (3, 7, 20, 7, 3) and (10, 7, 6, 7, 10) also can be obtained with a variation on this approach. Note also that moving between the mode inversions is accomplished only by varying the location parameter. For exactly symmetric samples, the (e, w) combinations for reversals may be obtained from a shift of location only, leaving w unchanged. For all appearance reversals that happen with the same interval width, from a shift of location, there is are samples of twice as many points, as described above, having the mode inversion described above.

A histogram appearance, $a_k$, is exactly symmetric if counts satisfy: $a_k = a_{K+1-k}$ for $k=1$ to K. If K is even then $a_1 = a_K$, $a_2 = a_{K-1}$, $a_3 = a_{K-2} \ldots a_{K/2} = a_{K/2+1}$. If K is odd then $a_1 = a_K$, $a_2 = a_{K-1}$, $a_3 = a_{K-2}, \ldots a_{(K-1)/2} = a_{(K-1)/2+2} a_{(K-1)/2+1} = a_{(K-1)/2+1}$. Symmetry of $a_k$, namely $a_k = a_{K+1-k}$ for $k=1$ to K, does not imply that $a_1 < a_2 < a_3 < \ldots < (a_{K/2}$, K even, or $a_{(K-1)/2+1}$, K odd) or $a_1 > a_2 > a_3 > \ldots > (a_{K/2}$, K even, or $a_{(K-1)/2+1}$, K odd), etc., $a_1 \leq a_2 \leq a_3 \leq \ldots \leq (a_{K/2}$, K even, or $a_{(K-1)/2+1}$, K odd) or $a_1 \geq a_2 \geq a_3 \geq \ldots \geq (a_{K/2}$, K even, or $a_{(K-1)/2+1}$, K odd), etc. However it is just such situations that are most conspicuous, for example (10, 7, 3, 3, 7, 10) & (3, 7, 10, 10, 7, 3) (or possibly (10, 7, 6, 7, 10) & (3, 7, 20, 7, 3) wherein the middle two combine).

Appearances do not directly determine histograms. The same appearance almost always occurs with many width and location parameter combinations. A given appearance corresponds to an appearance level set polygon of many possible location and width values for histograms all having the given appearance. From this domain, what (e, w) values lead to a histogram that has a mean for the grouped data that equals or is closest to the actual sample mean is determined. Similarly a histogram with grouped data sample variance that is equal to or closest to the sample variance may be desired. For a fixed appearance, a line may cut the interior of the polygon level set giving the set of (e, w) values leading to a desired appearance and for which the mean of grouped data equals the sample mean. Then on this line the (e, w) value that optimizes the grouped data variance compared to the sample variance may be sought.

For a fixed width, w, the location, $e^\#$, that minimizes the sum of the squared deviations of each point from its interval midpoint as illustrated in Equation 7.

$$e^\# = [\Sigma_{i=1 \text{ to } n} x_i (\text{mod } w)]/n - w/2 \qquad (7)$$

A squared deviation from $x_i$ to the midpoint for the interval for $x_i$, $[e^\# + (k-1)w, e^\# + kw)$, is the same as the squared deviation from $x_i (\text{mod } w)$ to $(e^\# + w/2)$ in the interval $[e^\#, e^\# + w)$. The squared deviation minimizing point in this interval for the $x_i (\text{mod } w)$ values is the mean. This locates $e^\#$ as described above. The average remainder of a set of numbers is not the same as the remainder of the average. Consider $\{1\frac{1}{2}, 2\frac{1}{2}\}$ and the remainders upon division by 1. The average remainder is $\frac{1}{2}$, but the remainder of the average is zero. Also, a location may be found to make the mean or variance, etc., of grouped data the same as, or as close as possible to the actual mean, variance, etc.

For an appearance, $(a_k)$, and a fixed width, w, the location, $e^{\#\#}$, below, makes the mean of the grouped data the same as the mean of the actual data as is illustrated in Equation 8.

$$e^{\#\#\#} = [(\text{mean of } x_i) - w(\Sigma_{k=1 \text{ to } K} a_k k + nw/2], \qquad (8)$$

provided that the line $(e^{\#\#\#}, w)$ intersects the level set of the appearance $(a_k)$. Equate the mean of $x_i$ to the mean of the data grouped by $[e^{\#\#\#} + (k-1)w, e^{\#\#\#} + kw)$ and solve for $e^{\#\#\#}$. Note that the mean of the grouped data $=(1/n) [e^{\#\#\#} \Sigma_{k=1}$ to K $a_k + w[\Sigma_{k=1}$ to K $a_k)(k-\frac{1}{2})$.

Thus, when the graph of the line $(e\#\#(w, a_k), w)$ intersects the level set for the appearance $(a_k)$, then the appearance is one for which the mean for the grouped data having the appearance $(a_k)$ can equal the sample mean. If an appearance level set is not intersected by the line $(e\#\#(w, a_k), w)$, then a discrepancy function illustrated in Equation 9:

$$|\text{mean of grouped data} - \text{sample mean}|, \qquad (9)$$

can be evaluated at the vertices of the level set for the appearance $(a_k)$ and the (e, w) combination at the vertex having the smallest absolute deviation could be chosen, if for some other reason the appearance $(a_k)$ were wanted.

A grouped mean, sample mean discrepancy function, |mean of grouped data–sample mean|, is apparently piecewise linear because of the absolute value function. However, even if the absolute value function is removed and the difference between mean-of-grouped-data and sample-mean is constant, the expression is valid only on the level set, $LS(a_k)$, for an appearance $(a_k)$. A common encounter with piecewise linear functions, $R^1 \to R^1$, is with polygonal functions, step functions and various piecewise linear functions possibly discontinuous at end points of some of the linear pieces. Using a polygonal partition of a domain, D or $D^*$, and the mean for grouped data is a different linear function of (e, w) on each on of the interiors of the polygons of the partition. This can be called a "cell-wise linear function" on a partition of $R^2$, for piece-wise linear functions from $R^2$ to $R^1$.

Since a line segment of (e, w) values in the level set, $LS(a_k)$, of an appearance, $(a_k)$, may have the mean of the grouped data equal to the sample mean, it is possible to find on this line segment a point where the sample variance and variance of grouped data are equal.

For a fixed width, w, the location, $e^{\#\#\#\#}$ implied by Equation 10 makes the variance of the grouped data the same as or as close as possible to the variance of the actual data can be obtained from:

$$(e^{\#\#\#\#}-\tfrac{1}{2}w-\text{sample-mean})^2=[SS_x-\Sigma_{k=1\ to\ K}a_k(2kw+ k^2w^2)]/n \qquad (10)$$

wherein $SS_x$ is a sum of squared deviations for the sample. If the right hand side is negative, then it is not possible to exactly achieve the sample variance for the appearance ($a_k$), but this discrepancy may be minimized by a further analysis of Equation (10).

The sample variance of $x_i$ is equated to the variance (using the (n−1) divisor) of the data grouped by [$e^{\#\#\#\#}$+(k−1)w, $e^{\#\#\#\#}$+kw), using the sample mean for the deviations from each interval midpoint, since by construction, since the grouped data and sample statistical means were made equal. Then $e^{\#\#\#\#}$ is solved for via the expression ($e^{\#\#\#\#}-\tfrac{1}{2}w-$sample-mean).

For fixed w, to approximate higher moments, to minimize a convex combination of mean and variance distortion, etc., LaGrange Multipliers, or possibly one variable calculus may suffice. Note that as interval width becomes smaller, possibly all sample moments are approximated more closely by the grouped data, since the midpoints of data intervals for grouped data may be made arbitrarily close to the sample values.

The existence of samples having prescribed appearances and sets of appearances. The possibility of a given appearance for a given sample can be determined by solving an associated linear program. As described above both the appearance (1, 2, 3, 4) and its reversal, (4, 3, 2, 1), are not possible for any sample. For any prescribed set of appearances, the associated set of linear inequalities may be used. If the inequalities are feasible, then there exists a sample having the prescribed set of appearances.

A "multidimensional histogram" is a partition of equal area cells, that may be rectangular, may be half open, etc., together with the counts of the points of a multidimensional data sample in each cell. For example, half open cells in $R^2$ are of the form [a,b)×[c,d) in the (x,y) plane; and would have equal areas if the widths, (b-a), (d-c) were the same for all cells of such a partition.

The one dimensional histogram analysis described above for Methods 20 and 66 is also used to discover possible multidimensional histogram appearances. Due to the rapid growth of a number of possibilities as the dimension increases, only two dimensions are used herein as examples. The generalization to more than two dimensions is clear to those skilled in the art.

As an example, consider multidimensional histogram appearances for cells having boundaries that are parallel to data space axes. A set of half open cells for counting (x,y) points for a two dimensional histogram can be defined as is illustrated in Equation (11):

$$\text{Cell}_{p,q}=\{(x,y)|e+(p-1)w_x \le x < e_x+pw_x\ \&\ e_y+(q-1)w_y \le y < e_y+qw_y\} \qquad (11)$$

for locations $e_x$ & $e_y$ for widths $w_x$ & $w_y$, where $(x,y)_i \in \text{Cell}_{p,q}$ if and only if $x_i$ and $y_i$ satisfy the inequalities above in Equation 11.

A two dimensional histogram appearance is the array of histogram counts, $a_{p,q}$ in the half open p,q cells such that for p=1, there is a q* such that $a_{1,q^*} \ge 1$; for p=pMax, there is a q such that $a_{pmax,q^{}} \ge 1$; for q=1, there is a p* such that $a_{p^*,1} \ge 1$, for q=qMax, there is a p such that $a_{p^{},qmax} \ge 1$. From definitions, p*, p**, q*, q** always exist when the histogram appearances are defined.

This definition generalizes the one dimensional definition of a histogram appearance. Recall that a histogram appearance, $a_p$ in one dimension requires $a_1 \ge 1$ & $a_{last} \ge 1$. (For a three dimensional histogram, $a_{p,q,r}$ such that there are a p*, q* st. $a_{p^*,q^*,1} \ge 1$, etc. That is, to achieve a unique representative appearance for all the translations of an appearance, the histogram appearance is boxed in between (p, q, r)=(1, 1, 1) and $p_{Max}$, $q_{Max}$, $r_{Max}$).

The possible appearances of a two dimensional histogram are determined by the possible one dimensional appearances of the sample values in each dimension considered separately. Note that the value pair (x,y) is counted in the (p,q) cell if and only if each value is in its respective one dimensional interval.

An illustrative example is very simple since the number of possibilities in many dimensions grows rapidly. Consider the following set of three two-dimensional, (x,y), points: {(1, 2), (2,5), (5,1)}. The x values: 1, 2, 5 and the y values: 1, 2, 5 are identical, so the sets of possible histograms in each dimension are identical.

For the values {1, 2, 5}, the possible appearances of length 3 or less are: (3), (1, 2), (2, 1), (1, 1, 1) and (2, 0, 1). (Only (1, 0, 2) is impossible). The histogram partitions are labeled for these five appearances as A, B, C, D, E. Any partition for these appearances may be used independently for the x axis and for the y axis This leads to 25 possible 2 dimensional histogram appearances for the three points {(1, 2), (2,5), (5,1)}. However, if the intervals are required to be identical, then there are only five two dimensional histogram appearances.

Cells with boundaries that are not parallel to data spaces axes are also within the scope of the invention. Such cells are considered because it is plausible that such histograms are meaningful and useful. Such partitions of a plane can include rotated axes, diamond shaped cells; hexagonal cells, equilateral triangular cells, etc. Geographical and environmental applications may have use for such representations.

Return to the data sample {(1,2), (2,5), (5,1)}, suppose it is necessary to determine all possible histograms for rotated cells and for equilateral triangular cells. For the usual rectangular cells rotated 45 degrees, use a same location parameter, e, and interval width, w, in each rotated dimension. The level curve axes are given by functions illustrated in Equation 12.

$$f_1(x,y)=x+y-(e+kw)=0$$

$$f_2(x,y)=x-y-(e+kw)=0 \qquad (12)$$

For equilateral triangles with one side parallel to the x axis then the level curve axes are given by functions illustrated in Equation 13:

$$f_1(x,y)=y-(e+kw)=0 \text{(The level curves parallel to the }x\text{-axis)}.$$

$$f_2(x,y)=(\sqrt{3})x-y-(e+kw)=0$$

$$f_3(x,y)=(\sqrt{3})x+y-(e+kw)=0. \qquad (13)$$

To proceed, the "(e+kw)" term is not used. All that is necessary is to transform the data points and study the transformed values as described above. Table 8 illustrates rotated axis's $u=f_1(x, y)$ and $v=f_2(x, y)$.

TABLE 8

| (x, y) | x + y | x − y | "(u, v)" |
|---|---|---|---|
| (1, 2) | 3 | −1 | (3, −1) |
| (2, 5) | 7 | −3 | (7, −3) |
| (5, 1) | 6 | 4 | (6, 4) |

The intervals with these rotated axes may be the same width, as suggested at first, or different, using notation to distinguish the several widths and independent location parameters. Transformed or untransformed data may be analyzed leading to the marginal histogram appearances and the two dimensional histogram appearances.

Finally the axes and data may be transformed back to the original data space For equilateral triangles $u=f_1(x, y)$, $v=f_2(x, y)$ and $w=f_3(x, y)$ as is illustrated in Table 9.

TABLE 9

| (x, y) | y | (√3)x − y | (√3)x + y | "(u, v, w)" |
|---|---|---|---|---|
| (1, 2) | 2 | −.27 | 3.73 | (2, −.27, 3.73) |
| (2, 5) | 5 | −1.54 | 8.46 | (5, −1.54, 8.46) |
| (5, 1) | 1 | 7.66 | 9.66 | (1, 7.66, 9.66) |

Since equilateral triangular cells are desired, equal length intervals are used. To satisfy this requirement, all of the u, v, w values are combined to obtain the width and location value combinations leading to different appearances for the combined values. These values are sorted with the data versus the three marginal appearances. Note that even though a two dimensional graphic is used, triples of marginal appearances are created. With equilateral triangles, the cells are distinguished by three indices, "p, q, r," say, or possibly "$k_1, k_2, k_3$" for the intervals and cell as is illustrated in Table 10.

TABLE 10

$[e_1 + (k_1 − 1) w_1, e_1 + k_1 w_1)$ x
$[e_2 + (k_2 − 1) w_2, e_2 + k_2 w_2)$ x
$[e_3 + (k_3 − 1) w_3, e_3 + k_3 w_3)$ x
or
$[e_1 + (k_1 − 1) w, e_1 + k_1 w)$ x
$[e_2 + (k_2 − 1) w, e_2 + k_2 w)$ x
$[e_3 + (k_3 − 1) w, e_3 + k_3 w)$ x
or
$[e + (k_1 − 1) w, e + k_1 w)$ x
$[e + (k_2 − 1) w, e + k_2 w)$ x
$[e + (k_3 − 1) w, e + k_3 w)$ x

For example, if $a_{6,3,7}=5$ then there are five (x,y) values such that $e_1+(k_1−1) w_1 \leq f_1(x,y) < e_1+k_1 w_1$; $e_2+(k_2−1) w_2 \leq f_2(x,y) < e_2+k_2 w_2$; $e_3+(k_3−1) w_3 \leq f_3(x,y) < e_3+k_3 w_3$. For $k_1, k_2, k_3$, respectively equal to 6, 3, 7. That is, $e_1+5w_1 \leq f_1(x,y) < e_1+6w_1$; $e_2+2w_2 \leq f_2(x,y) < e_2+3w_2$; $e_3+6w_3 \leq f_3(x,y) < e_3+7w_3$. If $e=e_1=e_2=e_3$ and $w=w_1=w_2=w_3$, then $e+5w \leq f_1(x,y) < e+6w$; $e+2w \leq f_2(x,y) < e+3w$; and $e+6w \leq f_3(x,y) < e+7w$.

The methods described herein can be applied to generalize quantile plots, obtaining a similar variety of quantile appearances.

The methods and system described above include listing all possible histogram appearances for a sample using constant width intervals and for multidimensional appearances with data cell boundaries that are parallel as well as not parallel to data space axes, for the location parameters and widths the same for each dimension, independent for each dimension, or related in any non-independent way.

Histogram Appearances for Small Data Samples

Small sample histograms have variability and sensitivity to bin location and width. This variability is analyzed from an exhaustive list of possible bin frequencies, a list that is constructed via a bin frequency level set partition of two dimensional space of bin locations $t_0$ and bin widths h, such that $\{(t_0,h) h>0\}$. Note that many significant researchers and practitioners in the area of density estimation, including the study of histograms, have used the notation $(t_0,h)$. However, the notation (e,w) is used herein instead. That is, above and below, "$(t_0,h)$" and "(e,w)" are synonymous and have the same meaning for the present invention. Also the array,"$h_k$," has been used having a subscript, to denote histogram sequences of interval frequencies, distinguishing them from histogram appearances,"$a_k$." So an "h" without a subscript is of the notation $(t_0, h)$ and denotes a common width of histogram intervals (or "bins") while a subscript indicates a histogram sequence and is of the notation used primarily by the inventor. The intended meaning is shown by the presence or absence of a subscript. The different notations arise from a merging of several concepts.

A by-product of obtaining histogram bin frequency level sets is a method of determining histogram bin location and width values that exactly minimize histogram Unbiased Cross Validation ("UCV") Mean Integrated Squared Error ("MISE") and exactly determine UCV MISE histogram density estimators (See FIG. 14) for small data sets.

For small data samples an error in a fixed bin width histogram arises from sampling error and histogram appearance variability. An explicit understanding of histogram graphical appearance error via appearance paradoxes, bin frequency level sets, and the identification of non-representative paradoxical small sample histogram appearances is presented. Implications of symmetry suggest that small data samples from normal populations are vulnerable to histogram reversal misrepresentations or paradoxes.

Histograms from small data sample include the following characteristics: (A) Small sample histogram appearance skewness: Histogram appearance skewness can reverse with a small data sample. Not all histogram appearance reversal pairs are approximately symmetric and not all histogram appearance skewness reversals are possible; (B) Relationships between small data samples and histogram appearances: Sample symmetry does not imply that all histogram appearances are exactly or approximately symmetric. A sample that is not skewed or even a sample that is exactly symmetric may have a skewed histogram appearance. A skewed appearance does not imply that the sample is skewed. A sample that is not exactly symmetric may have exactly reversing skewed histogram appearances. Approximate and even exact reversals can occur for samples that are not exactly symmetric. Two histograms with exactly reversed appearances and the same minimum (or maximum) bin widths h will have the same minimum UCV mean integrated squared error objective function values; and (C) Primitive small sample histogram guidelines based on appearances: reversal and near reversal appearances are addressed since one and possibly neither can be regarded as representative. Some reversals and approximate reversals can be detected via median reflection of the bins. Possibly histogram bin parameters for distinct appearances should be as distinct as possible in terms of $(t_0, h)$. The level set interior point that is the average of the level set vertices may be an adequate definition of "as distinct as possible." Tendentious use of histograms may be examined critically in the context of all possible histogram appearances. Biased graphics that too aggressively serve an agenda can be questioned more objectively when all of the histogram appearance possibilities are known. If histogram density estimation is being done via an optimization procedure that depends on bin parameters as well as bin frequencies, then it is done exactly via level sets.

The discussion herein is for small data samples. However, the present invention is applicable to statistical data samples of any size. The absence of theoretically grounded procedures for small samples especially favors the practice of this invention for small data samples. The term "small" is not well defined, in theory, practice or the literature. This is, in contrast to the almost universally taught rule (in almost all beginning or introductory statistics classes and text books) that samples of less than thirty observations are too small to apply the well known Central Limit Theorem to describe approximately the distribution of the sample mean. Creating a histogram for a sample is akin to divining a distribution of individual values of a population from which a data sample was drawn. This is a more demanding activity than estimating the distribution of sample statistical means. For small samples, the determination or estimation of a distribution of individual population values is not well understood. For small samples, the present invention advances this meager understanding.

FIG. 8 is a flow diagram illustrating a Method 96 for determining all possible histogram appearances from a small data sample. At Step 98, a set of all possible histogram appearances for a small data sample is determined via a histogram application on a target device. The small data sample is obtained from a data analysis application. At Step 100, all histogram shapes for which there is not a set of histogram intervals leading to histograms with a same histogram shape having graphic moments within a pre-determined set of sample moments are eliminated from the set of all possible histogram appearances. At Step 102, all histogram appearance paradoxes are removed from the set of all possible histogram shapes. At Step 104, a graphical histogram most representative of the small data sample from the remaining set of all possible histogram appearances is displayed via a histogram application on a graphical user interface on the target device.

Method 96 is illustrated with an exemplary embodiment. However, the present invention is not limited to such an exemplary embodiment, and other embodiments can also be used to practice the invention.

In such an exemplary embodiment at Step 98, a set of all possible histogram shapes for a small data sample via a histogram application 19 is displayed on a target device 12.

In one embodiment, the small data sample is obtained from a data analysis application 25 as described above. In one embodiment of the invention, Step 98 is practiced with the methods and system as is described in FIGS. 1-7 above. However, the present invention is not limited to such an embodiment and other methods can be used to practice Step 98 and practice the invention. In another embodiment, large data samples are obtained from the data analysis application 25 described above.

In another embodiment, the Step 98 is practiced as is illustrated by the steps in Table 11. Note: In Table 11, "an equally weighted convex combination . . . " is the same as, and is equivalent to "the ordinary statistical average . . . " mentioned above. However, the present invention is not limited to such an embodiment and other methods can be used to practice Step 98 and practice the invention.

TABLE 11

1. Create a list of sets of ($t_0$, h) vertices for each appearance level set polygon formed by lines, together with a maximum bin B width, h ≤ B ≡ ($X_{(n)} - X_{(1)} + \Delta$), $\Delta$ > 0. (See FIGS. 3-5).
2. Create a list of appearance level set interior points ($t_0$, h). For each level set, an equally weighted convex combination of the appearance level set polygon vertices is used for an interior point. The ($t_0$, h) values in the level set interiors, on the edges, and at the vertices respectively lead to histogram bins wherein no sample value is on a bin boundary, one sample value is on a bin boundary, and two or more sample values are on bin boundaries. When two or more sample points are equal to histogram interval endpoints, then the sample points that are equal to bin end points are in the arithmetic progression $\{t_0 + kh | k = 0, 1, 2, \ldots K\}$ with common difference h.
3. Create the list of the possible histogram appearances from the interior ($t_0$, h) points, the bins [$t_0 + (k - 1)h, t_0 + kh$), k = 1 to K, and the sample points, $X_i$. The appearances may be sorted by the length, K, and for the same length, lexicographically on the bin frequencies.

In one embodiment, an upper bound on data sample size for "small" is determined in the context of selecting a histogram when a small data sample variability is too large to use density estimation results. In one exemplary embodiment, a small data sample is thirty (30) or fewer observations for a normal population. Even though the fourteen examples in FIGS. 9-13 include small data samples of thirty, twenty and twelve points, respectively "small data sample" might include as many as one thousand data points in some situations. Describing a density via even a simple histogram density is more ambitious than understanding the distribution of a sample mean and consequently requires more data. Samples having histogram appearance paradoxes may be constructed to have arbitrarily many distinct values, but such collections of numbers become increasingly artificial. However, the present invention is not limited to such a small sample size numbers and larger numbers of data points can be used.

At Step 100, all histogram appearances for which there is not a set of histogram intervals leading to histograms with a same histogram appearances having graphic moments within a pre-determined set of sample moments are eliminated.

There are two ways to define what is referred to as a "graphic moment." First grouped data statistics can be obtained by identifying each interval with its mid point, associating an interval frequency with those values, and graphic moments obtained with data sample statistics (e.g., mean, variance, skewness, etc.) from the small data sample constructed of interval midpoints. Second, each interval and relative frequency can be regarded as part of a piecewise uniform distribution. Doing this leads to a histogram density estimator. Thus, graphic moments are identified as the moments for these histogram densities. The pre-determined set of sample moments includes, but is not limited to, a mean, variance and/or skewness of grouped data sample members.

The nth moment of a real-valued function $f(x)$ of a real variable about a value c is $u'_n$, as illustrated Equation 14:

$$\mu'_n = \int_{-\infty}^{\infty} (x-c)^n f(x) dx \qquad (14)$$

The moments about zero are usually referred to simply as the "moments of a function." Except in the special context of the problem of moments, the function $f(x)$ will be a probability density function. The $n^{th}$ moment (about zero) of a probability density function $f(x)$ is the expected value of $X^n$.

The moments about a statistical mean μ are called "central moments." Central moments are an aspect of a shape (i.e., a histogram appearance) of the histogram density function, independently of translation. Central moments that have been normalized by either the sample or population mean and standard deviation, as the case may be, are dimensionless quantities, associated with a distribution independently of any linear change of scale. If $f$ is a probability density function, then the value of the integral in Equation 14 is called an $n^{th}$ moment of the probability distribution.

In one embodiment, moments of small data sample histograms are determined via mean, variance and/or skewness of grouped data or a histogram density, connected to sample moments. If a list of bin frequencies occurs for some histogram, then there may be another set of equal width bins with the same bin frequencies having grouped data moments or histogram density estimator moments that equal the sample moments. Agreement between the grouped data or histogram density moments and a pre-determined set of sample moments are considered. Fixed width bins are determined by parameters $t_0$, h and an index, k. This suggests that generally only two grouped data or histogram density moments may be adjusted via $t_0$ and h to equal sample moments.

In one embodiment, all three of the statistical mean, variance, and a third central moment can be satisfied with two parameters: location and width, ($t_0$,h). A third central moment is a measure of a "lopsidedness" of a distribution. Any symmetric distribution will have a third central moment, if defined, of zero. A normalized third central moment is called the "skewness." A distribution that is skewed to the left (i.e., the tail of the distribution is thicker or longer on the left) will have a negative skewness. A distribution that is skewed to the right (i.e., the tail of the distribution is thicker or longer on the right), will have a positive skewness.

In another embodiment, not all three of the statistical mean, variance and third central moment are satisfied by the location and width parameters $(t_0,h)$. In such an embodiment estimates are used. For the matching of graphic and sample moments, both the grouped data moments and histogram density estimator moments lead to expressions involving a histogram interval location and width $(t_0,h)$. These expressions can be set equal, in pairs, to the sample mean, variance and third central moments. Generally three equations in two variables cannot be satisfied all at once. However even in pairs, an interval location and width values can be obtained leading to intervals that in combination with the original sample do not lead back to the histogram appearance with which one began. When this happens, a histogram appearance is inconsistent with the sample moments and such an appearance should not be regarded as representative of the small data sample as an appearance that is consistent in terms of graphic and sample moments.

An outline formed by bin frequencies or relative frequencies is called an "appearance" (or "shape") of a histogram. A histogram "appearance" of a fixed bin width histogram is defined as the list of non-negative bin frequencies that begins with the first positive value and ends with the last positive value. This appearance may be written as illustrated in Equation 15:

$$v_1, v_2, v_3, \ldots v_K>, \quad (15)$$

wherein $v_2, v_3, \ldots v_{K-1}$ are non-negative integers, and $v_1$, $v_K$ are positive integers and K represents a number of intervals between and including the first and last that contain values in a small data set.

FIGS. 9-14 are block diagrams illustrating fourteen equal bin width histograms and related small data sample data.

FIG. 9 is a block diagram 106 illustrating exemplary histogram appearances for exemplary small data sets. For example, the appearance of histogram A 108 is illustrated in Equation 16:

$$<1,6,9,11,1,2>, \quad (16)$$

wherein $v_1=1$ and $v_K=v_6=2$.

The appearance of histogram B 110 is illustrated in Equation 17:

$$<2,13,9,3,2,1>, \quad (17)$$

wherein $v_1=2$ and $v_K=v_6=1$.

To illustrate that small data set histogram appearance variability exceeds the expectations even of statisticians, consider fourteen equal bin width histograms labeled A-N illustrated in FIGS. 9-13.

Among these, the first two histograms, A 108 and B 110, are based on one sample of thirty closing prices for a list of common stocks, each price divided by an ideal buy price. Histogram A 108 was the first view of this sample based on a default application of the Microsoft® EXCEL® data analysis histogram and chart wizard functions. The second histogram B 110 resulted from nothing more than editing the bin width and location values to two decimal places, to eliminate fictitious precision. FIG. 9 illustrates a strikingly different in histogram appearances.

In the same spirit as Silverman (1987; p 5), a data analyst can make an informed choice without resorting to density estimation or other relatively sophisticated criteria that can be unfamiliar and possibly unfathomable to most users of data who are trained only in basic statistics. The next ten histograms, 114, 116, 120, 122, 124, 126, 130, 132, 134, 136 labeled C-L, all are based on another collection, of twenty numbers, The final two examples, 140, 142 labeled M and N, are for a third collection, of twelve numbers. All of these examples show a dramatic array of contradictory pairs of appearances. They are a clear warning that choosing among histograms such as A 108 and B 110 may be difficult, especially in a controversial, possibly adversarial setting.

The bookend examples, A 108, B 110, M 140, N 142 are especially illustrative. They illustrate how conflicting histogram appearances can result from values that are far from satisfying the demanding condition of exact symmetry that we will see begins to explain appearance paradoxes. There already is some awareness of sensitivity and variability of histogram bin frequencies. For example, the relatively recent website applet of R. W. West focuses on appearance variability. However this and other websites and discussions do not present an underlying structure of small sample histogram variability, a procedure for finding all possible appearances of a sample, and a method of identifying groups of histograms that could be considered non-representative because of inconsistent appearances. Searching for structure for small sample histogram variability is helped by answers to previously overlooked elementary questions. Journal literature and other sources provide extensive writings on histograms, from the obvious to the subtle, for all abilities, interests and objectives. Some of this has been cited by Scott (1992), referring to 290 sources by 262 authors.

Graphical moment matching is much easier having all possible histogram shapes or appearances. However, in another embodiment graphical moment matching is done without having all possible histogram appearances, using a fixed grid search or other selection of $(t_0,h)$ (or "(e,w)") values that may fail to include a point from every appearance level set and therefore fail to consider every candidate appearance.

In such an embodiment, a set of intervals is selected, the interval frequencies are obtained, and the interval frequencies are used to solve for location and width that match statistical mean and variance. A test is conducted to determine if the same interval frequencies are obtained with a new location and width. If not, then the appearance is inconsistent with the statistical sample mean and variance. All possible appearances are not needed unless an exhaustive and analysis is required. Determining all possible appearances and appearance level sets also enhance the understanding, implementation and use of average shifted histogram estimators (ASH).

At Step 102, all histogram shape paradoxes are removed from the set of all possible histogram shapes. There should not be any skewness reversing paradoxes since matching graphical skewness with sample skewness will have eliminated with one or both of any skewness reversing appearances. Skewness reversing paradoxes have graphical skewnesses that are different from zero and are different in sign. Since exactly symmetric samples will have zero skewness, any histogram appearance skewness reversals arising from a nearly symmetric sample should not be able to be adjusted to equal the small data sample skewness; or else only one appearance can have the correct sign for the skewness, positive or negative.

Using an ASH procedure in both one and multidimensional settings provides an understanding of relative histogram density estimators simply as a piecewise continuous function. A convex combination of density functions satisfies mathematical requirements of a density. For small samples, the variability of appearances due to shifts in the location parameter is sometimes called the "bin edge problem."

The solution to this "bin edge problem" appearance variability is simply the use of the ordinary average convex combination of histograms for the same interval width (i.e. so-called by some: "bin" width), shifted by some fixed fraction of the bin width, h (i.e., h, w being the two notations used for interval width.): h/3, h/5, h/10, etc. Doing this smoothes some irregularities. An extension of ordinary average ASH estimators is the consideration of weighted averages (i.e., other convex combinations). Other weighted averages that can be used include weightings based on the areas of level sets. However, these averages cannot be determined without the appearance level sets determined by the present invention.

Since there may be no asymptotic results that generally apply to small sample histogram selection, alternatives are needed. This effort began with fourteen histograms in FIGS. 9-13 illustrating various "paradoxes." A first step is the elimination of one or both paradoxical appearance pairs.

Among small sample histogram paradoxes, the simplest may be appearance exact reversals such as example Histograms C 114 and D 116, (10, 9, 1) and (1, 9, 10) and 124, 126, 130-136 of example Histogram G-L.

For a sample of n real numbers denote the ranked values by "$X_{(i)}$" i=1 ... n*, the sample value frequencies by "$\phi_{(i)}$" i= 1, ... n* wherein n*≤n is the number of distinct sample values and the sample median by "$M_d$." Consider the fixed bin width histograms for a sample for K equal width bins and the histogram frequencies $<v_k|k=1, 2, \ldots K>$ wherein $v_1$ is the first positive frequency and $v_K$ is the last positive frequency. The following four conditions illustrated in Table 12 are equivalent.

TABLE 12

1. The data sample is symmetric. That is, the sample values,
$X_{(i)}$ i = 1, ... n*, and value frequencies, $\phi_{(i)}$ i = 1, ... n*, are symmetric:
$Md - X(i) = X(n* - i + 1) - Md$, i = 1, ...n*,
and $\phi_{(i)} = \phi(n* - i + 1)$, i = 1, ...n*.
2. For every histogram frequency list $<v_K>$, there is another histogram with the reversed frequency list $<v*_K>$, that is,
$v*_K = v_{K+1-k}$, where K is the number of bins.
3. For infinitely many positive integers, K, there are histogram appearances $<v_K|k = 1, 2, \ldots K>$ such that there also is a histogram with an appearance having reversed frequencies:
$<v*_K|k = 1, 2, \ldots K>$, wherein $v*_K = v_{K+1-k}$.
4. There are infinitely many histogram frequency lists $<v_K>$ for which the reversed frequency list $<v*_K>$, that is $v*_K = v_{K+1-k}$, may be obtained by shifting the location of the histogram bins.

On a real line of sample points and histogram intervals, the sample points and histogram bin end points are reflected across the sample median. The list of bin frequencies will reverse. Since the sample is symmetric, the sample points will be the same. Finally, the reflection of the interval end points preserves the fixed bin widths, as K→∞.

If there are infinitely many distinct lists of bin frequencies for which the reversal list also occurs, then there must also be appearances and their reversals for arbitrarily small bin widths that isolate sample values. As K→∞, the limiting situation is a modified dot plot with arbitrarily thin vertical histogram bars with height corresponding to the frequency of each value. The only way that the limiting histograms can have appearance reversals is for the sample values and the value frequencies to be symmetric. That is, the sample must be exactly symmetric.

Appearance reversals are obtained by the translation of the bins that corresponds to a reflection of the bins across the sample median. Some reversals and approximate reversals may be found from median reflection translations of the bins. (Note that reversals of histograms C 114, D 116; G-L are all due to median reflection bin translations. However, the samples for histograms A, B; and M, N do not seem to exhibit a discernable structure.

The present invention provides advantages over the prior art. As an example, consider the applet of R. W. West (1996) as well as the typical operation of the very widely used Microsoft® EXCEL® histogram function and Chart Wizard® graphics package. As of 2006, the applet of R. W. West did not have a location parameter. In view of the included examples, there may be important possibilities that students and other users may miss or not completely understand from not being aware of the prevalence of appearance reversals or the details described herein. Substantially the same criticism may be made of the un-enhanced Data Analysis EXCEL® Add-In. Different bin locations may be implemented, but the steps are relatively cumbersome. EXCEL® does not provide for an easy viewing of the possibilities as does the applets of West (1996). Neither the applet of West (1996) nor EXCEL® provides a structured view of the variation in histogram appearances that we have from an understanding of appearance level sets. For histogram appearance reversal pairs or near reversal pairs, it is possible that only one will be discovered if the bin location parameter values do not vary to correspond to reflection across the median.

To obtain an adequate understanding of the variability of histogram appearances, graphics tools should easily display the histogram appearances that result from changing not just the bin width, or width and location independently, but either selecting $(t_0, h)$ from distinct level sets or, at a minimum, including bin locations that correspond to median reflection. Secondly, unless it can be shown, like average shifted histograms (see Scott, 1992, ch. 5), that average reversal histograms are meaningful or enjoy special properties (and maybe they do), possibly pairs of reversal appearances should not be used.

Finally note that the numbers for examples A, B and M, N are not exactly symmetric. Exact symmetry is not necessary for the existence of approximate or even exact reversals of some appearances and related anomalies such as shown by examples M, N. Obviously if appearance skewness reversals happened only for exactly symmetric samples, then possibly we could be less concerned about appearance reversals.

Selected histogram frequency lists $<v_k>$ can have the reversal histogram appearance, $<v*_k>$, $v*_k = v*_{K+1-k}$, for some data sample or samples. However for a pair of reversed appearances $<v*_k>$ and $<v*_k>$, or more generally, any set of M appearances $\{<v^m_k>|m=1, 2, \ldots M; k=1, 2, \ldots K_m;$ for all m, $\Sigma_k v^m_k = n\}$, not always is there a sample that has these histogram appearances, wherein the sample points, X, (i=1, 2 ... n) are linear inequality variables together with $\{(t^m_0, h_m) m=1, 2 \ldots M\}$.

For a set of M appearances $\{<v^m_k>|m=1, 2, \ldots M; k=1, 2, \ldots K_m; \Sigma_k v^m_k = n\}$, there exists a sample $X_i$, i=1 to n, in the interval [a, b), with minimum values equal to a, having these M histogram appearances if and only if all of the linear constraints for each histogram appearance $<v^m_k>$, for $X_i$, i=1 to n, $X_{(1)}=a$ and $\{(t^m_0, h_m) m=1 \ldots M)$ are collectively consistent. Additional constraints are that all of the bin widths $h^m$ must be positive, the end point $t^m_0$ of appearance $<v^m_k>$ must lie in the interval $(a-h^m, a]$. Only the consistency of these inequalities for $X_{(i)}$ and $(t^m_0, h^m, m=1, 2, \ldots M)$ is essential.

There does not always exist at least one sample for any reversal pair of frequencies or any set of appearances since there are no samples which can be represented by two uniform bin width histograms having bin frequencies <1, 2, 3, 4> and <4, 3, 2, 1>. The linear inequalities required for the bin frequencies <1, 2, 3, 4> and <4, 3, 2, 1> are not consistent. The existence and number of appearance reversal pairs might be considered as a discrete measure of approximate symmetry in a small data sample, in addition to or in contrast to sample skewness measures and skewness of histogram grouped data or a histogram density.

Another paradox that may be related to reversal pairs is the phenomenon of appearance mode inversion, illustrated by examples Histograms E 120, F 122, M 140, N 142. Examples E 120 and F 122 have appearances <1, 9, 9, 1> and <6, 4, 4, 6> but not the appearances <9, 1, 1, 9> nor <4, 6, 6, 4>. This is known from a list of the possible appearances for the second collection, of twenty numbers, for examples B-L. Histograms M 140, N 142 provide a more pronounced example of appearance mode inversion, <1, 2, 3, 3, 2, 1>, <3, 2, 1, 1, 2, 3>.

The numbers for M 140, N 142 are not symmetric nor are the ranked values $X_{(1)}$ to $X_{(6)}$ or $X(7)$ to $X_{(12)}$ Nevertheless sometimes symmetric samples having appearance skewness reversals, such as, for example <1, 2, 3> and <3, 2, 1> may be subjected to affine transformations and combined to give a collection of numbers having the mode inverting appearances <1, 2, 3, 3, 2, 1> and <3, 2, 1, 1, 2, 3> of example M 140, N 142 Such constructions lead to a better understanding of such paradoxes.

A finite data sample can have only finitely many reversals of fixed bin width histogram appearances that are not exactly symmetric. Similarly, there can be only finitely many mode inverting histogram appearances (e.g., such as examples M, N.) If a finite sample had an infinite number of asymmetric appearance reversals, then there would be asymmetric reversals for histograms with arbitrarily small intervals that isolate the distinct sample values. This implies a contradiction in the value frequencies. Consequently there can be only finitely many histogram asymmetric appearance reversals. Similarly there can be only finitely many histogram mode inversions.

Among the infinite number of appearance reversal pairs for an exactly symmetric sample, only a finite number of the appearances are not exactly symmetric. Only a finite number of possible appearance mode inversions, appearance skewness reversals, and asymmetric reversal pairs need to be considered. These are determined at Step 102.

At Step 104, a graphical histogram most representative of the small data sample via from the remaining set of all possible histogram appearances is displayed via a histogram application 19 on a graphical user interface displayed on a display 14 on the target device 12.

In one embodiment, the methods described herein are implemented in histogram application 19. The histogram application 19 displays data collected via data analysis applications 25.

Table 13 illustrates exemplary characteristics histogram appearances for small data samples.

TABLE 13

A. Small sample histogram appearance skewness possibilities

1. Histogram appearance skewness can reverse. Not all histogram appearance reversal pairs are approximately symmetric. Not all histogram appearance skewness reversals are possible.

TABLE 13-continued

B. Relationships between small samples and histogram appearances

1. Data sample symmetry does not imply that all histogram appearances are exactly or approximately symmetric.
2. A data sample that is not skewed or even a sample that is exactly symmetric may have a skewed histogram appearance: a skewed appearance does not imply that the sample is skewed.
3. A sample that is not exactly symmetric may have exactly reversing skewed histogram appearances: Approximate and even exact reversals can occur for samples that are not exactly symmetric.
4. Two histograms with reversed appearances and a same minimum (or maximum) bin widths h will have the same minimum UCV mean integrated squared error objective function values.

C. Primitive small sample histogram guidelines based on histogram appearances

1. Reversal and near reversal histogram appearances are problematic since one and possibly neither can be regarded as representative.
2. Some reversals and approximate reversals can be detected via median reflection of the bins.
3. Possibly histogram bin parameters for distinct appearances should be as distinct as possible in terms of ($t_0$, h). (A level set interior point that is an average of the level set vertices is an adequate definition of "as distinct as possible.")
4. Tendentious use of histograms may be examined critically in the context of all possible histogram appearances. Biased graphics that too aggressively serve an agenda can be questioned more objectively when all of histogram appearance possibilities are known. If histogram density estimation is being done via an optimization procedure that depends on bin parameters as well as bin frequencies, then this should be done exactly via level sets.

Determining Histograms with Unbiased Cross Validation ("UCV") Mean Integrated Squared Error ("MISE")

FIG. 14 is a flow diagram illustrating a Method 144 for determining all possible histogram appearances from a small data sample. At Step 146, a set of all possible histogram appearances for a small data sample is determined via a histogram application on a target device. The small data sample is obtained from a data analysis application. At Step 148, a minimum and a maximum interval width is determined for each histogram appearance in the set of all possible histogram appearances for creating a list of Unbiased Cross Validation ("UCV") Mean Integrated Squared Error ("MISE") error values or a list of UCV MISE proxy error values associated with each histogram appearance, interval locations and minimum and maximum interval width is created for each histogram appearance. At Step 150, a smallest error value is selected from the list of UCV MISE error values or list of UCV MISE proxy error values thereby providing a UCV MISE error minimized histogram or error proxy minimized histogram and exactly determining a UCV MISE histogram density estimator for the small data sample. At Step 152, a graphical histogram density that corresponds most closely to a true but unknown density in the UCV MISE context and that may be considered most representative of the small data sample using the determined UCV MISE histogram density estimator is displayed via a histogram application on a graphical user interface on the target device.

In one embodiment, Method 144 includes an additional Step 149, creating a set of UCV MISE error values from the list of minimum and maximum interval with level set vertices (Not illustrated in FIG. 14). However, the present invention is not limited to such an embodiment and the invention can be practiced with or without Step 149.

In statistics kernel density estimation is a way of estimating a probability density function of a random variable. For example, given a small sample collected from a much larger population, kernel density estimation makes it possible to mathematically extrapolate the small data sample to describe tentatively the distribution of the larger population. Thus, a histogram can be thought of as a collection of data sample points from a kernel density estimate for which the kernel is a uniform box a width of a histogram bin.

Method 144 is illustrated with an exemplary embodiment. However, the present invention is not limited to such an exemplary embodiment, and other embodiments can also be used to practice the invention.

In such an exemplary embodiment at Step 146, a set of all possible histogram shapes for a small data sample via a histogram application 19 on a target device 12.

In one embodiment, the small data sample is obtained from a data analysis application 25 as described above. In another embodiment, a large data sample is obtained from a data analysis application 25 as described above. In one embodiment of the invention, Step 146 is practiced with the methods and system as is described in FIGS. 1-7 above. However, the present invention is not limited to such an embodiment and other methods can be used to practice Step 146 and practice the invention.

In another embodiment, the Step 146 is practiced as is illustrated by the steps in Table 11 above. However, the present invention is not limited to such an embodiment and other methods can be used to practice Step 146 and practice the invention.

At Step 148, a minimum and a maximum interval width is determined for each histogram appearance in the set of all possible histogram appearances by creating a list of Unbiased Cross Validation ("UCV") Mean Integrated Squared Error ("MISE") error values or a list of UCV MISE proxy error values associated with each histogram appearance, interval locations and minimum and maximum interval width is created for each histogram appearance.

At Step 150, a smallest error value is selected from the list of UCV MISE error values or list of UCV MISE proxy error values thereby providing a minimized histogram or proxy minimized histogram and exactly determining a UCV MISE histogram density estimator for the small data sample. A good sample histogram can be considered in the context of the unbiased cross-validation (UCV) criterion. A "good sample histogram" is one that minimizes an error function associated with the UCV criterion.

In one embodiment, Equations 18-20 lead to a uniform bin width histogram that minimizes a mean integrated squared error between the histogram and a true but unknown histogram density. In another embodiment, Equations 18-20 lead to a uniform bin width histogram that minimizes a mean integrated squared error between the histogram and a true and known histogram density. A significant feature of Mean Integrated Squared Error (MISE) in this context is that the unknown densities appear only as a factor that is the same for all of the candidate histogram density estimators as is illustrated with Equation 18.

$$UCV \text{ error} = 2/[(n-1)h] - (n+1)/$$  (18)

$$[n^2(n-1)h]\sum_k v_k^2 + \text{constant}$$

$$= \left[2 - [(n+1)/n^2]\sum_k v_k^2\right] / (n-1)h + \text{constant}.$$

To find a best UCV MISE histogram density estimator, Equation 18 is minimized over all possible bin frequencies, $<v_1, v_2, v_3, \ldots v_K>$, bin width, h and n is equal to the sample size, that is the number of observations in a sample. That is, repeated values, if any, are not deleted and are included in the count, n. See Equations 19 and 20.

Since $n \leq \Sigma_k v_k^2 \leq n^2$, Equation (18) leads to Equation (19):

$$(1-n) \leq [2-((n+1)/n^2)\Sigma_k v_k^2] < (1-1/n),$$ (19)

and Equation (20) such that:

$$1/h + \text{constant} \sim UCV \text{ error objective function} \sim 1/nh + \text{constant}.$$ (20)

In Equation (19) the minimum value on the left-hand side, "(1−n)," is negative and the maximum value on the right-hand side, "(1−1/n) is positive.

Consequently, for any histogram, appearance $<v_1, v_2, v_3 \ldots v_K>$, if $[2-(n+1)/n^2\Sigma_k v_k^2]$ is negative, then a minimum UCV error occurs for a minimum interval width, $h_{min}$.

If $[2-(n+1)/n^2\Sigma_k v^2]$ is positive then the minimum error occurs for a maximum width $h_{max}$.

For a each histogram appearance, the points $(t^1_0, h_{min}$ and $(t^2_0, h_{max})$ are unique, since the level set edges, $t_0+kh=X_i$ are neither horizontal nor vertical and the points $(t^1_0, h_{min})$ and $(t^2_0, h_{max})$ associated with the smallest and largest widths are at unique vertices, not along edges of constant interval width, h. This is true since the level set boundaries $t_0+kh=X_i$ have slopes, $\Delta h/\Delta t0$, that are $-1/k$, for the integers $k=1, 2, \ldots K$, etc. (except for the maximum and minimum values for the interval width, h; $h=B\equiv(X_{(n)}-X_{(1)}+\Delta)$, $\Delta>0$, and $h=\delta, \delta>0$.) This embodiment may be easily modified so that no bounding lines are horizontal or vertical.

To compare this to current practice of estimating UCV histograms, known in the statistical arts, consider for example, the work of Lane (2000). Lane implemented the UCV criterion by examining histograms obtained from a semi-log grid of points in the $(t_0, h)$ plane, where log(h) apparently is uniformly spaced, apparently having values $h_q=\exp(h^*_q)=\exp(h^{}+(q-t)\Delta h^{})=(X_{(n)}-X_{(1)})/9\times(3)(q-1)/29$ for $q=1, 2, \ldots 30$, so that $h^{}=\log((X_{(n)}-X_{(1)})/9)$ and $\Delta h^{}=\log(3^{(1/29)})$, etc.

Thirty possible bin widths were tested and were determined together with twenty location points, $t_0$, for each width, giving a total of six hundred search points in a subset of $\{(t_0, h)\}$. However this practice by Lane has two deficiencies. First, it is not certain that every possible appearance will be considered. As already noted, for fixed grid search based only on the sample range, there always exist samples in the same range having histogram appearances (i.e., bin frequency lists) that will not be found. This is true even if the number of grid points exceeds the number of histogram appearances. Second, a grid search does not find the minimum or maximum bin widths for a given frequency list $<v_k>$.

These two deficiencies of the work of Lane weaken histogram density estimation procedures based on an approximate grid search for error function extremizing $(t_0, h)$ values for error functions such as UCV MISE that depend on the bin parameters $t_0$, h as well as bin frequencies, $<v_k>$, that also depend on $(t_0, h)$. These two deficiencies are overcome by the current invention.

Such approximate grid search procedures are replaced by an exact $<v_k>$ appearance level set vertex search with the method and system described herein.

The sensitivity of the histogram appearances for examples A 108, and B 110 very strongly suggest that approximations previously considered good enough (e.g., Lane, etc.) are now considered inadequate and the method and system described herein provide an exact method to provide a true exact infimum UCV error for each histogram appearance, $<i_k>$, to an arbitrary selected precision, leading to an exact UCV MISE minimum histogram from among all of the candidate histograms.

This is possible since all histogram appearances from a relevant finite set have been considered, and that for each histogram appearance, bins have been chosen to give a UCV error that is arbitrarily close to an extreme value, namely an UCV MISE infimum for each histogram appearance subject only to the limitation of determining extreme values arbitrarily near the boundary of an open set. Alternatively, vertices provided are used if there is no objection to having two or more bin end points that equal sample values that differ by multiples of the bin width.

At Step 152, a graphical histogram most representative of the small data sample using the determined UCV MISE histogram density estimator is displayed via a histogram application 19 on a graphical user interface on the target device 12.

In one embodiment, the methods described herein are implemented in histogram application 19. The histogram application 19 displays data collected via data analysis applications 25. However, the present invention is not limited to such an embodiment and other embodiments can also be used to practice the invention.

Using a small sample data, determining all possible histogram appearances and determining exact error calculations (e.g., UCV MISE, etc.) allow a representative histogram to be selected and displayed as a graphical histogram that is considered an accurate histogram density estimator for the small data sample.

The method and system determine relevant histogram appearances (i.e., bin frequency lists) for fixed bin width sample histograms, exactly determine error minimizing histogram density estimators and determine histogram appearance reversals and mode inversions.

Maximum Likelihood Histogram Density Estimators

A maximum likelihood density estimator can also be used to determine a most appropriate histogram using relevant histogram appearances. It will be appreciated that a histogram density maximum likelihood, "ML," estimator presented and calculated herein is different from maximum likelihood (ML) histogram density estimator known in the prior art such as those presented by Professors J. R. Thompson and R. A. Tapia (See Background section above). Their meanings are also very different. The J. R. Thompson and R. A. Tapia ML estimator is a statistical object that is has a maximum likelihood among all other step function density estimates for a given partition of a real line and given sample.

For the current invention, supremums and infimums are considered instead. As is known in the statistical arts, a "supremum" (also called supremum limit, limsup, superior limit, upper limit, or outer limit, etc.) and an "infimum" (also called infimum limit, liminf, inferior limit, lower limit, or inner limit, etc.) of a data sequence can be thought of as limiting (i.e., eventual and extreme) bounds on the sequence. The infimum and supremum of a function can be thought of in a similar fashion. The infimum and supremum of a data set are the infimum and supremum of a data set's limit points, respectively. In general, when there are multiple objects around which a sequence, function, or data set accumulates, the inferior and superior limits extract the smallest and largest of them. Thus, the inferior and superior limits are a type of object and a measure of size whose context is dependent on the data sample, but wherein a notion of extreme limits is invariant.

In direct contrast, a new shape estimator provided herein is a density estimate that maximizes a likelihood function, among all the uniform bin width histogram density functions having a same histogram shape. Theoretically, only a supremum may be available for some histogram shapes. In the practice of statistics, in this situation, the difference between supremum and a maximum is of no practical consequence. From such density estimators for every shape having a prescribed number of uniform width bins to cover a data sample, a maximum from among that finite list may be selected.

Each histogram shape will have many partitions associated with it that all lead to a sample histogram that has the same histogram shape. For each of these partitions, the J. R. Thompson and R. A. Tapia ML result guarantees that no other step function will have a greater likelihood for a given sample.

In direct contrast, the density estimator provided herein uses a new method to find a ML histogram density estimator for each histogram shape, and hence from among any finite list of shapes, a maximum, hence a ML estimator, from among those. Also different shapes may be ranked by likelihood and further analysis performed with a list of high likelihood, top likelihood ranked histogram density estimators.

A short list of top ranked histograms may be regarded as high likelihood estimators, rather than maximum likelihood, "ML," estimators. This is desirable if ML estimators fail to be consistent with the sample, or the best estimator, from the perspective of the first three graphic and sample moments. (Consistent "from the perspective of sample moments" is related but not the same as the widely used definition of statistical consistency, found, for example, in Lindgren, B. W., 1968, Statistical Theory, pp 259 and 270. In the simplest terms, use of consistent herein applies to finite samples, especially small samples as defined and explained herein. The more widely used meaning in the statistical arts applies to asymptotic agreement in expectation, as explained by Lindgren (op. cit.) and others).

Thus, in an over constrained situation, maximum likelihood density estimators yield high likelihood, ("HL") just as exact graphic and sample moment consistency usually must yield to a good or best aggregated consistency. Good moment consistency simply corresponds to an optimal value for an objective function based on several individual deviations between graphic and sample moments, for each of the first three moments.

For a given data sample, a histogram density function defined by two parameters, a uniform bin location and width leads to a likelihood function that is a product of density function evaluations, with evaluations at each sample point. In many situations, for some questions about likelihood, it is mathematically easier to maximize the logarithm of the likelihood function, but that is not the situation here for the questions focused on.

For each uniform bin width histogram associated with a possible histogram shape for a data sample, a value of a corresponding histogram density function may be evaluated for each sample point in a same way that any density function is evaluated. Moreover, the associated likelihood function (see for example, Lindgren, B. W. 1968, p 280; Statistical Theory, $2^{nd}$ Ed. MacMillan Company) may be evaluated in the same way. A likelihood function is a product of evaluations of a density for each point in the sample. This likelihood product varies according to the values of density function parameters. By searching for, finding and choosing the parameter values that maximize this product of density or other distributional law evaluations, a maximum likelihood density estimate is obtained.

For a sample uniform bin width histogram shape, all of the other bin location and width values that lead to bins and a sample histogram having a same shape is a shape level set. This level set is a convex polygon and is defined by its vertices in the two dimensional space of bin location and width values.

These level sets for histogram shapes are defined by their vertices in a space of uniform bin width location and uniform bin width values for a subset of a representation of this space by the well known two dimensional plane, often called the "x, y plane," from the common practice of labeling the two dimensions by the variable names "x" and "y." Here the horizontal dimension is used for "$t_0$," the bin location, and the vertical dimension is used for "h," the bin width. The two axes drawn to intersect in the middle of a page (e.g., Tables 11 and 13, FIGS. 3-5) with the horizontal axis representing the pairs of ($t_0$,h) points for which h=zero and the vertical axis representing the pairs of ($t_0$,h) for which $t_0$=zero.

There is very little known in the prior art about applying a maximum likelihood procedure to histogram densities. The known prior art only includes definitions of histograms, histogram shapes and histogram densities, and histogram density estimators. One of cited results is due to Tompson and Tapia. This result simply confirmed a previously unproven or unpublished belief and has not changed the actual use of histograms in descriptive and statistical analysis of data.

FIG. 15 is a flow diagram illustrating a Method 154 for determining maximum likelihood histogram density estimators for data samples. At Step 156, a set of all possible histogram shapes of exactly, or at most, or any finite subset of, any prescribed finite positive integer number or numbers of bins for a data sample is generated via a histogram application on a target device with one or more processors. The data sample is obtained from a data analysis application or application or from a scientific experiment. At Step 158, a supremum of a likelihood function of histogram densities is exactly determined for each histogram shape in the generated set of all possible histogram shapes. The supremum is a statistical estimate that maximizes a likelihood function among a set of histogram density functions having a same histogram shape. At Step 160, a graphical histogram of the data sample corresponding to maximum likelihood for a selected histogram shape is displayed using the determined supremum via a histogram application on a graphical user interface on the target device.

FIG. 16 is a flow diagram illustrating a Method 162 for determining minimum likelihood histogram density estimators for data samples. At Step 164, a set of all possible histogram shapes of exactly, or at most, or any finite subset of, any prescribed finite positive integer number or numbers of bins for a data sample is generated via a histogram application on a target device with one or more processors. The data sample is obtained from a data analysis application or application or from a scientific experiment. At Step 166, an infimum of a likelihood function of histogram densities is exactly determined for each histogram shape in the generated set of all possible histogram shapes. The infimum is a statistical estimate that minimizes a likelihood function among a set of histogram density functions having a same histogram shape. At Step 160, a graphical histogram of the data sample corresponding to minimum likelihood for a selected histogram shape is displayed using the determined infimum via a histogram application on a graphical user interface on the target device.

Method 154 of FIG. 15 is illustrated with an exemplary embodiment. However, the present invention is not limited to such an exemplary embodiment, and other embodiments can also be used to practice the invention. A similar exemplary embodiment applies for Method 162 of FIG. 16 as well.

In such an exemplary embodiment at Step 156, positive integer number or numbers of bins for a data sample is generated via a histogram application on a target device with one or more processors. The data sample is obtained from a data analysis application 25, from results from a scientific experiment, from a file, from a spreadsheet, etc.

In one embodiment of the invention, Step 156 is practiced with the methods and system as is described in FIGS. 1-14 above. However, the present invention is not limited to such an embodiment and other methods ncan be used to practice Step 156 and practice the invention.

At Step 158, a supremum of a likelihood function of histogram densities is exactly determined for each histogram shape in the generated set of all possible histogram shapes. The supremum is a statistical estimate that maximizes a likelihood function among a set of histogram density functions having a same histogram shape.

Since for a fixed sample, there are only finitely many shapes having a prescribed number of contiguous uniform width bins to include all sample points, for each number of bins, from one bin up to at most some prescribed number of bins, almost never as many as and almost never exceeding a number of sample points, a maximum value of a finitely many supremum may be selected. If only one shape corresponds to this maximum value, then this histogram shape is a maximum likelihood shape of its number of bins, K, for the data sample.

In FIG. 16 and Method 162, an infimum of a likelihood function of histogram densities is exactly determined for each histogram shape in the generated set of all possible histogram shapes. The infimum is a statistical estimate that minimizes a likelihood function among a set of histogram density functions having a same histogram shape.

In one embodiment, a maximum likelihood bin width and location grid search procedure in the space of uniform bin width locations and width can be described that has substantial similarities to a bin width and location grid search procedure for identifying the MISE UCV density estimators described above. MISE UCV density estimators were described by Rudemo (Rudemo, M. (1982). "Empirical Choice of Histograms and Kernel Density Estimators." Scandinavian Journal of Statistics 9, 65-78) and also described and advocated by Professor David W. Scott. (Scott, D. W. (1992). *Multivariate Density Estimation: Theory, Practice and Visualization*. John Wiley & Sons, Inc. New York). However, MISE UCV histogram density estimators have not been used in the prior art via a proven exact supremum. MISE UCV histogram density estimators have been used in the prior are via only an approximation via a uniform bin width and location grid search.

In another embodiment, an UCV MISE estimator of an objective function can be minimized via an infimum for each histogram shape. In such an embodiment this is done via evaluating an error function related to the UCV MISE histogram shape at level set of vertices (e.g., as was described above for Method 144 (FIG. 14)). However, the present invention is not limited to such an embodiment and other methods can also be used to determine an UCV MISE infimum for each histogram shape.

Thus, a histogram that arbitrarily closely approximates the UCV MISE infimum is selected from among finitely many such infimums. This minimizing is similar to maximizing (theoretically, finding a supremum) of a likelihood function, also by evaluating it at histogram shape level set vertices.

At Step 160, a graphical histogram of the data sample corresponding to maximum likelihood for a selected histogram shape is displayed using the determined supremum via a histogram application 19 on a graphical user interface 14 on the target device 12.

In one embodiment, the methods described herein are implemented in histogram application 19. The histogram application 19 displays data collected via data analysis applications 25. However, the present invention is not limited to such an embodiment and other embodiments can also be used to practice the invention.

Methods 154 and 162 may be used for both large and small data sets/samples. Using a data sample, determining all possible histogram appearances and determining exact supremum (and/or infimum) calculations allow a representative histogram to be selected and displayed as a graphical histogram that is considered an accurate histogram density estimator for the selected data sample.

The method and system described herein presents a supremum and/or infimum of likelihood function of histogram densities for each histogram shape in a generated set of all possible histogram shapes. The supremum and/or infimum is a statistical estimate that maximizes and/or minimizes a likelihood function among a set of histogram density functions having a same histogram shape.

In another embodiment, Methods 152 and 162 generate a set of all possible histogram shapes for uniform bin width histograms to find extreme values for a statistical objective function on a set of histogram shapes applied to maximum likelihood objective function. This is similar to minimizing UCV MISE error via shape level sets, but maximizing the likelihood function instead of minimizing an expression that leads to the UCV minimum MISE density estimator.

In another embodiment, in Methods 152 and 162, a generalized method of moments is used when a minimum number of relevant moments exceeds a number of parameters that specify a distribution or other statistical object. The generalized method of moments uses graphic moment functions and shape level sets to study consistency of histogram shapes with sample moments. When a number of moments exceeds a number of distribution law parameters that is the "generalized method of moments." However for histograms, focus is on first three moments, but for equal bin width histograms, there are only two parameters, bin location and width. Consequently a generalized procedure is used that accommodates more moments than distribution parameters.

The simplest more general procedure is to first use only histogram shapes that have consistency of pair-wise graphic and sample moments for three defined pairs (mean, variance), (mean, skewness), (variance, skewness). The graphic and sample moment consistency for a shape for each moment pair means that there is a bin location value and width value that lead to the same shape and also has graphic moments that are the same as the sample moments, for the two moments of the pair. This pair-wise consistency is equivalent to the calculated bin location value and bin width value pair being contained in the shape level set (possibly on a level set boundary). Since all histogram shape level sets are convex, an ordinary average of the three bin location and width values that correspond to the three pairs from mean, variance and skewness will also be in the histogram shape level set and will lead to the same histogram shape and with the first three graphic moments all being close to the first three sample moments. However the invention may be practiced with other methods and aggregates of the bin and width location values based on agreement of the first three graphic and sample moments in various combinations, using various aggregate measures of graphic and sample moment discrepancy together with convex polygon geometry and other information from a histogram shape level set.

In another embodiment, in Methods 152 and 162, a uniform grid search, quasi uniform grid search (to approximate a minimum UCV MISE histogram density estimators for a sample), and/or a Monte Carlo grid search to approximate maximum likelihood histograms for equal bin width histograms and histograms without the equal bin width restriction can also be used. Note for unrestricted partitions without equal bin width constraint, simulating uniformly distributed random points in high dimensional space can be difficult but is achievable.

In another embodiment, in Methods 152 and 162, a method of using shape level sets for unrestricted histogram bin partitions to find extreme values for a statistical objective function on a set of histogram shapes applied to maximum likelihood objective function is used. This is similar to minimizing UCV MISE error via shape level sets, but with maximizing the likelihood function instead of minimizing an expression that leads to UCV MISE density estimator.

In another embodiment, in Methods 152 and 162, plural drill down reports 27 are provided showing increasing details about various histogram options (e.g., good likelihood, graphic moments close to sample moments, etc.) A top level shows very aggregated relationships. Alternative drill down data views gives increasing levels of detail. A default selection is included with options to view more detail about: (1) exact moment agreement for pairs of mean, variance and skewness; (2) extent of approximate agreement for first three moments in situation of only two uniform bin width parameters location and width; and (3) determined likelihoods, and array of statistics about selected shapes, the same information about all shapes and also at various drill down levels, actual shape level sets and showing all of the possible bin locations and widths as a convex combination of shape level set vertices.

In another embodiment, in Methods 152 and 162, shape level sets are determined as convex combinations of vertices according to Equation (21):

$$(t_0^{interior}, h^{interior}) = \alpha_1(t_0^1, h^1) + \alpha_2(t_0^2, h^2) + \ldots + \alpha_S(t_0^S, h^S), 0 < \alpha_1, \alpha_2, \ldots \alpha S < 1, \alpha_1 + \alpha_2 + \ldots + \alpha_S = 1, \quad (21)$$

wherein $t_0^{interior}$ are interior bin locations, $h^{interior}$ are interior bin widths, $\alpha_1, \alpha_2, \ldots \alpha_S$ are convex coefficients, $\alpha_i$, and $(t_0^1, h^1), (t_0^2, h^2), \ldots (t_0^S, h^S)$ are S vertices of a histogram shape level set, and $0 < \alpha_i < 1$ for all i, i=1 to S, and $\alpha_1 + \alpha_2 + \ldots + \alpha_S = 1$.

The methods and system described herein provide a supremum and/or infimum of likelihood function of histogram densities for each histogram shape in a generated set of all possible histogram shapes. The supremum and/or infimum is a statistical estimate that maximizes and/or minimizes a likelihood function among a set of histogram density functions having a same histogram shape.

Blended Histogram Shapes Identification

Blended economic and statistical modeling is known in the business economics and social science arts. However selection of blended histogram shapes and blended histogram density identification is not know in the art.

In the context of multiple evaluation criteria of statistical estimators, the methods and systems described above use of histogram level sets in an exact calculation of such estimators as maximum likelihood, minimum UCV MISE error, minimum chi-squared, and method of moments.

Histogram shapes may be ranked according to a calculated score from one or more different measures including a bin width histogram density, a minimum UCV MISE error, etc.

For each uniform bin width histogram shape, there is a maximum likelihood uniform bin width histogram density. This likelihood value for this maximum likelihood uniform bin width histogram density may be associated with the shape. All of the finitely many uniform bin width histogram shapes with at most a prescribed maximum number of uniform width bins may be ranked according to this likelihood value, from the largest value (the best) to smaller values.

For each uniform bin width histogram shape, there is a minimum UCV MISE error or strictly monotone error surrogate uniform bin width histogram density. This error or error surrogate value for this UCV MISE uniform bin width histogram density may be associated with the shape. All of the finitely many uniform bin width histogram shapes with at most a prescribed maximum number of uniform width bins may be ranked according to this error or error surrogate value, from the smallest value (the best) to larger values.

FIGS. 17A and B are a flow diagram illustrating a Method 170 for determining blended histogram density indicators. In FIG. 17A at Step 172, a first set of all possible histogram shapes is generated with a first method of exactly, or at most, any finite subset of, any prescribed finite positive integer number or numbers of bins for a data sample on a histogram application on a target network device with one or more processors. The data sample is obtained from a data analysis application or from a scientific experiment. The first method determines a first pre-determined ranking order of the first set of all possible histogram shapes. At Step 174, a second set of all possible histogram shapes is generated with a second method exactly, or at most, any finite subset of, any prescribed finite positive integer number or numbers of bins for the data sample via the histogram application on the target network device. The second method determines a second pre-determined ranking order of the second set of all possible histogram shapes. In FIG. 17B at Step 176, a third blended set of possible histogram shapes is created by selecting generated histogram shapes from the first set of all possible histogram shapes that include highest rankings from the first pre-determined ranking order and generated histogram shapes from the second set of all possible histogram shapes that include highest rankings from the second pre-determined ranking order. A histogram shape that includes a highest ranking in a pre-determined ranking order includes a first non-empty subset in a set of generated histogram shapes. The histogram shape that includes the first non-empty subset may occur anywhere in the ranking order. At Step 178, a graphical histogram of the data sample is displayed using the third blended set of all possible histogram shapes via the histogram application on a graphical user interface on the target network device, thereby creating the graphical histogram with set of all possible histogram shapes based on an aggregation of rakings orders of histogram shapes determined from the first method and the second method.

Method 170 of FIG. 17 is illustrated with an exemplary embodiment. However, the present invention is not limited to such an exemplary embodiment, and other embodiments can also be used to practice the invention.

In FIG. 17A at Step 172, a first set of all possible histogram shapes is generated with a first method of exactly, or at most, any finite subset of, any prescribed finite positive integer number or numbers of bins for a data sample 23 on a histogram application 19 on a target network device 12, 12', 12" with one or more processors. The data sample 23 is obtained from a data analysis application 25 or from a scientific experiment. The first method determines a first pre-determined ranking order of the first set of all possible histogram shapes.

In one embodiment, the first method includes a single generating method. In another embodiment, the first method includes plural generating methods (e.g., maximum likelihood, minimum UCV MISE error, minimum chi-squared, method of moments, etc.). However, the present invention is not limited to these embodiments for the first method.

At Step 174, a second set of all possible histogram shapes is generated with a second method exactly, or at most, any finite subset of, any prescribed finite positive integer number or numbers of bins for the same data sample via the histogram application 25 on the target network device 12, 12', 12". The second method determines a second pre-determined ranking order of the second set of all possible histogram shapes.

In one embodiment, the second method includes a single generating method. In another embodiment, the second method includes plural generating methods (e.g., maximum likelihood, minimum UCV MISE error, minimum chi-squared, method of moments, etc.). However, the present invention is not limited to these embodiments for the second method.

In one embodiment of the invention, Steps 172 and 174 are practiced with the methods and system as is described in FIGS. 1-16 above. However, the present invention is not limited to such an embodiment and other methods can be used to practice Steps 172 and 174 and practice the invention.

In FIG. 17B at Step 176, a third blended set of possible histogram shapes is created on the histogram application 19 by selecting generated histogram shapes from the first set of all possible histogram shapes that include highest rankings from the first pre-determined ranking order and generated histogram shapes from the second set of all possible histogram shapes that include highest rankings from the second pre-determined ranking order. A histogram shape that includes a highest ranking in a pre-determined ranking order includes a first non-empty subset in a set of generated histogram shapes. The histogram shape that includes the first non-empty subset may occur anywhere in the ranking order.

More accurate histogram shapes are determined by blending the results from two or more histogram ranking methods at Step 176. Equation (22) illustrates a method for obtaining a set of blended histogram shapes.

The uniform bin width histogram shapes, S in number, that data may have, may be ranked according to different criteria, such as, for example, the maximum likelihood that a histogram density may have for a shape, or the consistency of a shape with a sample moment, as has been defined previously. Different criteria often lead to different rankings. There is a need to combine different rankings to identify a shape or shapes that score well on selected criteria.

For a set A of S histogram shapes, define subsets, $B_i$, of histogram shapes, for i=1 to S, as follows. Subset $B_i$ is the set of all shapes that are ranked i or better, for i=1 to S.

$$\{\text{The empty set}\} \subseteq B_1 \subseteq B_2 \subseteq \ldots B_i \subseteq B_{i+1} \subseteq \ldots \\ B_S = A \qquad (22)$$

The best shape(s) are defined to be the shape(s) in $B_1$ or if $B_1$ is empty, that is $B_1$ contains no histogram shapes, then the histogram shape or shapes in a first subset that is not empty.

As was discussed above for the method of moments and for other methods, generated histogram shapes can be generated in rank order since many histogram shapes are consistent to various moments, individually or jointly, etc. Therefore, there may be many "best" shapes in a given ordered ranking.

In contrast, experimental examples suggest that maximum likelihood and MISE order rankings are "strict." Therefore for each criteria, there will be only one "best" shape. For several strict rankings, several different histogram shapes may be ranked "number one" or receive a "top" or "highest" ranking in that rank order.

In such many situations, $B_1$ in Equation (22) will then be empty. However, other experimental examples show that maximum likelihood and MISE rank orderings have many histogram shapes that are common to both "top ten lists," so that, for example, $B_{10}$ is the first subset that will not be empty and not $B_1$.

In such a situation, the best histogram shape(s) would be those in $B_i$ wherein "i" is the index closest to the number one histogram shape for $B_i$ subsets that identify any shape(s), that is, $B_i$ wherein "i" is the minimum index for $B_i$ subsets that are not empty.

Based on experimental results a significant insight when searching for the first nonempty subset would be to begin with $B_S$, not $B_1$. Notice that $B_S$=A. Clearly A is readily available. Also available are the rankings for every histogram shape. To construct $B_{S-1}$ from $B_S$=A, remove the shapes that are ranked S by any ranking criteria. To construct $B_{i-1}$ from $B_i$, remove the shapes that are ranked i by any ranking criteria. Finally to construct $B_1$ from $B_2$, simply remove any shapes that are not ranked "number one" by any ranking criteria. This constructs the entire list of subsets $B_1, B_2, \ldots B_{S-1}, B_S$, etc. from which a best shape(s) may be identified, based on an aggregation of the different rankings of the shapes.

For different criteria, the uniform bin width histogram shapes, S in number, that data may have, can be ranked using integers 1 to S wherein shapes that are better have lower integer ranks. That is, the best shape or shapes will all have integer rank number one, and inferior shapes will have integer rank greater than one.

Consider the integers i=1 to S. For each i, $B_i$ is the set of shapes that are ranked i or better for every criterion. "ranked i or better" means that the integer rank value is i or less, for the integer rank values i=1 to S. (Again, S is the number of shapes. Hence, for a strict ordering of the shapes (no ties), the rank values for all of the S shapes would use all of the integers 1 to S.) A cumbersome but alternative explicit notation for the sets $B_i$ is $B_{rank\_i}$, for rank_i=1 to S.

A matrix $M_B$=($m_{ij}$) is used. For i=1 to S, j=1 to S, $M_B$ is a binary membership matrix having entries of one (or zero) that show the membership (or not) of shape_j (corresponding to column, j) in the set of shapes, $B_{rank\_i}$. That is, the $i^{th}$ row of $M_B$, for i=1 to S, indicates by way of binary column entries the shapes that are in $B_{rank\_i}$.

Regarding matrix $M_B$=($m_{ij}$), more specifically each $i^{th}$ row corresponds to the set of shapes $B_{rank\_i}$ and the shapes it contains. Each $j^{th}$ column corresponds to the $j^{th}$ shape, $S_j$, and the sets $B_{rank\_i}$ that include it among its elements. If an entry $m_{ij}$=1, this shows that the $j^{th}$ shape is an element of $B_{rank\_i}$ and therefore all of its rankings are i or less. If an entry $m_{ij}$=0, this shows that the $j^{th}$ shape is not an element of $B_i$ and therefore has at least one ranking greater than i. For clarity, consider the columns of $M_B$. If the first entry in a column is a 1, then all entries in that column will be 1. Otherwise, the column begins at the top, in row 1, with a zero. There are zeroes down to the first 1. Below this first 1, all of the entries in this column are 1, to the last row, row #S. In the last row of $M_B$ all of the entries are 1.

For rank_i=1 to S, the row sums of $M_B$ are the number of shapes in each set $B_{rank\_i}$. The first row sum, or the first few row sums, may be zero, if there are no shapes that are ranked number one, or very close to number one, for all of the selected criterion, for every selected criterion.

Notice that $B_{rank\_S}$=all of the shapes. That is, the shapes are ranked from number oine (the best) to #S (the lowest rank). So all of shapes are ranked at least #S and $B_{rank\_S}$=all of the shapes. A cumbersome but explicit notation for matrix $M_B$ is ($m_{rank\_i}$, shape_j), for rank_i=1 to S, shape_j=1 to S. To review, $m_{rank\_i, shape\ rank\_j}$=1 means that shape_j is ranked rank_i or better for all of the selected criteria, among all S shapes for uniform bin width histograms of selected data, etc.

The sets $B_{rank\_S}$ and membership matrix $M_B$ have been defined in terms of rankings of the shapes according to various selected criteria. The rankings of each shape by each criteria are presented as a matrix, R.

The matrix R≡($r_{ij}$) shows the integer rank of shape i, for each of S shapes, according to criterion j; so i=1 to S and j=1 to J (the number of different ranking criteria). (Note that in the preceding paragraph, the index j is used for shapes. For matrix R, the index i is for shapes, and the index j is for criteria.) R is an S×J positive integer matrix. To be clear, note that $r_{ij}$, $1 \leq r_{ij} \leq S$, and the index i take values in the set of integers 1 to S, that is, $\{1, 2, 3, \ldots, (S-1), S\}$. The index j has the integer values j=1 to J. (In some examples, typical values for S and J are 400 and 5, respectively.) A more cumbersome but more explicit notation is matrix R≡r(shape_i, rule_j) for shape_i=1 to S, rule_j=1 to J. The notation R≡r(shape_i, rule_j) is used.

Convex combinations of rankings are considered related to "blending" and also are considered related to positional weighting of preference rankings leading to an alternative or candidate "tally" with respect to voting procedures and outcomes.

A combined convex ranking is defined as a convex combination as shown by Equation (23):

$$\text{Combined-rank-of-shape-}s \equiv \sum_{r=1}^{R} \alpha_r Rank_r(S_s) \quad (23)$$

$$\text{where } 0 \leq \alpha_r \leq 1 \text{ and } \sum_{r=1}^{R} \alpha_r = 1$$

wherein histogram shapes are re-ranked according Equation (23) and the best shape(s) identified.

The ranks, $Rank_r(S_s)$, r=1 to R, for R ranking criteria, are all oriented the same way, so that one is best and the number of shapes S is worst. (e.g. for 10 (ten) shapes, shape number one is best and the $10^{th}$ shape is worst. For binary rankings for consistent/not consistent, consistent shapes are all ranked number one and inconsistent shapes all ranked equal to the number of shapes. For example, if there are 10 (ten) shapes and four are consistent with the mean, then the four consistent shapes are all ranked a tie at number and the six inconsistent shapes ranked #10.

There are many other types of ranking criteria that can be used to practice the invention. The possibilities include, put are not limited to, strict rankings based on likelihood or MISE error, but also on non-strict rankings based on consistency according equality to sample moment of histogram moments or quasi moments that depend on the shape, or shape and the domain of histogram parameters associated with the shape. In this context, a shape is ranked number one if it can be consistent with a specified sample moment and if not consistent, ranked #S, where #S is the number of shapes.

More specifically, regarding maximum likelihood values associated with a shape and MISE error values associated with a shape, these values are the supremum likelihood histogram density for each shape, the infimum UCV MISE error or MISE surrogate error described above or consistency rankings wherein if a shape is consistent according to some rule, including, but not limited to consistency rules based on histogram moments or quasi moments that depend on the shape, or shape and the domain of histogram parameters associated with the shape. If a shape is deemed consistent then it is ranked number one according to that criterion; and if not consistent, ranked #S, where #S is the number of shapes.

Histogram shapes may also be non-strictly ranked by a binary ordering, with a rank of "1" (one) if the shape is consistent with the selected moment and rank of "0" (zero) otherwise. Sample, histogram and histogram density moments and estimators may be defined in many ways. It is understood that any determination of consistency that depends on the explicit domain and vertices defined by the shape level sets is included.

In addition, $L^p$ space, namely the space of $p^{th}$ absolute power Lebesque integrable functions, etc. can be used. These $L^p$ spaces are fundamental in the mathematical arts. Applicable measures of error can depend on the choice of the parameter p for the $L^p$ metric space used with the methods and systems described herein.

Using uniform bin width histogram shape level sets to obtain chi-squared minimizing bin parameter values and normal distribution parameter values can be used. However, when such estimators are determined for each shape, the shapes may be ranked by a chi-squared minimum value for each shape, from smallest (best value) to larger values, for all of the finitely many uniform bin width histogram shapes with at most a prescribed maximum number of uniform width bins.

As previously described above, a consistency of a uniform bin width histogram shape with any sample moment maybe determined by evaluating a difference function, namely the calculated difference between the sample moment and the histogram moment or histogram density moment associated with the bin width and location parameter values at each level set vertex. If the range of these calculated differences for the level set vertices contains the value zero, then the shape includes, at least four possibilities: (1) a uniform bin width histogram; (2) or uniform bin width histograms; (3) or uniform bin width histogram density estimator; (4) or uniform bin width histogram density estimators that has a corresponding moment value that is the same as a corresponding sample moment.

In one embodiment, an exemplary Method 180 is used at Step 176. However, the present invention is not limited to this embodiment and other embodiments can also be used to practice the invention and the invention can be practiced with or without Method 180.

FIG. 18 is a flow diagram illustrating a Method 180 for determining blended histogram shape identifiers. At Step 182, the first set of histogram shape rankings for the first method and the second set of histogram shape rankings for the second method are retrieved. At Step 184, a set of combined convex rankings is determined using the retrieved first set of histogram rankings and the second set of histogram rankings. At Step 186, a set of weighted ranking scores is determined using the determined set of combined convex rankings. At Step 188, the set of determined weighted ranking scores is sorted in a pre-determined order. At Step 190, a set of histogram shapes is determined with a best raking from the sorted set of determined ranking scores, thereby creating the third blended set of possible histogram shapes.

Method 180 of FIG. 18 is illustrated with an exemplary embodiment. However, the present invention is not limited to such an exemplary embodiment, and other embodiments can also be used to practice the invention.

At Step 182, the first set of histogram shape rankings for the first method (Step 172) and the second set of histogram shape rankings for the second method are retrieved (174)($r_{ij}$).

At Step 184, a set of combined convex rankings is determined ($\alpha_j$) using the retrieved first set of histogram rankings and the second set of histogram rankings.

In one embodiment at Step 184, ($\alpha_j$) is determined using Equation (24):

$$\text{convex combined-rank-of-shape-}S \equiv \sum_{r=1}^{R} \alpha_r \text{Rank}_r(S_s) \quad (24)$$

$$\text{where } 0 \leq \alpha_r \leq 1 \text{ and } \sum_{r=1}^{R} \alpha_r = 1$$

However, the present invention is not limited to using Equation (24) and other methods may be used to practice the invention at Step 184.

At Step 186, a set of weighted ranking scores is determined using the determined set of combined convex rankings (wrs$_i$) as illustrated in Equation (25):

$$wrs_i = \sum_{j=1}^{J} \alpha_j r_{ij} \quad (25)$$

However, the present invention is not limited to using Equation (25) and other methods may be used to practice the invention at Step 186.

At Step 188, the set of determined weighted ranking scores is sorted in a pre-determined order. In one embodiment the pre-determined order is ascending order. In another embodiment the pre-determined order is descending order. In another embodiment, the pre-determined order is other that ascending or descending order.

At Step 190, a set of histogram shapes is determined with a best raking from the sorted set of determined ranking scores, thereby creating the third blended set of possible histogram shapes. In one embodiment, the best ranking is the smallest ranking. In another embodiment, the best ranking is the largest ranking. In another embodiment, the best ranking is other than the smallest or the largest ranking.

In one embodiment, Method 180 can also be used as a stand alone method in which step 182 includes steps 172 and 172 of Method 170 in which the first set of histogram shape rankings for the first method and the second set of histogram shape rankings for the second method are generated instead of being retrieved from a prior generation.

The methods described above can be used at Step 176. However, the present invention is not limited to such methods more, fewer and other types of methods can be used to practice the invention.

Returning to FIG. 17B at Step 78, a graphical histogram 21 of the data sample 23 is displayed using the third blended set of all possible histogram shapes via the histogram application on a graphical user interface 14 on the target network device 12, 12', 12" thereby creating the graphical histogram 21 with a new set of all possible histogram shapes based on an aggregation rakings order of histogram shapes determined from the first method and the second method.

The methods and system described herein are used for blending several rankings of histogram shapes, depending on any selection of a ranking criteria. A blended set of possible histogram shapes is created by selecting generated histogram shapes from a first generated set of all possible histogram shapes generated with a first method that include highest order rankings from a first pre-determined ranking order and generated histogram shapes from a second set of all possible histogram shapes generated with a second method that include highest rankings from a second pre-determined ranking order. A graphical histogram is displayed using the third blended set of all possible histogram shapes, thereby creating the graphical histogram with a new set of all possible histogram shapes based on an aggregate rakings order of histogram shapes generated with the first and second methods.

It should be understood that the programs, processes, methods and system described herein are not related or limited to any particular type of computer or network device or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer or equivalent elements in other orderings may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for determining blended histogram shapes for data samples, comprising:
    generating with a first method a first set of all possible histogram shapes of exactly, or at most, any finite subset of, any prescribed finite positive integer number or numbers of bins for a data sample on a histogram application on a target network device with one or more processors, wherein the data sample is obtained from a data analysis application or from a scientific experiment and wherein the first method determines a first pre-determined ranking order of the first set of all possible histogram shapes;
    generating with a second method a second set of all possible histogram shapes exactly, or at most, any finite subset of, any prescribed finite positive integer number or numbers of bins for the data sample via the histogram application on the target network device, wherein the second method determines a second pre-determined ranking order of the second set of all possible histogram shapes;
    creating on the histogram application a third blended set of possible histogram shapes by selecting generated histogram shapes from the first set of all possible histogram shapes that include highest rankings from the first pre-determined ranking order and generated histogram shapes from the second set of all possible histogram shapes that include highest rankings from the second pre-determined ranking order, wherein a histogram shape that includes a highest ranking in a pre-determined ranking order includes a first non-empty subset in a set of generated histogram shapes and wherein the histogram shape that includes the first non-empty subset may occur anywhere in the ranking order; and
    displaying a graphical histogram of the data sample using the third blended set of all possible histogram shapes via the histogram application on a graphical user interface on the target device, thereby creating the graphical histogram with a new set of all possible histogram shapes based on an aggregate rakings order of histogram shapes from the first method and the second method.

2. A non-transitory computer readable medium having stored therein a plurality of instructions for causing one or more processors on a network device to execute the steps of:
    generating with a first method a first set of all possible histogram shapes of exactly, or at most, any finite subset of, any prescribed finite positive integer number or numbers of bins for a data sample on a histogram application on a target network device with one or more processors, wherein the data sample is obtained from a data analysis application or from a scientific experiment and wherein the first method determines a first pre-determined ranking order of the first set of all possible histogram shapes;
    generating with a second method a second set of all possible histogram shapes exactly, or at most, any finite subset of, any prescribed finite positive integer number or numbers of bins for the data sample via the histogram application on the target network device, wherein the second method determines a second pre-determined ranking order of the second set of all possible histogram shapes;
    creating on the histogram application a third blended set of possible histogram shapes by selecting generated histogram shapes from the first set of all possible histogram shapes that include highest rankings from the first pre-determined ranking order and generated histogram shapes from the second set of all possible histogram shapes that include highest rankings from the second pre-determined ranking order, wherein a histogram shape that includes a highest ranking in a pre-determined ranking order includes a first non-empty subset in a set of generated histogram shapes and wherein the histogram shape that includes the first non-empty subset may occur anywhere in the ranking order; and
    displaying a graphical histogram of the data sample using the third blended set of all possible histogram shapes via the histogram application on a graphical user interface on the target network device, thereby creating the graphical histogram with a new set of all possible histogram shapes based on an aggregate rakings order of histogram shapes from the first method and the second method.

3. The method of claim 1 wherein the data analysis application includes graphical data display applications, spread sheet applications, educational applications, tutorial applications, web-based, internet and intranet based informational and explanatory applications, engineering finite element analysis applications, environmental applications, medical applications, pharmaceutical applications, DNA sequencing applications, chemical applications, forensic applications, geographical applications, geological applications, game theory applications, automotive analysis applications, economic analysis applications and aviation applications.

4. The method of claim 1 wherein the displaying step includes displaying a multi-colored graphical histogram.

5. The method of claim 4 wherein the multi-colored histogram includes multi-colored bar graphs, line graphs and pie-chart graphs.

6. The method of claim 1 wherein the first method or the second method includes a method for determining maximum likelihood histogram density estimators, a method for determining Unbiased Cross Validation ("UCV") Mean Integrated Squared Error ("MISE") error values, a method for determining a minimum chi-squared or a method of moments.

7. The method of claim 6 wherein the method for determining Unbiased Cross Validation ("UCV") Mean Integrated Squared Error ("MISE") error values includes a method for determining a list of UCV MISE proxy error values associated with a histogram appearance, interval locations and minimum and maximum interval width for each histogram appearance.

8. The method of claim 1 wherein the data sample is a small data sample.

9. The method of claim 1 wherein the step of creating a third blended set of possible histogram shapes comprises:
retrieving the first set of histogram shape rankings for the first method and the second set of histogram shape rankings for the second method;
determining a set of combined convex rankings using the retrieved first set of histogram rankings and the second set of histogram rankings;
determining a set of weighted ranking scores using the determined set of combined convex rankings;
sorting the set of determined weighted ranking scores in a pre-determined order; and
determining a set of histogram shapes with a best raking from the sorted set of determined ranking scores, thereby creating the third blended set of possible histogram shapes.

10. The method of claim 1 wherein step of determining a set of combined convex rankings includes determining a set of $$\text{convex combined-rank-of-shape-}S \equiv \sum_{r=1}^{R} \alpha_r Rank_r(S_s)$$

$$\text{where } 0 \leq \alpha_r \leq 1 \text{ and } \sum_{r=1}^{R} \alpha_r = 1.$$

11. A system determining blended histogram shapes for data samples, comprising in combination:
for generating with a first method a first set of all possible histogram shapes of exactly, or at most, any finite subset of, any prescribed finite positive integer number or numbers of bins for a data sample on a histogram application on a target device with one or more processors, wherein the data sample is obtained from a data analysis application or from a scientific experiment and wherein the first method determines a first pre-determined ranking order of the first set of all possible histogram shapes;
for generating with a second method a second set of all possible histogram shapes exactly, or at most, any finite subset of, any prescribed finite positive integer number or numbers of bins for the data sample via the histogram application on the target device, wherein the second method determines a second pre-determined ranking order of the second set of all possible histogram shapes;
for creating a third blended set of possible histogram shapes by selecting generated histogram shapes from the first set of all possible histogram shapes that include highest rankings from the first pre-determined ranking order and generated histogram shapes from the second set of all possible histogram shapes that include highest rankings from the second pre-determined ranking order, wherein a histogram shape that includes a highest ranking in a pre-determined ranking order includes a first non-empty subset in a set of generated histogram shapes and wherein the histogram shape that includes the first non-empty subset may occur anywhere in the ranking order; and
for displaying a graphical histogram of the data sample using the third blended set of all possible histogram shapes via the histogram application on a graphical user interface on the target device, thereby creating the graphical histogram with a new set of all possible histogram shapes based on an aggregate rakings order of histogram shapes from the first method and the second method.

12. The system of claim 11 wherein the data analysis application includes graphical data display applications, spread sheet applications, educational applications, tutorial applications, web-based, internet and intranet based informational and explanatory applications, engineering finite element analysis applications, environmental applications, medical applications, pharmaceutical applications, DNA sequencing applications, chemical applications, forensic applications, geographical applications, geological applications, game theory applications, automotive analysis applications, economic analysis applications and aviation applications.

13. The system of claim 11 wherein the means for displaying a graphical histogram includes displaying a multi-colored graphical histogram.

14. The system of claim 13 wherein the multi-colored histogram includes multi-colored bar graphs, line graphs and pie-chart graphs.

15. The system of claim 11 further comprising:
for determining a minimum and a maximum interval width for each histogram appearance in a set of all possible histogram appearances creating a set of interval width values by creating a list of Unbiased Cross Validation ("UCV") Mean Integrated Squared Error ("MISE") error values or list of UCV MISE proxy error values associated with each histogram appearance, interval locations and minimum and maximum interval width for each histogram appearance;
for selecting a smallest error value from the list of UCV MISE error values or list of UCV MISE proxy error values thereby providing a minimized histogram or proxy minimized histogram;
for exactly determining an infimum using the selected smallest error value from the list of UCV MISE error values or list of UCV MISE proxy error values for the data sample.

16. The system of claim 11 wherein the first method and the second method include a method for determining maximum likelihood histogram density estimators, includes a method for determining Unbiased Cross Validation ("UCV") Mean Integrated Squared Error ("MISE") error values, a method for determining a minimum chi-squared or a method for determining moments.

17. The system of claim 11 wherein the data sample is a small data sample.

* * * * *